(12) United States Patent
Nishio et al.

(10) Patent No.: US 7,248,418 B2
(45) Date of Patent: Jul. 24, 2007

(54) ZOOM LENS SYSTEM AND IMAGE PICKUP APPARATUS INCLUDING THE SAME

(75) Inventors: Akihiro Nishio, Yokohama (JP); Shinji Yamasaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 11/241,657

(22) Filed: Sep. 29, 2005

(65) Prior Publication Data

US 2006/0066953 A1 Mar. 30, 2006

(30) Foreign Application Priority Data

Sep. 30, 2004 (JP) .............................. 2004-287420
Sep. 30, 2004 (JP) .............................. 2004-287421
Sep. 8, 2005 (JP) .............................. 2005-260879

(51) Int. Cl.
*G02B 15/14* (2006.01)
(52) U.S. Cl. .................. 359/689; 359/682; 359/684
(58) Field of Classification Search ................ 359/680, 359/682, 684, 689
See application file for complete search history.

(56) References Cited

U.S. PATENT DOCUMENTS

| 5,483,380 | A | 1/1996 | Nozawa |
| 6,259,083 | B1 | 7/2001 | Kimura |
| 6,850,373 | B2 | 2/2005 | Mihara |
| 7,079,328 | B2 * | 7/2006 | Kuba .......................... 359/689 |
| 2004/0027685 | A1 | 2/2004 | Mihara et al. |
| 2004/0263995 | A1 | 12/2004 | Adachi |

FOREIGN PATENT DOCUMENTS

| JP | 11-68074 A | 3/1999 |
| JP | 2000-19457 A | 1/2000 |
| JP | 2003-224249 A | 8/2003 |
| JP | 2004-37967 A | 2/2004 |
| JP | 2004-69808 A | 3/2004 |
| JP | 2004-133058 A | 4/2004 |

* cited by examiner

*Primary Examiner*—David N. Spector
(74) *Attorney, Agent, or Firm*—Canon U.S.A., Inc., IP Division

(57) ABSTRACT

A zoom lens system includes a first lens unit, a lens unit having a positive optical power placed on an image side of the first lens unit, and a lens unit having a negative optical power placed on the image side of the lens unit having a positive optical power. In the zoom lens system, the lens unit having a negative optical power is closest to the image side. A compact zoom lens system is obtained by adequately setting the movement of each lens unit during zooming and the optical power of each lens unit.

8 Claims, 55 Drawing Sheets

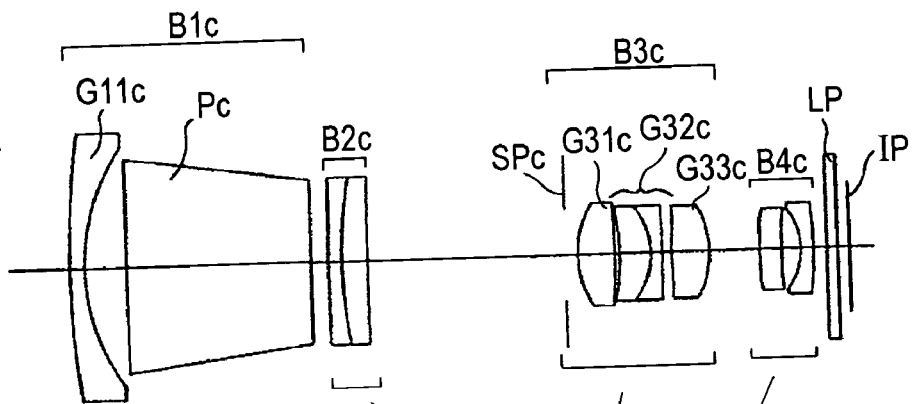
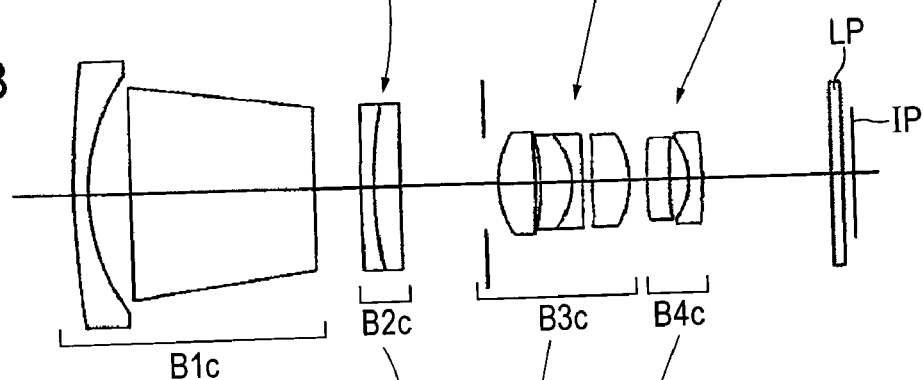
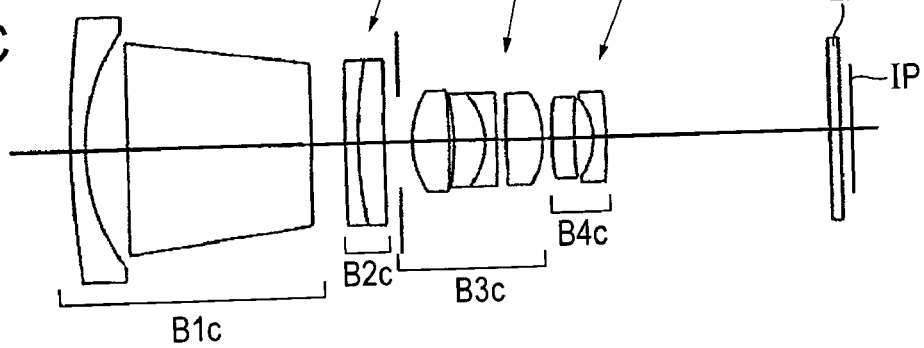

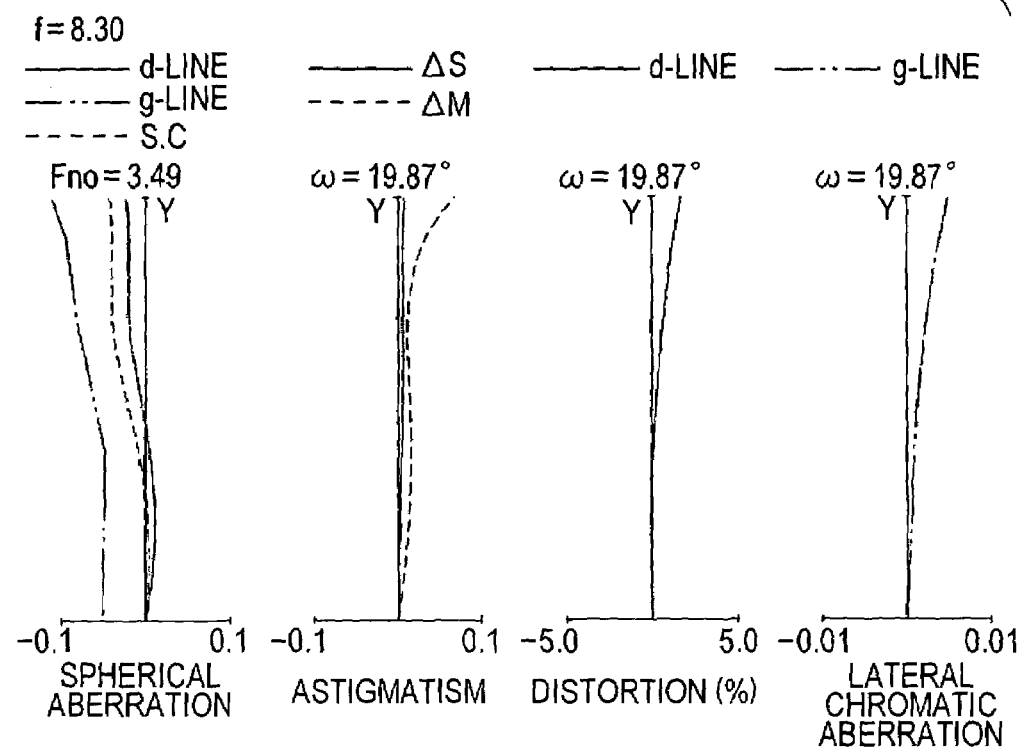
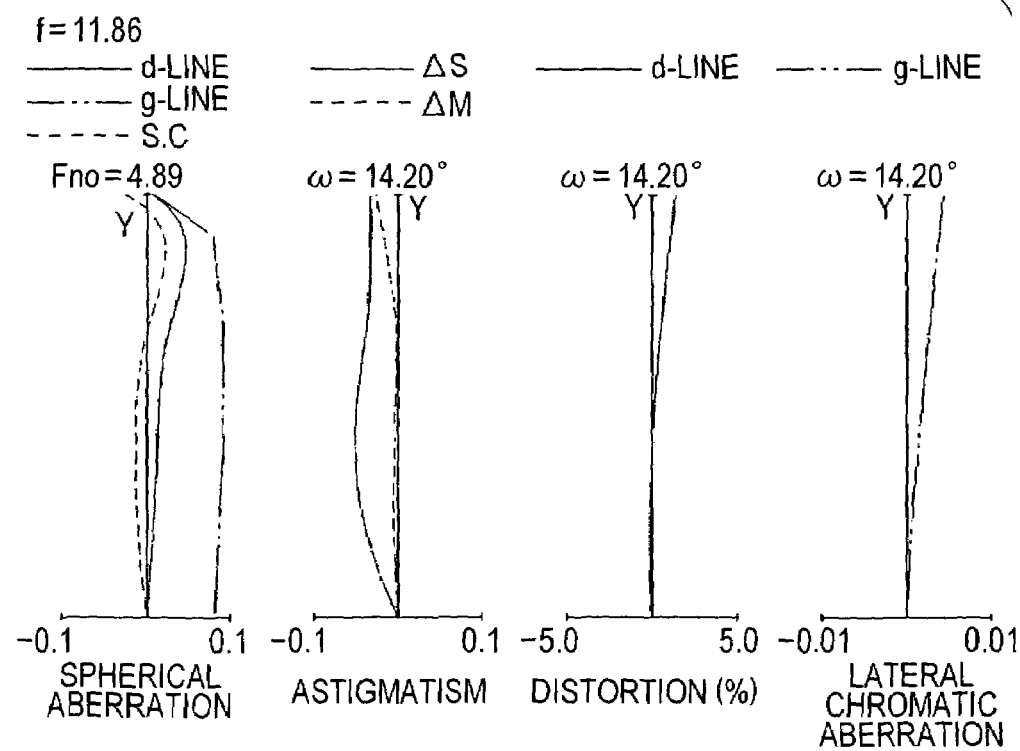

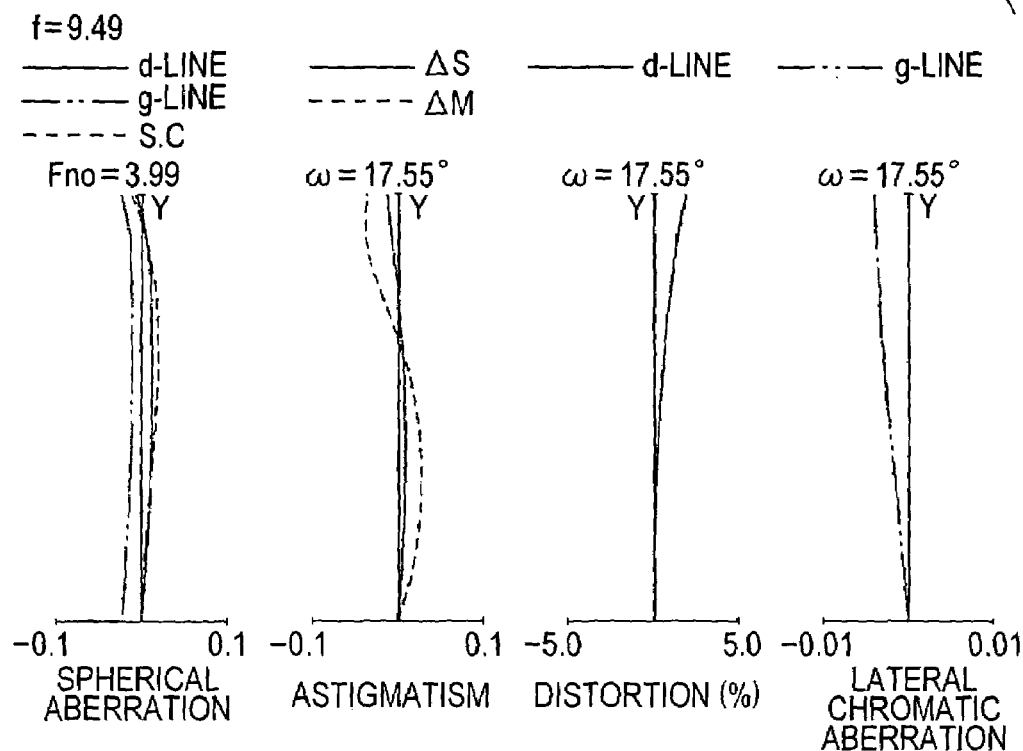
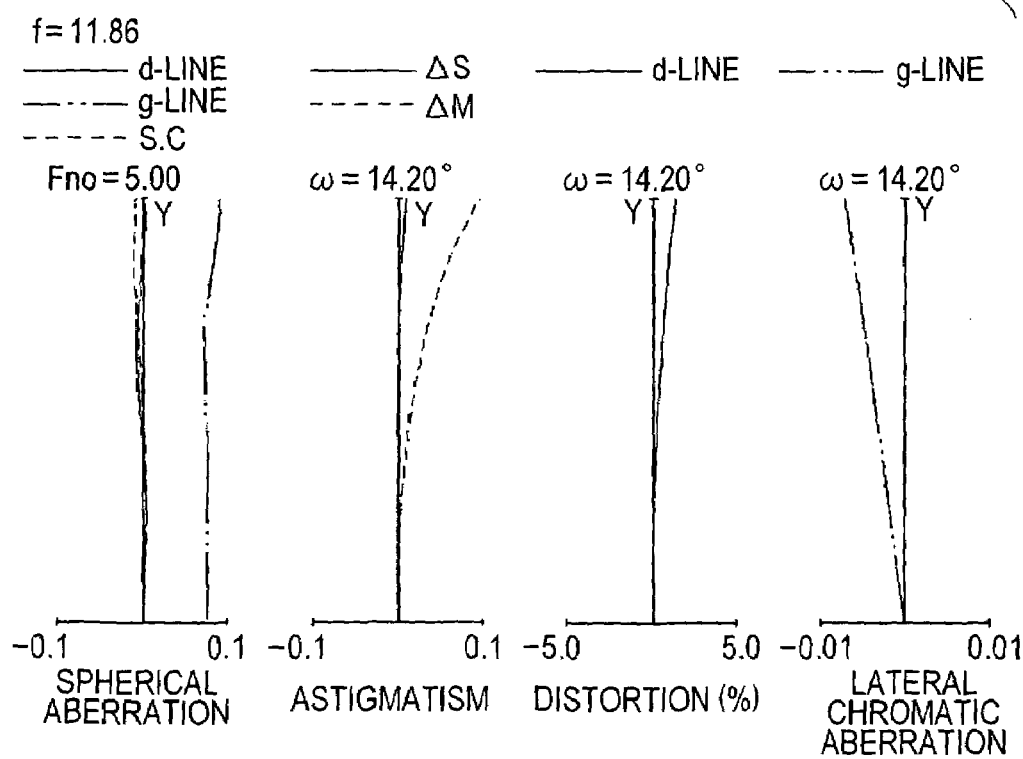

ZOOM LENS SYSTEM AND IMAGE PICKUP APPARATUS INCLUDING THE SAME

BACKGROUND OF THE INVENTION

1. Field of the Invention

The present invention relates to zoom lens systems, and more particularly, though not exclusively, to a zoom lens system of a digital camera.

2. Description of the Related Art

Recently, imaging lenses for digital cameras and video cameras have been required to have smaller lens systems and to provide higher optical performances. In addition, there is a demand for digital cameras with reduced thicknesses to increase portability for the user.

To reduce the thickness of the camera, lens barrels generally have a collapsible structure that provides high storage space efficiency. A typical collapsible structure is provided with optical and mechanical systems for making it as thin as possible in the collapsed state.

It can have a relatively long time for the collapsible lens barrel to change from the collapsed (stored) state to a state in which shooting can be performed. In addition, a complex mechanism is required to store the lens barrel with high space efficiency.

Japanese Patent Laid-Open Nos. 2004-37967 and 2004-69808 discusses optical systems including reflective members that deflect an optical axis by approximately 90° to reduce the optical thickness in a direction toward the object (along the depth of the camera). In this way, the thickness of the camera can be reduced without using a collapsible structure.

On the other hand, a photoelectric converter of a typical solid-state image pickup device is placed at a relatively deep position (in a hole) with respect to an opening. Therefore, if the direction of incident light largely differs from a perpendicular direction, the light would be blocked by the opening, which leads to a reduction in sensitivity. Therefore, a typical optical shooting system using a conventional solid-state image pickup device is designed to be telecentric so that the angle of incidence on the image pickup device is close to perpendicular even in a peripheral region of an image plane.

In comparison, Japanese Patent Laid-Open No. 11-68074 (corresponding to U.S. Pat. No. 6,259,083) and Japanese Patent Laid-Open No. 2003-224249 discusses solid-state image pickup devices having improved hole structures wherein light can be efficiently received at the photoelectric conversion plane even when the direction of the incident light is inclined or varied.

A typical zoom lens used in a shooting system of a small digital camera is a retrofocus optical system including: a negative element (lens unit having a negative refractive power) at a position closest to an object; a first positive element (lens unit having a positive refractive power) on the image side of the negative element; and a second positive element (lens unit having a positive refractive power) at a position closest to an image plane.

During zooming, the first positive element is moved to change the magnification while compensating for the movement of the image plane using the negative element. In addition, the second positive element serves a refracting function for making the incident light on the image plane close to telecentric.

In the retrofocus optical system, to obtain a certain change in magnification with a small amount of movement, the system can use an element having a high positive refractive power as the first positive element.

However, to obtain a telecentric optical system, the second positive element must have a positive refractive power and be disposed separately from the first positive element. When the overall refractive power of the first and second positive elements is set to a certain refractive power, the refractive power of the first positive element can be reduced since the second positive element must have a portion of the overall positive refractive power. When the refractive power of the first positive element can be reduced, the first positive element can be moved a long distance during zooming, which increases the overall length of the lens system.

As described above, in a zoom lens including negative, positive, and positive elements, it is difficult to achieve both telecentricity and size reduction at the same time. When the solid-state image pickup devices discussed in the above-mentioned Japanese Patent Laid-Open Nos. 11-68074 and 2003-224249 are used, the optical system is not required to have high telecentricity. Therefore, there is a possibility that the structure including the negative, positive, and positive elements is not an optimum zoom lens structure.

SUMMARY OF THE INVENTION

At least one exemplary embodiment is directed to a zoom lens system suitable for use with a solid-state image pickup device that is not required to have high telecentricity, wherein the size of the overall lens system can be reduced by using adequate lens structure and lens-unit arrangement.

A zoom lens system according to at least one exemplary embodiment includes a first lens unit, a lens unit having a positive optical power on the image side of the first lens unit, and a lens unit having a negative optical power on the image side of the lens unit having a positive optical power. The lens unit having the negative optical power is closest to the image plane in the zoom lens system.

The size of the zoom lens system in accordance with at least one exemplary embodiment can be reduced by setting the movement of each lens unit during zooming and the optical power of each lens unit.

Further features of the present invention will become apparent from the following description of exemplary embodiments with reference to the attached drawings.

BRIEF DESCRIPTION OF THE DRAWINGS

FIGS. 10A to 10C illustrate optical sectional views of a zoom lens according to a fourth exemplary embodiment.

FIGS. 33A to 33C illustrate aberration diagrams of the zoom lens according to the eleventh exemplary embodiment.

FIGS. 36A to 36C illustrate aberration diagrams of the zoom lens according to the twelfth exemplary embodiment.

DESCRIPTION OF THE EMBODIMENTS

Figure 1A:
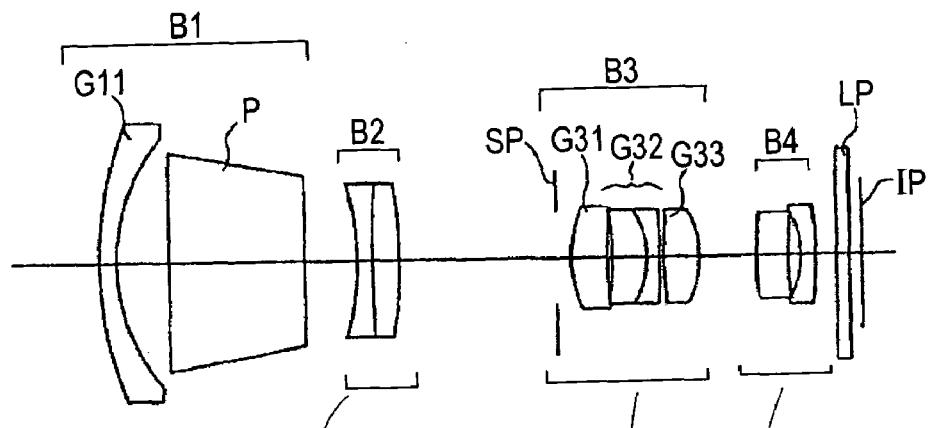
FIGS. 1A to 1C illustrate optical sectional views of a zoom lens according to a first exemplary embodiment.

The following description of exemplary embodiment(s) is merely illustrative in nature and is in no way intended to limit the invention, its application, or uses.

Exemplary embodiments can be operatively connected to various imaging devices (e.g., electronic cameras, camcorders, digital still cameras, film cameras, broadcast cameras, other imaging devices as known by one of ordinary skill, and equivalents) forming imaging systems.

Processes, techniques, apparatus, and materials as known by one of ordinary skill in the art may not be discussed in detail but are intended to be part of the enabling description where appropriate. For example, lens and lens units are discussed and any material that can be used to form lenses should fall within the scope of exemplary embodiments (e.g., glass, Si). Additionally the actual size of the lens can not be discussed, however, any size from macro lenses to nano lenses are intended to lie within the scope of exemplary embodiments (e.g., lenses with diameters of nanometer size, micro size, centimeter size, and meter sizes).

Additionally exemplary embodiments are not limited to visual imaging devices (e.g. optical photographic systems), for example, the system can be designed for use with infrared and other wavelength imaging systems. Additionally, exemplary embodiments can be used with non-digital systems as well as digital systems (e.g., photographic systems using CCDs).

Notice that similar reference numerals and letters refer to similar items in the following figures, and thus once an item is defined in one figure, it may not be discussed or further defined in the following figures.

Zoom lens systems and image pickup apparatuses including the zoom lens systems according to exemplary embodiments will be described below.

First, zoom lenses according to first to fifth exemplary embodiments will be described. Each of the zoom lenses according to the first to fifth exemplary embodiments includes four lens units including a first lens unit (e.g., B1, B1a, B1b, B1c, B1d) having a negative refractive power, a second lens unit (e.g., B2, B2a, B2b, B2c, B2d) having a positive or negative refractive power, a third lens unit (e.g., B3, B3a, B3b, B3c, B3d) having a positive refractive power, and a fourth lens unit (e.g., B4, B4a, B4b, B4c, B4d) having a negative refractive power in order from the object side to the image side.

Figure 1B:
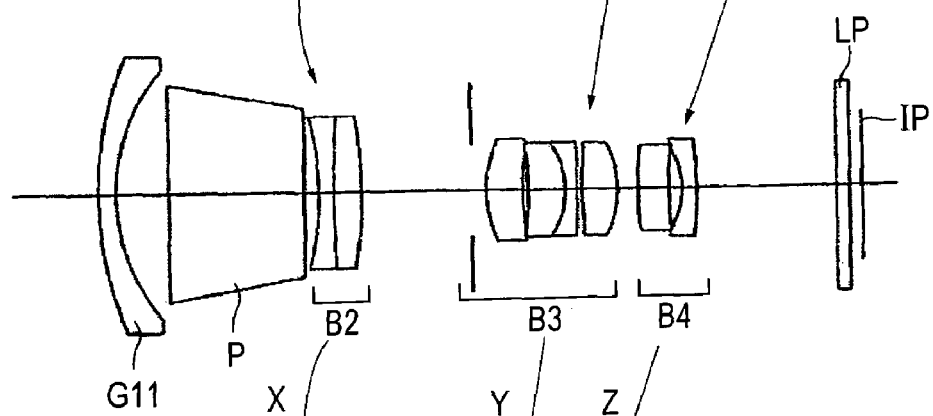
Figure 1C:
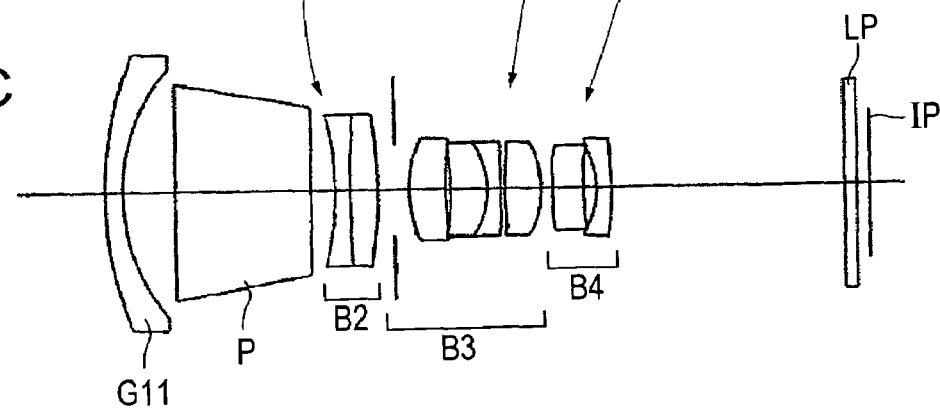
Figure 2:
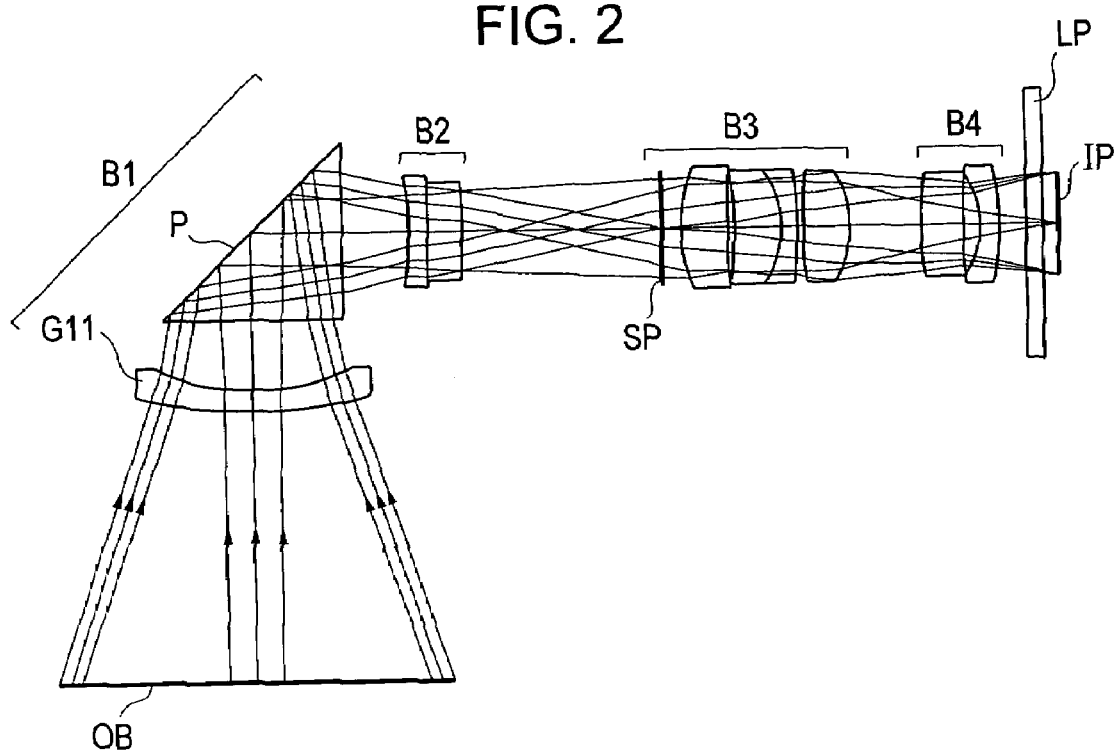
FIG. 2 illustrates a diagram showing the actual optical path in the zoom lens according to the first exemplary embodiment.
Figure 3A:
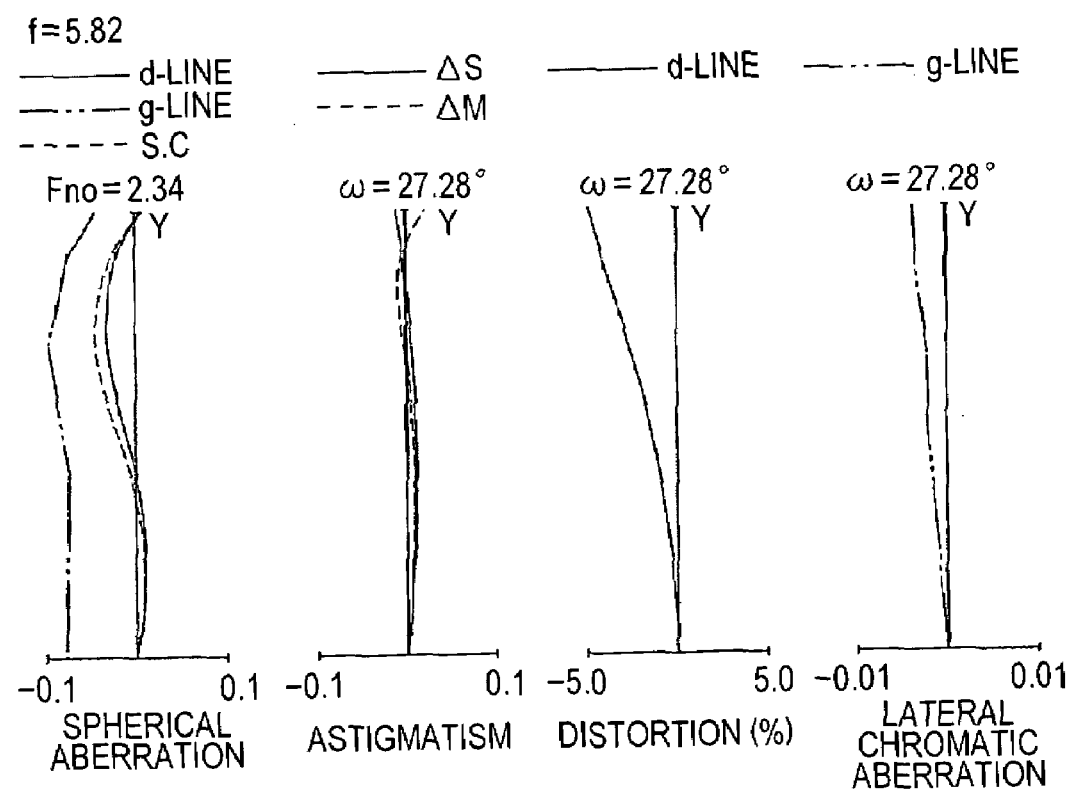
FIGS. 3A to 3C illustrate aberration diagrams of the zoom lens according to the first exemplary embodiment.
Figure 3B:
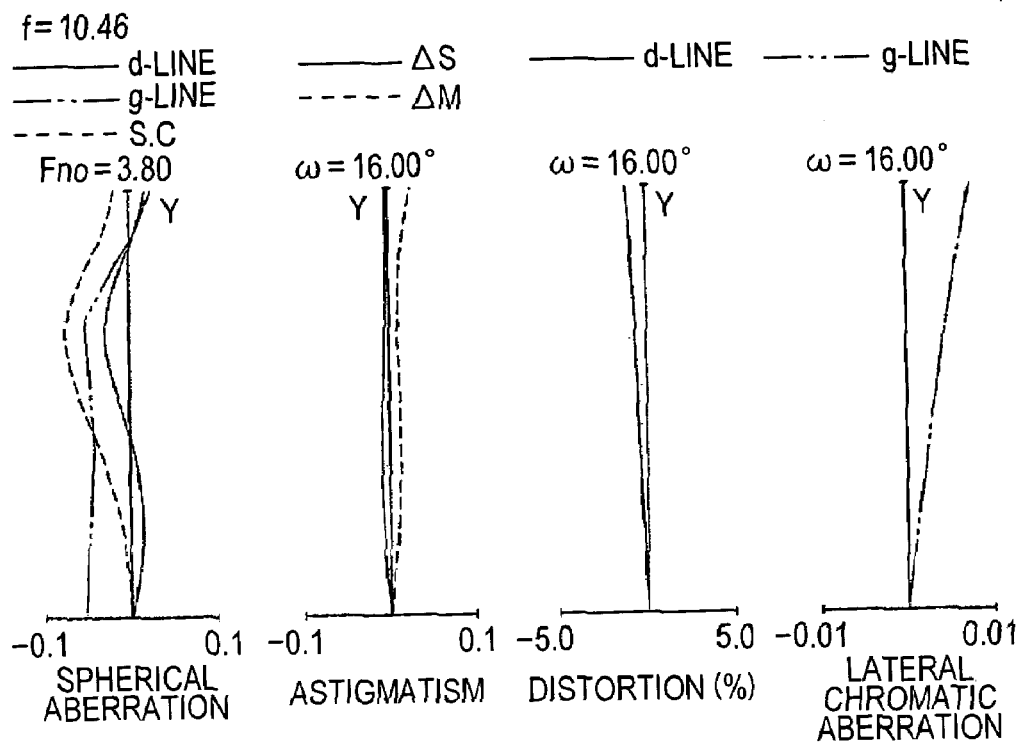
Figure 3C:
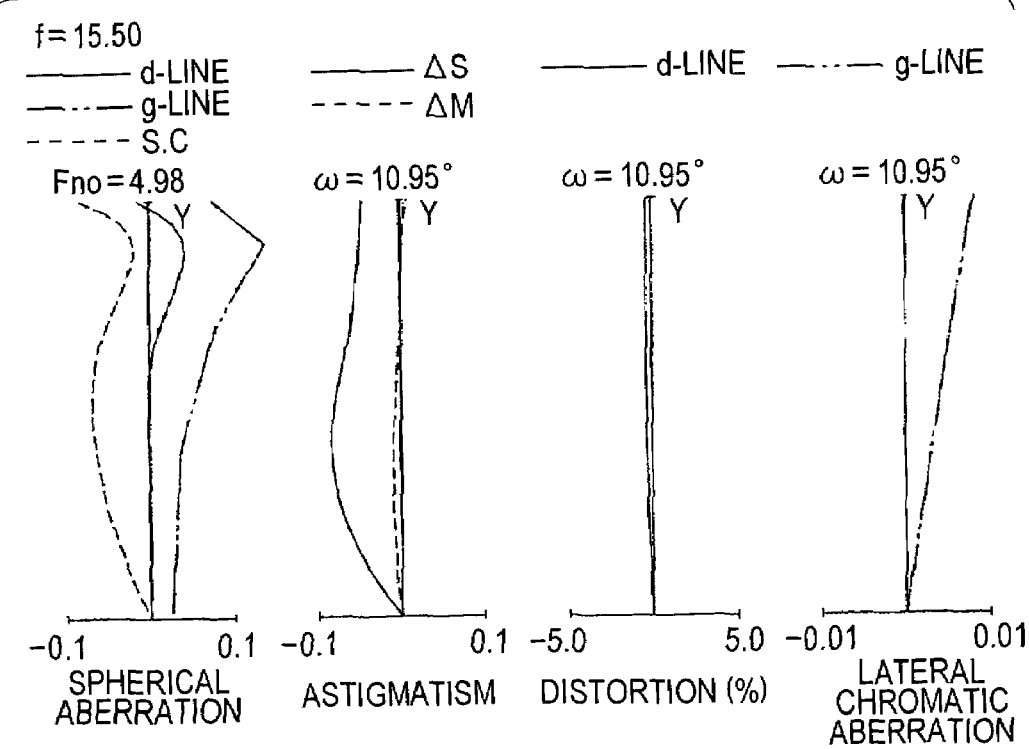

FIGS. 1A to 1C illustrate sectional views of the zoom lens according to the first exemplary embodiment at the wide-angle end (short-focal-length end), the middle zoom position, and the telephoto end (long-focal-length end), respectively. FIG. 2 illustrates a diagram showing the actual optical path in the zoom lens according to the first exemplary embodiment. FIGS. 3A to 3C illustrate aberration diagrams of the zoom lens according to the first exemplary embodiment at the wide-angle end, the middle zoom position, and the telephoto end, respectively.

Figure 4A:
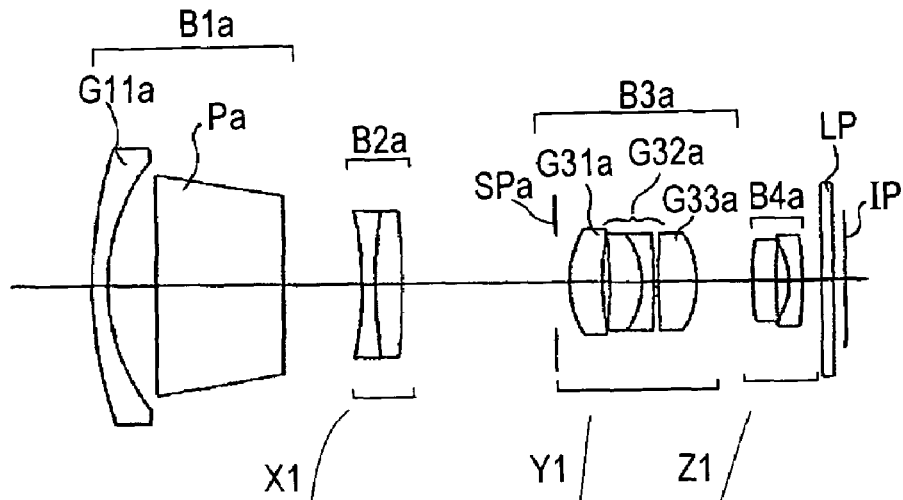
FIGS. 4A to 4C illustrate optical sectional views of a zoom lens according to a second exemplary embodiment.
Figure 4B:
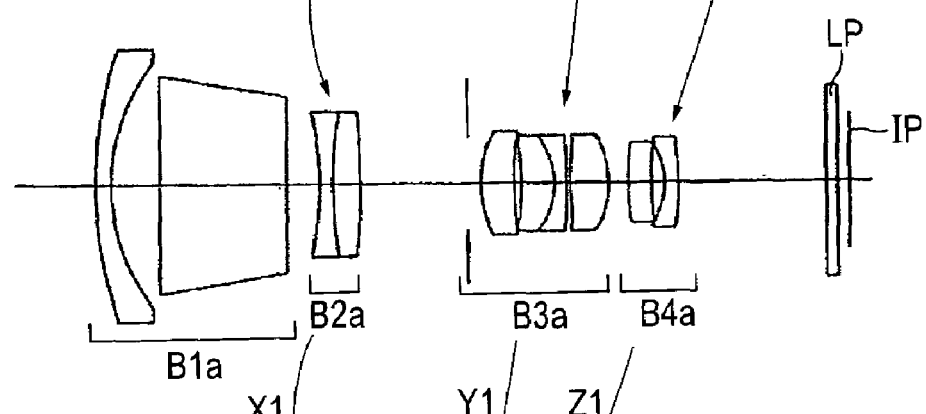
Figure 4C:
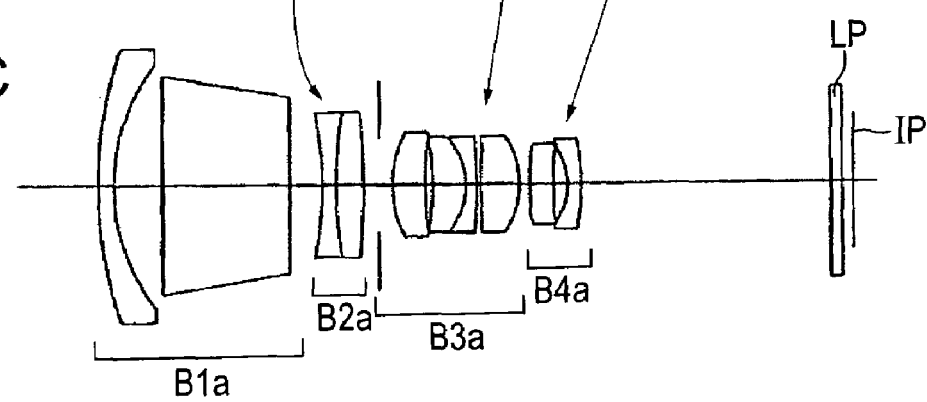
Figure 5:
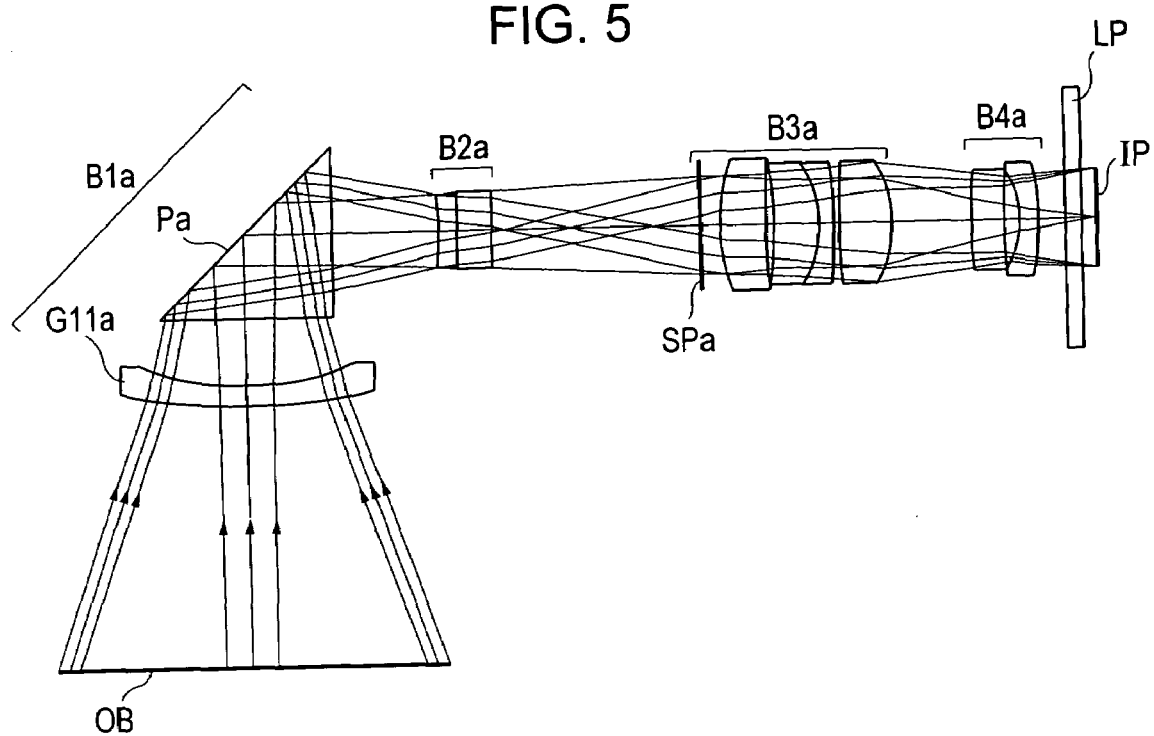
FIG. 5 illustrates a diagram showing the actual optical path in the zoom lens according to the second exemplary embodiment.
Figure 6A:
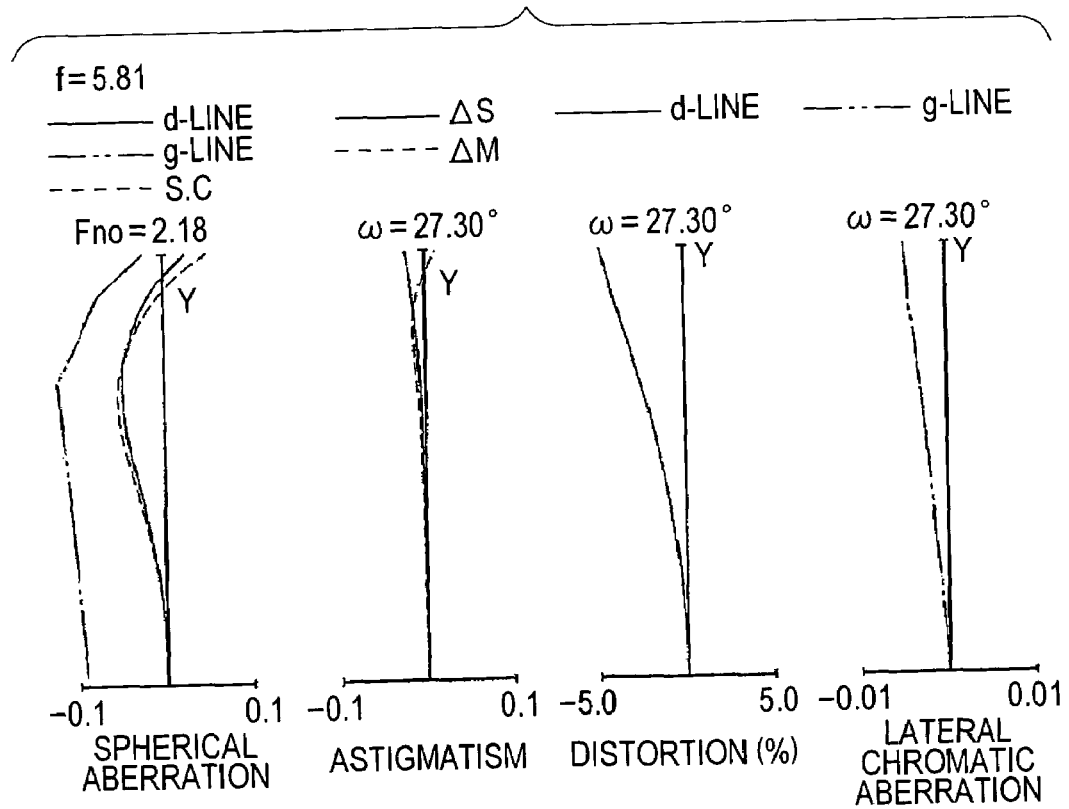
FIGS. 6A to 6C illustrate aberration diagrams of the zoom lens according to the second exemplary embodiment.
Figure 6B:
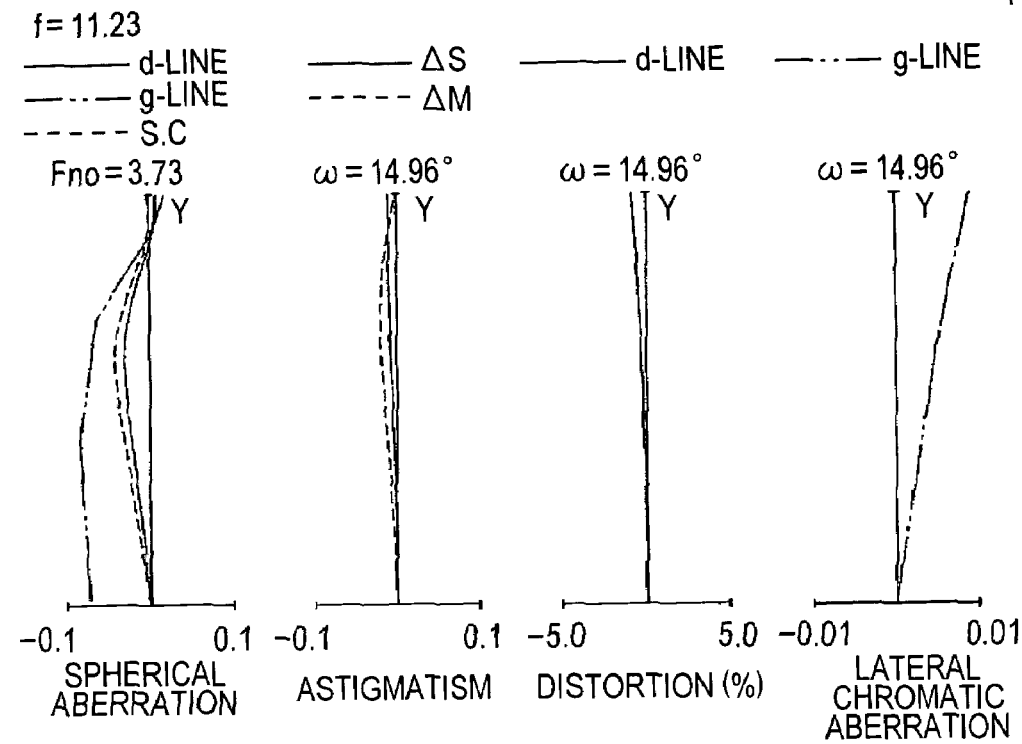
Figure 6C:
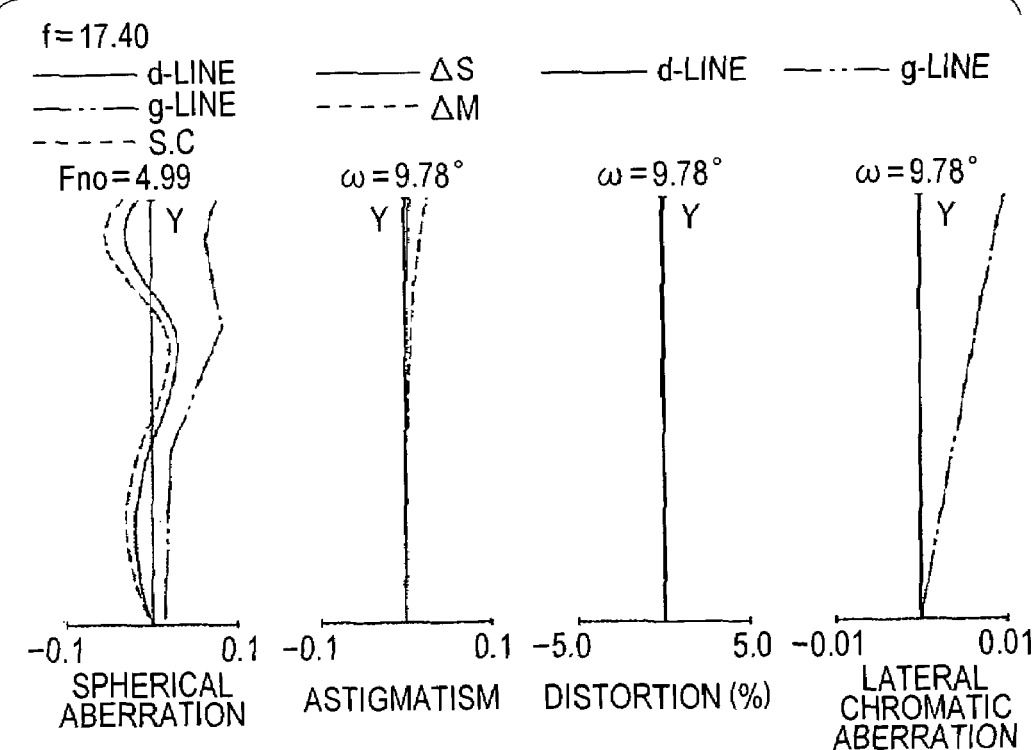

FIGS. 4A to 4C illustrate sectional views of the zoom lens according to the second exemplary embodiment at the wide-angle end, the middle zoom position, and the telephoto end, respectively. FIG. 5 illustrates a diagram showing the actual optical path in the zoom lens according to the second exemplary embodiment. FIGS. 6A to 6C illustrate aberration diagrams of the zoom lens according to the second exemplary embodiment at the wide-angle end, the middle zoom position, and the telephoto end, respectively.

Figure 7A:
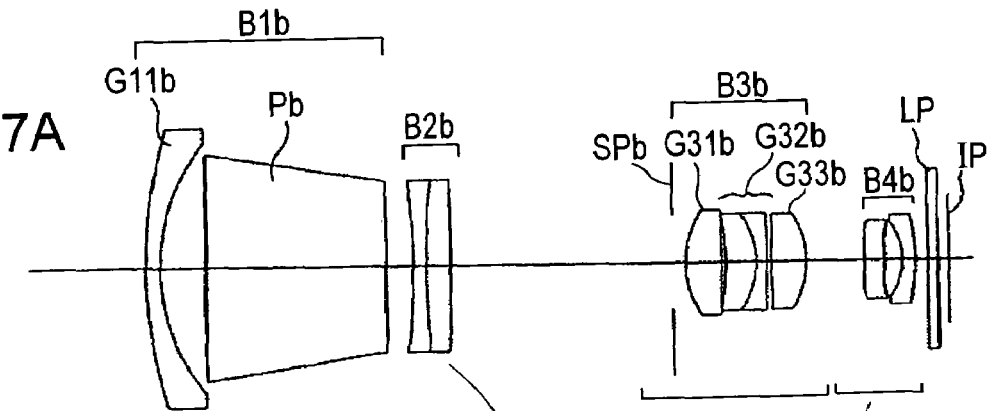
FIGS. 7A to 7C illustrate optical sectional views of a zoom lens according to a third exemplary embodiment.
Figure 7B:
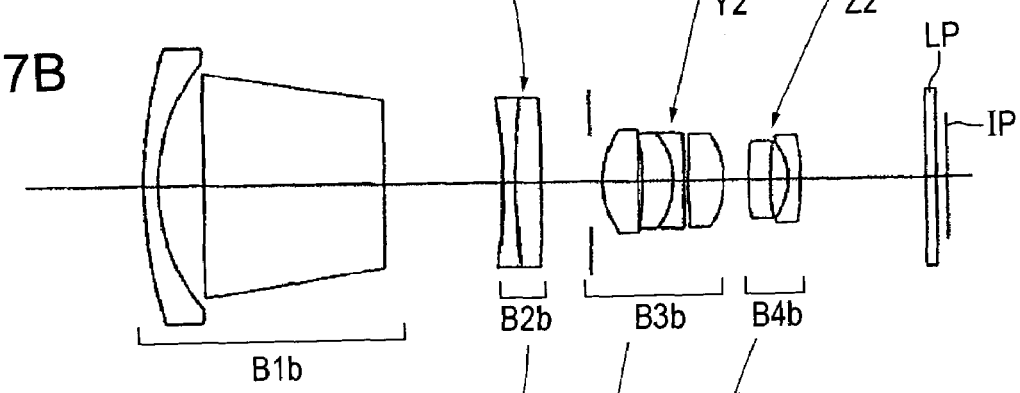
Figure 7C:
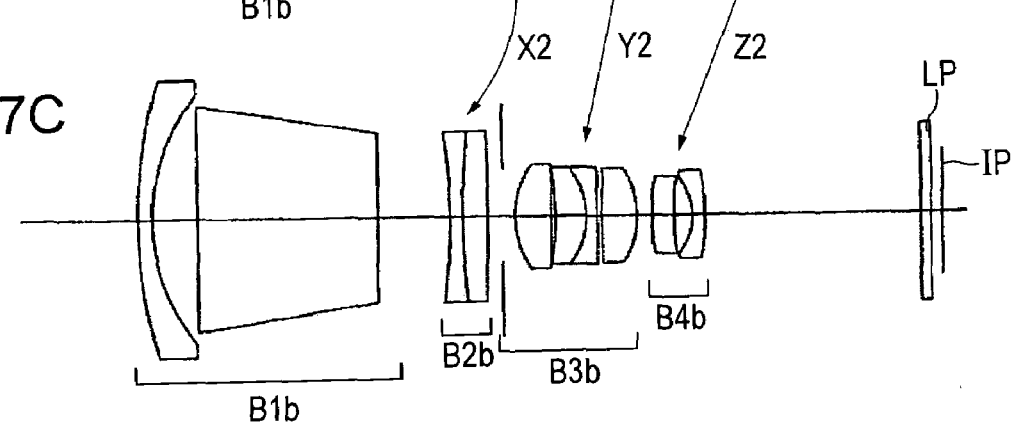
Figure 8:
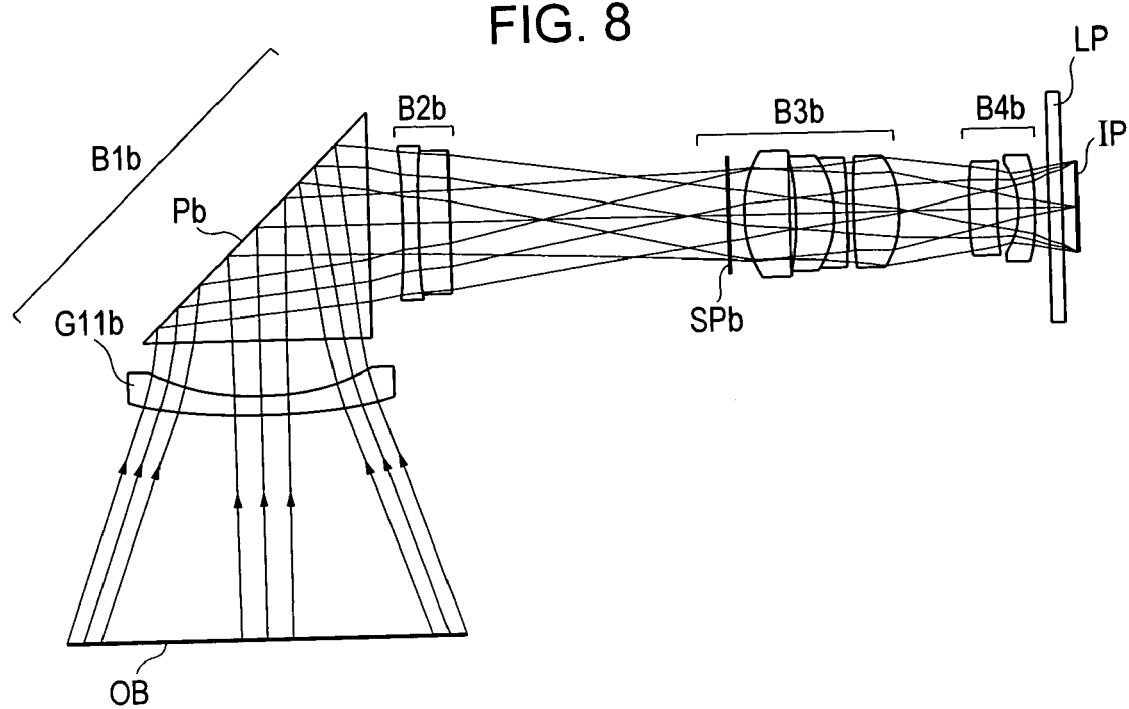
FIG. 8 illustrates a diagram showing the actual optical path in the zoom lens according to the third exemplary embodiment.
Figure 9A:
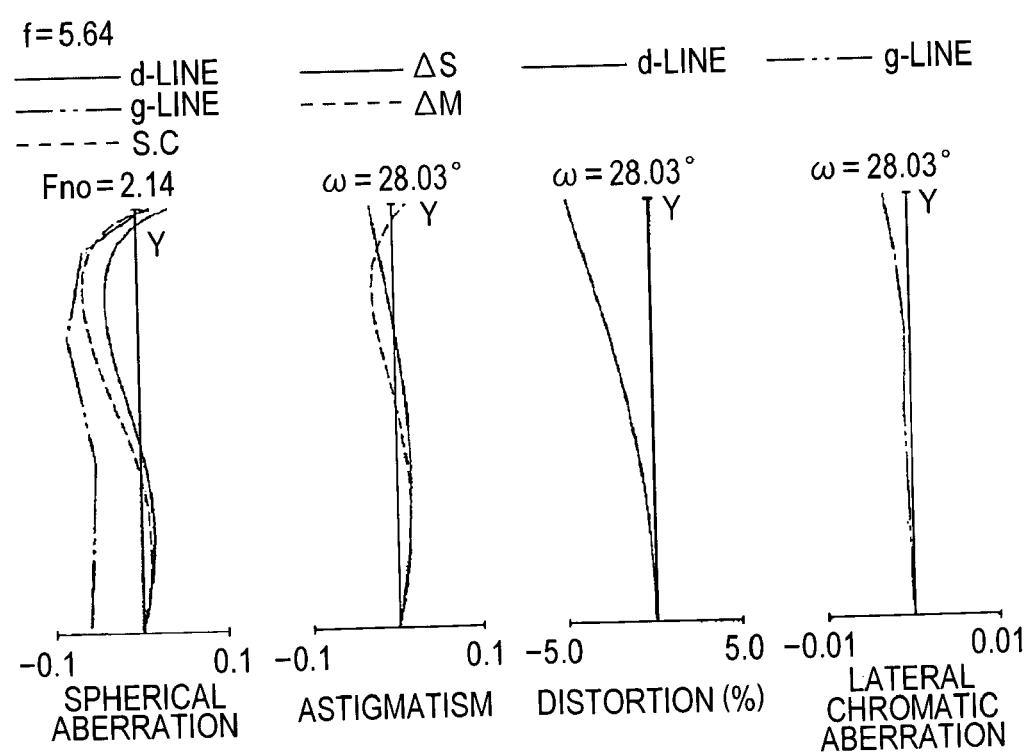
FIGS. 9A to 9C illustrate aberration diagrams of the zoom lens according to the third exemplary embodiment.
Figure 9B:
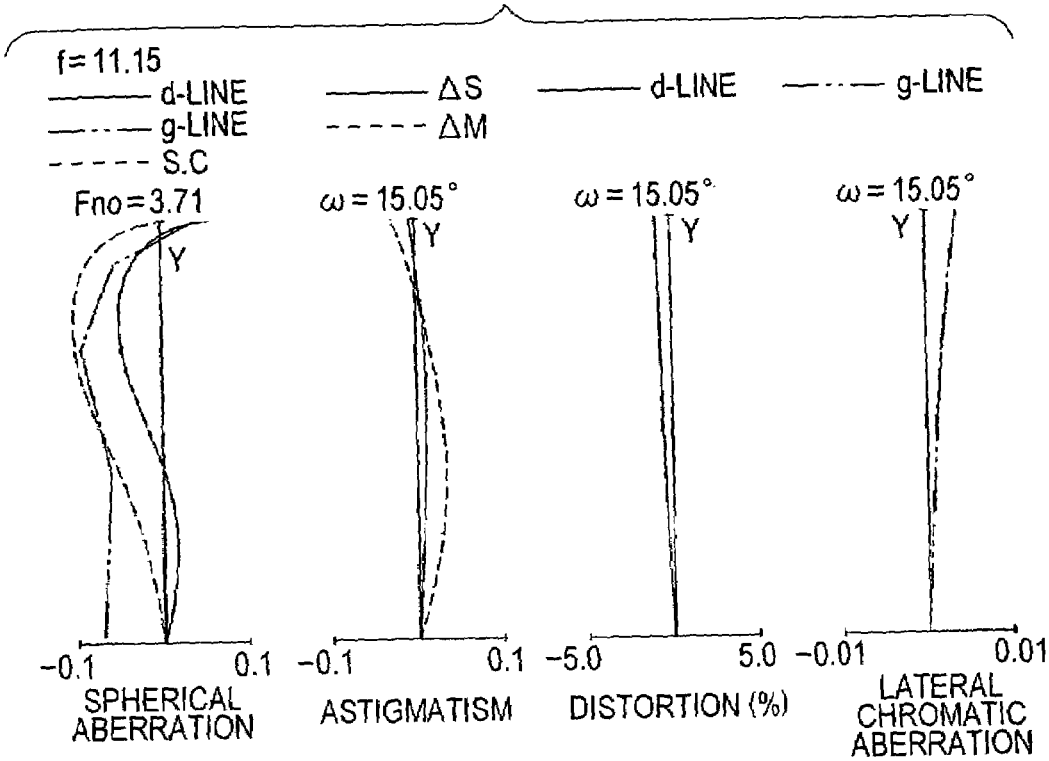
Figure 9C:
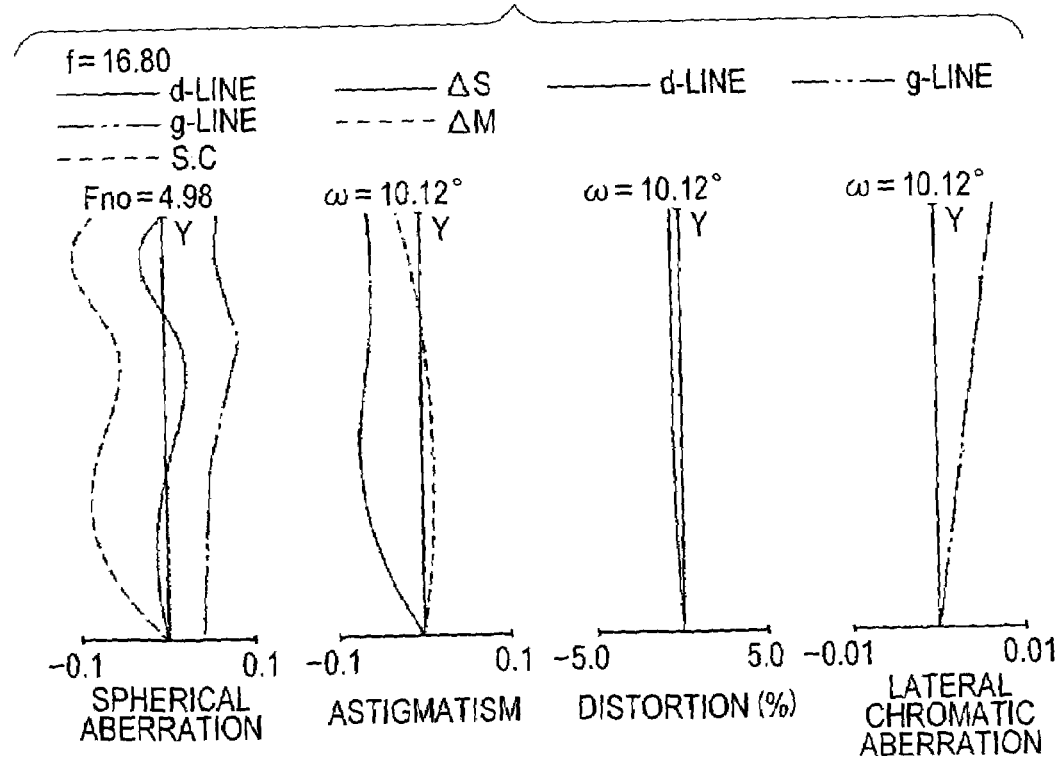

FIGS. 7A to 7C illustrate sectional views of the zoom lens according to the third exemplary embodiment at the wide-angle end, the middle zoom position, and the telephoto end, respectively. FIG. 8 illustrates a diagram showing the actual optical path in the zoom lens according to the third exemplary embodiment. FIGS. 9A to 9C illustrate aberration diagrams of the zoom lens according to the third exemplary embodiment at the wide-angle end, the middle zoom position, and the telephoto end, respectively.

Figure 11:
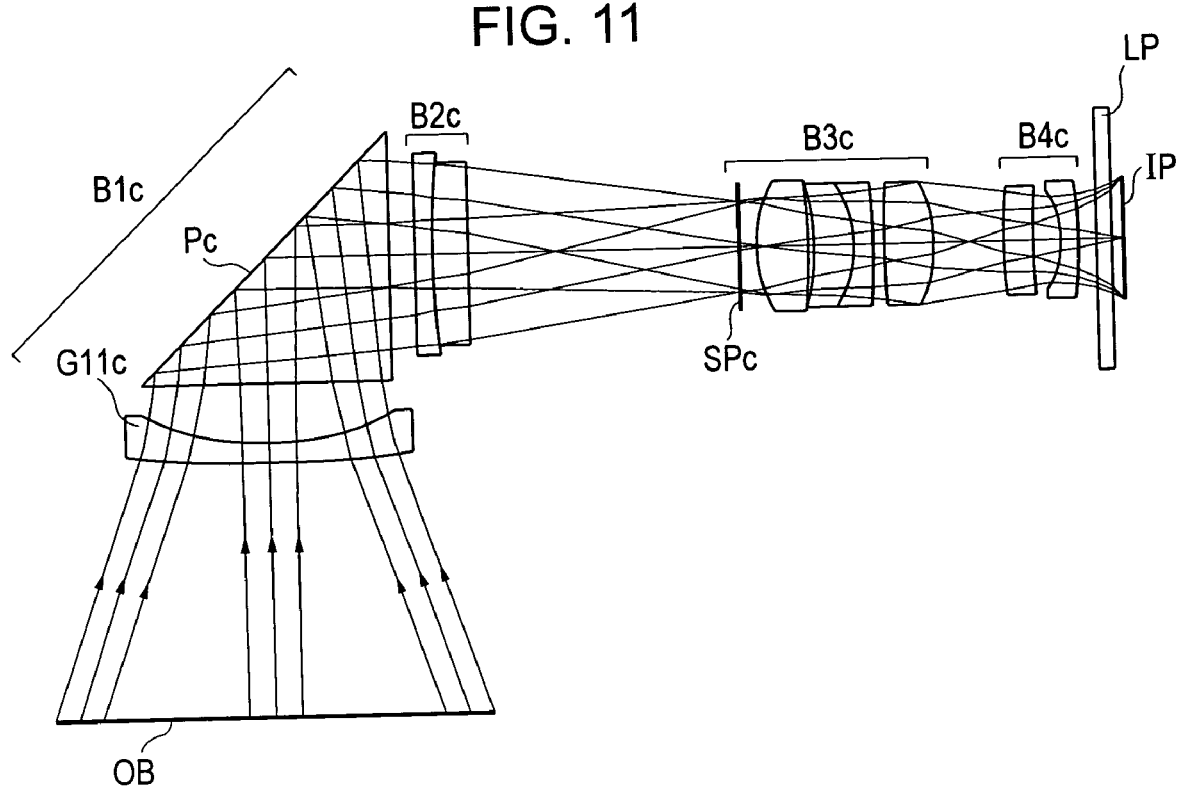
FIG. 11 illustrates a diagram showing the actual optical path in the zoom lens according to the fourth exemplary embodiment.
Figure 12A:
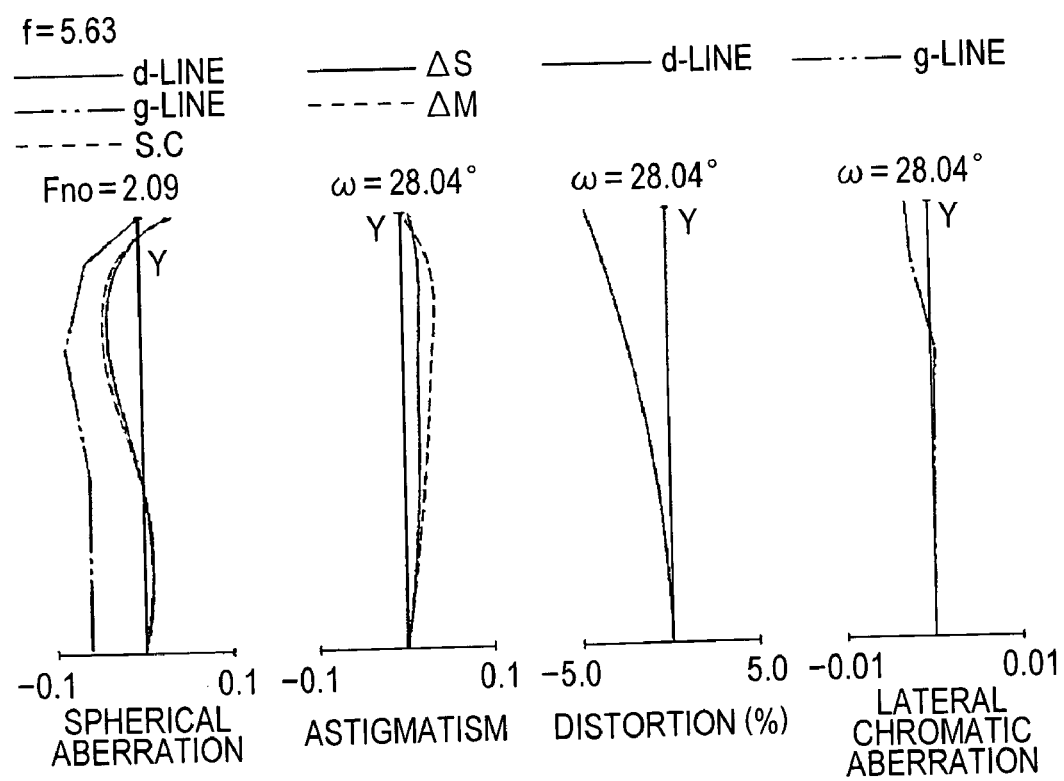
FIGS. 12A to 12C illustrate aberration diagrams of the zoom lens according to the fourth exemplary embodiment.
Figure 12B:
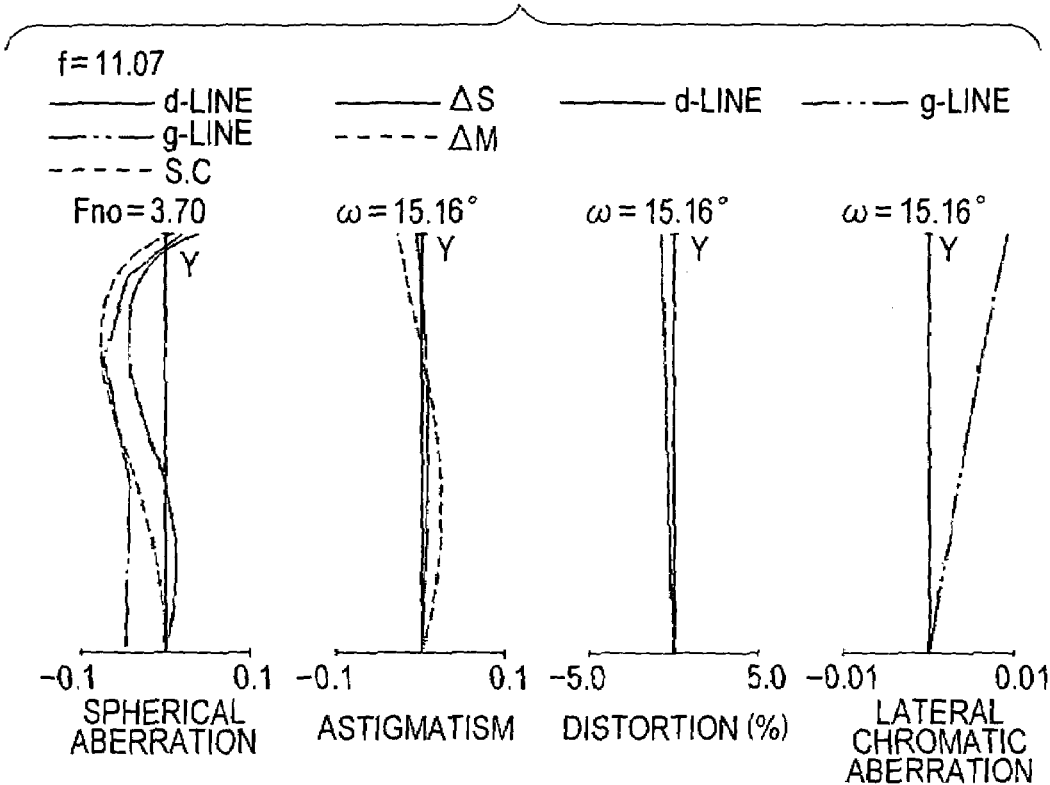
Figure 12C:
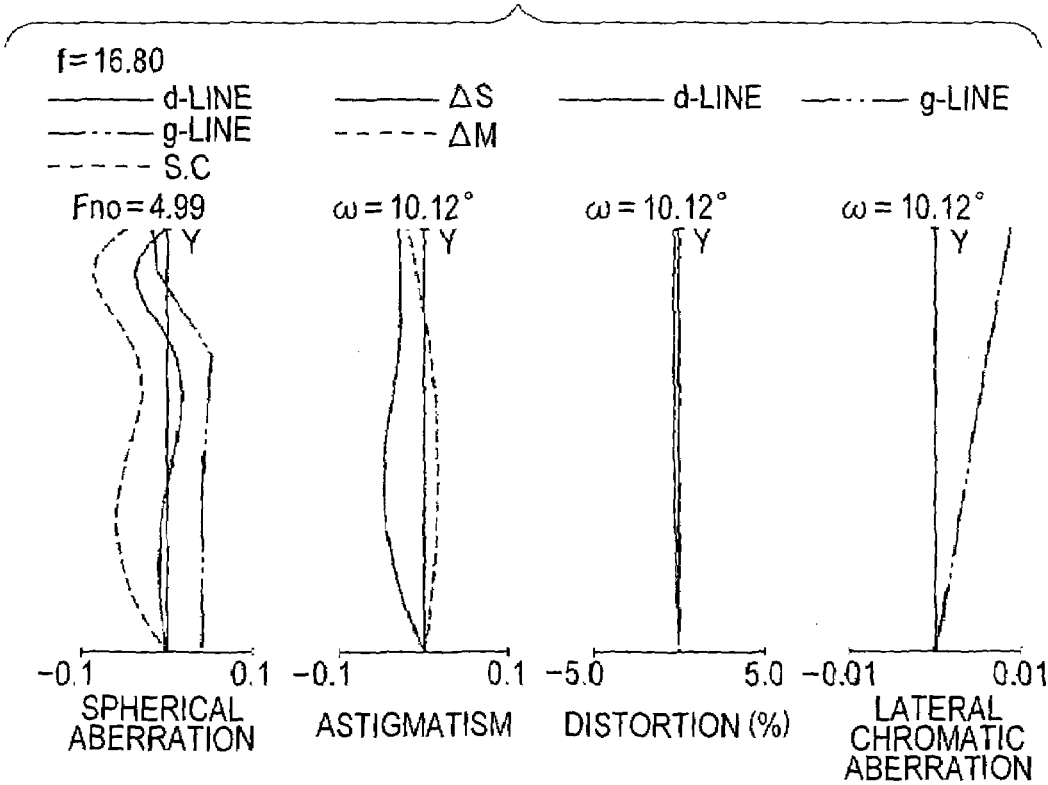

FIGS. 10A to 10C illustrate sectional views of the zoom lens according to the fourth exemplary embodiment at the wide-angle end, the middle zoom position, and the telephoto end, respectively. FIG. 11 illustrates a diagram showing the actual optical path in the zoom lens according to the fourth exemplary embodiment. FIGS. 12A to 12C illustrate aberration diagrams of the zoom lens according to the fourth exemplary embodiment at the wide-angle end, the middle zoom position, and the telephoto end, respectively.

Figure 13A:
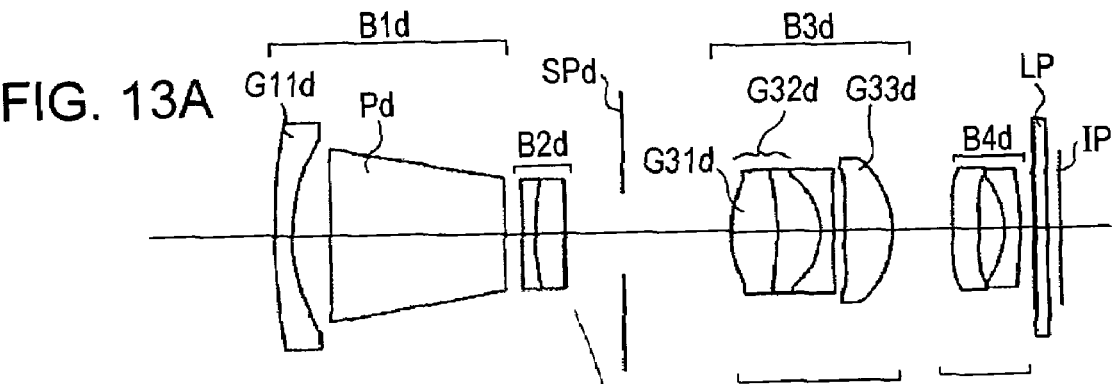
FIGS. 13A to 13C illustrate optical sectional views of a zoom lens according to a fifth exemplary embodiment.
Figure 13B:
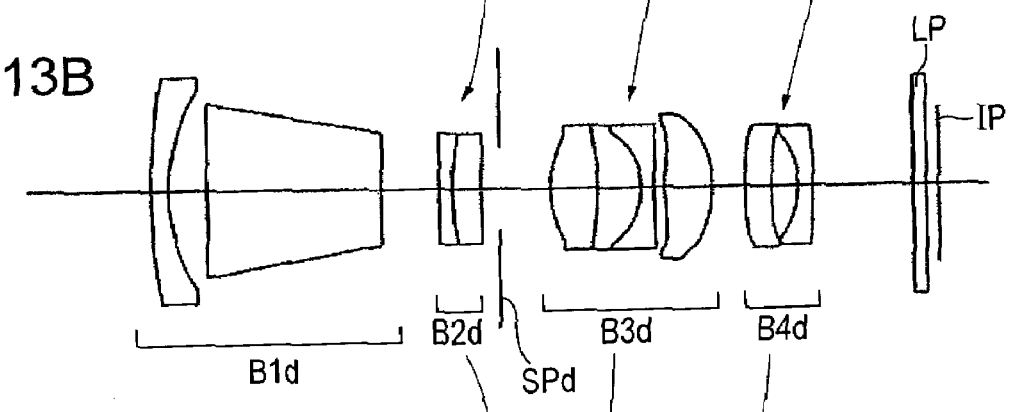
Figure 13C:
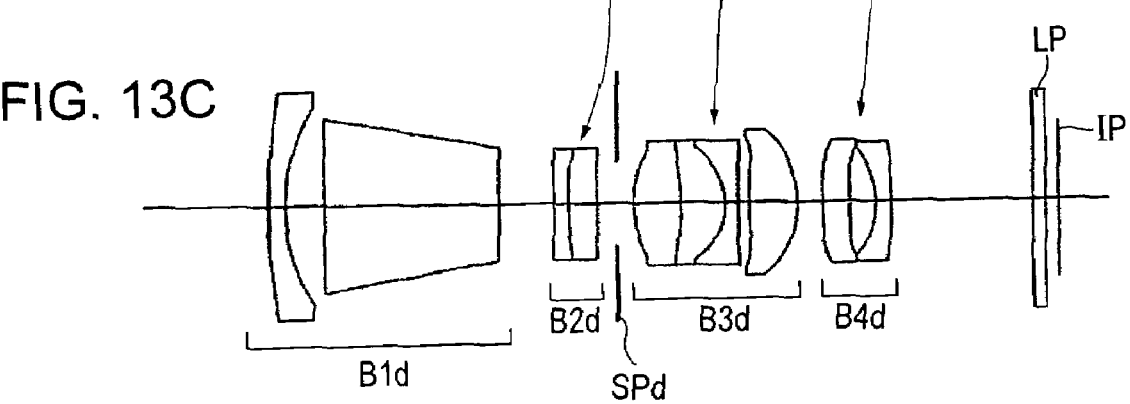
Figure 14:
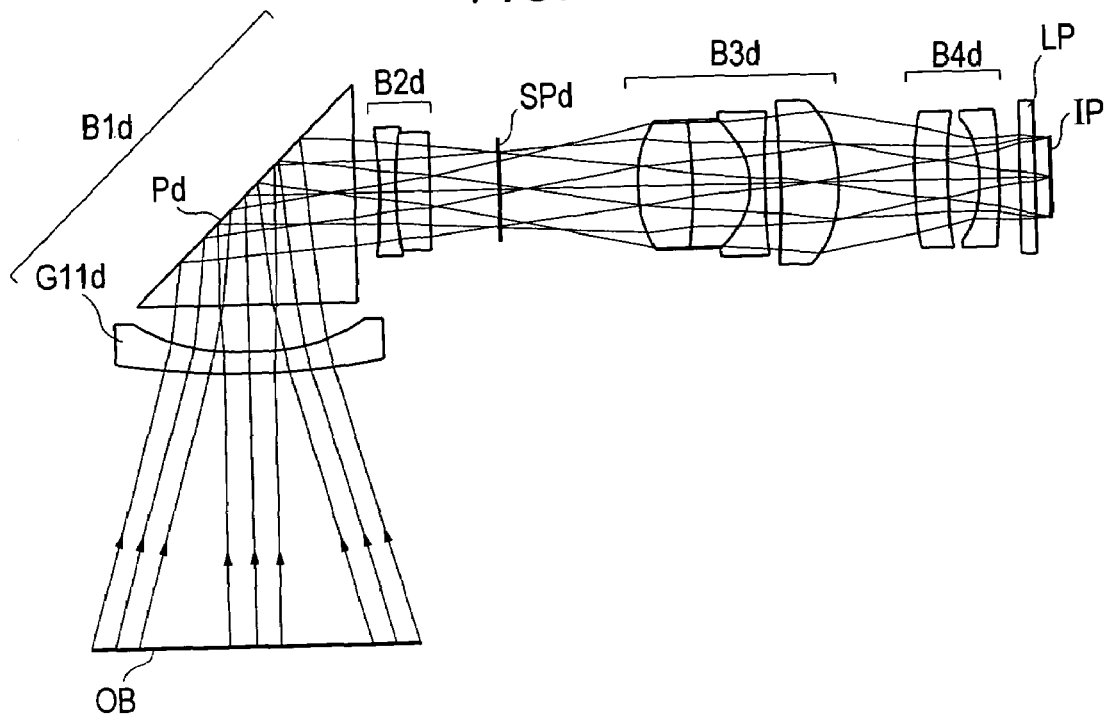
FIG. 14 illustrates a diagram showing the actual optical path in the zoom lens according to the fifth exemplary embodiment.
Figure 15A:
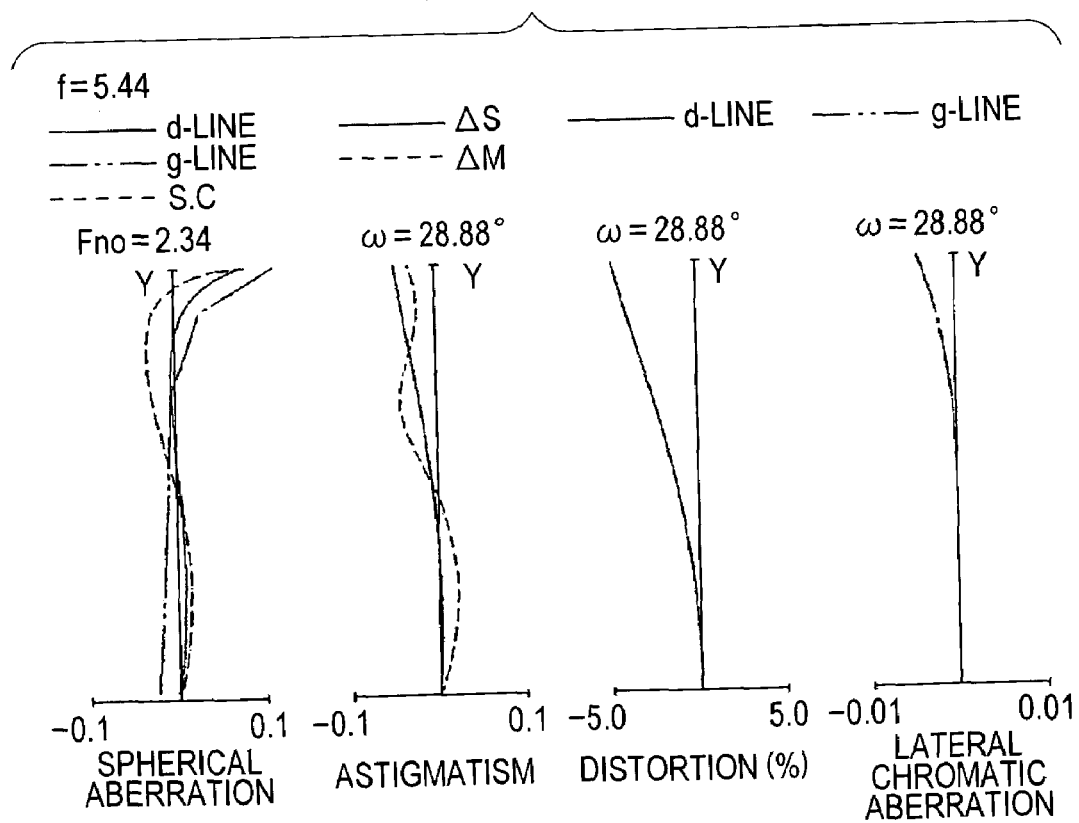
FIGS. 15A to 15C illustrate aberration diagrams of the zoom lens according to the fifth exemplary embodiment.
Figure 15B:
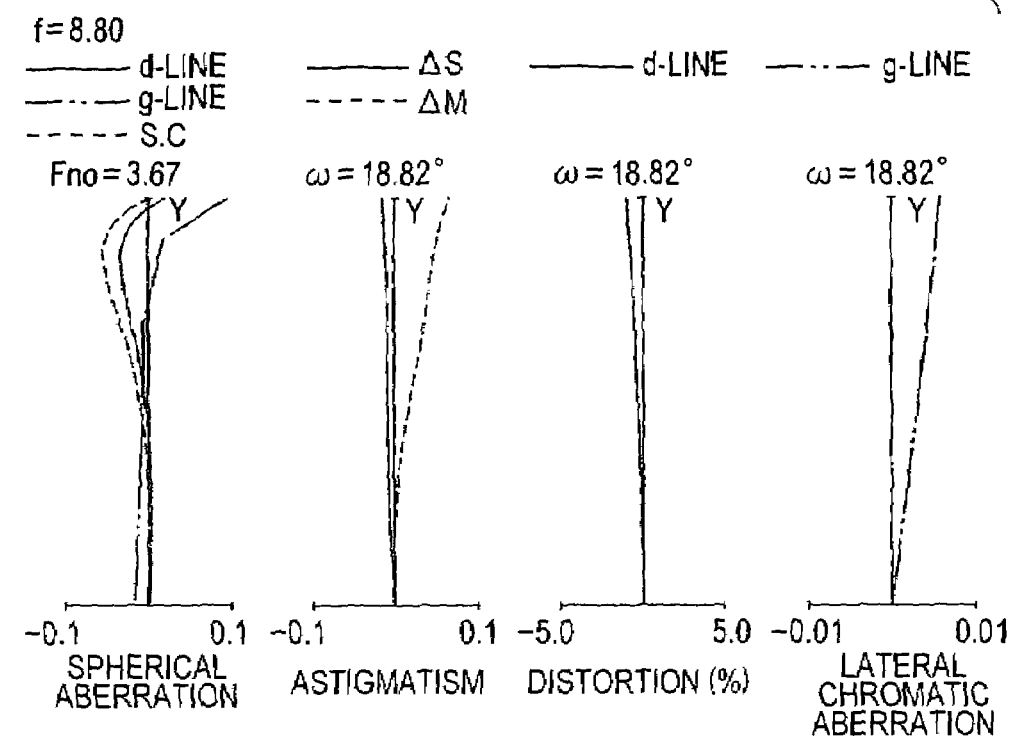
Figure 15C:
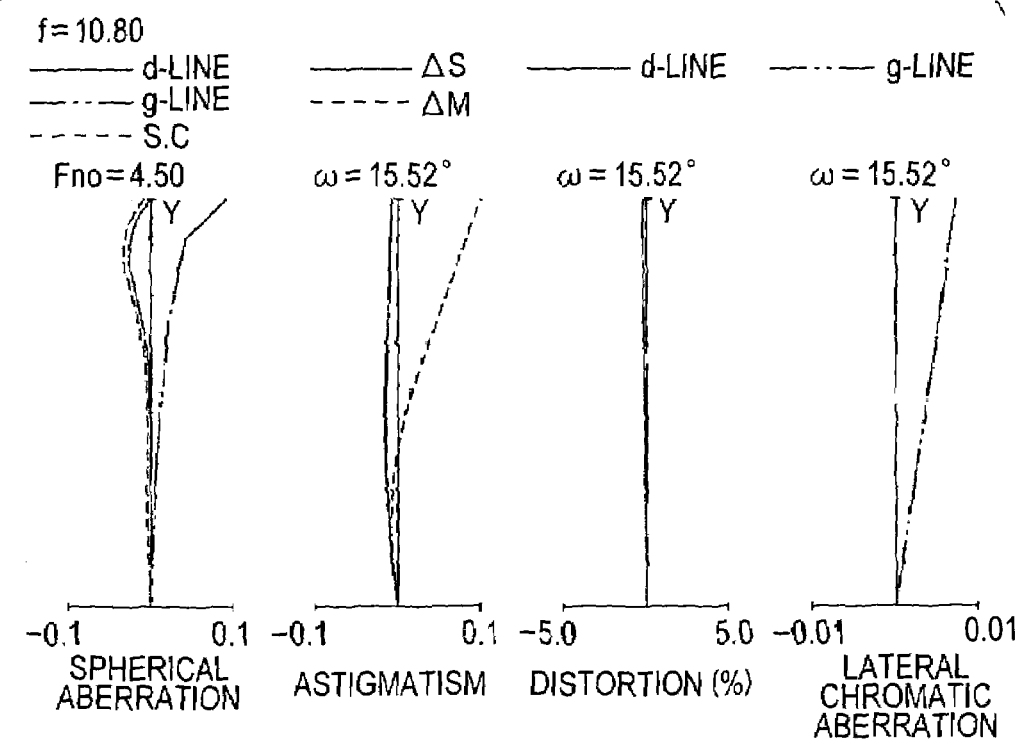

FIGS. 13A to 13C illustrate sectional views of the zoom lens according to the fifth exemplary embodiment at the wide-angle end, the middle zoom position, and the telephoto end, respectively. FIG. 14 illustrates a diagram showing the actual optical path in the zoom lens according to the fifth exemplary embodiment. FIGS. 15A to 15C illustrate aberration diagrams of the zoom lens according to the fifth exemplary embodiment at the wide-angle end, the middle zoom position, and the telephoto end, respectively.

The zoom lens according to each exemplary embodiment is a imaging lens system which can be used in an image pickup apparatus. In each sectional view, the object side (front) is at the left and the image side (back) is at the right.

In the sectional views, B1, B1a, B1b, B1c, and B1d denote a first lens unit having a negative refractive power (optical power is the reciprocal of focal length), B2, B2a, B2b, B2c, and B2d denote a second lens unit having a positive or negative refractive power, B3, B3a, B3b, B3c, and B3d denote a third lens unit having a positive refractive power, and B4, B4a, B4b, B4c, and B4d denote a fourth lens unit having a negative refractive power. SP, Spa, SPb, Spc, and SPd denote an aperture stop (iris diaphragm) that is positioned on the object side of the third lens unit B3, B3a, B3b, B3c, and B3d respectively.

In the first to third and fifth exemplary embodiments, the second lens unit (e.g., B2, B2a, B2b, B2d) can have a negative refractive power. In the fourth exemplary embodiment, the second lens unit (e.g., B2c) can have a positive refractive power.

P, Pa, Pb, Pc, and Pd denote prisms included in the first lens units B1, B1a, B1b, B1c, and B1d respectively and are provided with reflective surfaces for bending the optical path, where OB denotes an object.

LP denotes an optical block corresponding to, for example, an optical filter, a faceplate, a quartz low-pass filter, and an infrared-cut filter, and IP denotes an image plane. When the zoom lens of each exemplary embodiment is used as a taking optical system of a video camera or a digital still camera, the image pickup plane of a solid-state image pickup device (e.g., photoelectric converter, a charged coupled device (CCD) sensor, a metal-oxide semiconductor (CMOS) sensor), is placed on the image plane IP. When the zoom lens of each exemplary embodiment is used as a taking optical system of a film camera (e.g., silver salt film), a photosensitive surface corresponding to a film surface is placed on the image plane IP.

In the aberration diagrams, d and g indicate the d-line and the g-line, respectively, S.C indicates the sine condition, and ΔM and ΔS indicate a meridional image plane and a sagittal image plane, respectively. The distortion is shown by the d-line, and the lateral chromatic aberration is shown by the g-line.

In each exemplary embodiment, the wide-angle end and the telephoto end are zoom positions corresponding to the states in which the lens unit for changing the magnification is at one and the other ends of a moveable range.

In each exemplary embodiment, during zooming from the wide-angle end to the telephoto end, the third and fourth lens units (e.g., B3-B3d and B4-B4d) can move toward the object side such that the distance (space) between the second and third lens units (e.g., B2-B2d and B3-B3d) and the distance (space) between the third and fourth lens units (e.g., B3-B3d and B4-B4d) are both reduced. In addition, the second lens unit (e.g., B2-B2d) can move along a locus convex (e.g., (X), (X1), (X2), (X3), (X4)) toward either the object side or the image side. The first lens unit (e.g., B1-B1d) does not have to move along the optical axis for zooming.

According to the lens structure of each exemplary embodiment, the overall optical length can be reduced by an optical effect of the telephoto system in the overall optical system. As a result, a compact zoom lens can be obtained.

In addition, the first lens unit (e.g., B1, B1a, B1b, B1c, B1d) includes a lens element (optical member) (e.g., G11, G11a, G11b, G11c, G11d) having a negative refractive power. Accordingly, the entrance pupil position can be set to an adequate position, which allows balanced settings of the outer diameters of the lenses near the pupil position in the optical system. In addition, on-axis and off-axis optical paths can be adequately set, and aberrations can be reduced to improve the image quality.

The zooming function of the optical system can be obtained by changing the positional relationship between the third and fourth lens units (e.g., B3-B3d and B4-B4d).

The fourth lens unit (e.g., B4-B4d) can be configured to form an image of the object obtained by the combination of the first, second, and third lens units (e.g., B1-B1d to B3-B3d). Then, the lateral magnification can be changed by changing the position of the fourth lens unit (e.g., B4-B4d) with respect to the third lens unit (e.g., B3-B3d), with the magnification changed accordingly. The movement of the image-forming position caused when the magnification is changed can be compensated for by moving the third and fourth lens units (e.g., B3-B3d and B4-B4d) at the same time.

In addition, the second lens unit (e.g., B2-B2d) can also be moved to reduce the curvature of the image field caused during zooming, so that high-quality images can be obtained even when the zoom ratio is high.

The first lens unit (e.g., B1-B1d) includes a reflective member (e.g., prism P, Pa, Pb, Pc, Pd) that deflects the light beam on the optical axis (optical path) by a designed angle (e.g., approximately 90°). Accordingly, the lens thickness in the direction toward the object (along the depth of the image pickup apparatus) can be reduced.

In each exemplary embodiment, one or more of the conditional expressions shown below can be satisfied to obtain high image quality with a small system.

When $F12w$ is the combined focal length of the first and second lens units (e.g., B1-B1d and B2-B2d) at the wide-angle end, $F3$ and $F4$ illustrate the focal lengths of the third and fourth lens units (e.g., B3-B3d and B4-B4d), respectively, $Fw$ is the combined focal length of the overall lens system at the wide-angle end, and $\beta 4w$ is the imaging magnification of the fourth lens unit (e.g., B4-B4d), one or more of the following expressions can be satisfied:

$$F2 < |F12w/Fw| < 6 \qquad (1)$$

where $F12w < 0$ $$0.8 < F3/Fw < 1.6 \qquad (2)$$

$$0.8 < |F4/Fw| < 1.5 \qquad (3)$$

$$1 < \beta 4w < 1.7 \qquad (4)$$

$$0.7 < |F3/F4| < 1.5 \qquad (5)$$

Conditional Expression (1) shows a condition for reducing the lens diameters without excessively reducing the back focus and for obtaining high image quality.

When the value of Conditional Expression (1) is above the upper limit, the overall negative refractive power of the first and second lens units (e.g., B1-B1d and B2-B2d) is too low (weak). Therefore, the position of the virtual image of the object formed by the first and second lens units (e.g., B1-B1d and B2-B2d) is shifted toward the object side, and the back focus of the object image formed by the third and fourth lens units (e.g., B3-B3d and B4-B4d), which will be described below, can be reduced. As a result, the diameter of the fourth lens unit (e.g., B4-B4d) can be increased to obtain a certain amount of peripheral light.

When the value of Conditional Expression (1) is below the lower limit, the overall negative refractive power of the first and second lens units (e.g., B1-B1d and B2-B2d) at the telephoto end can be too high. Therefore, a large positive spherical aberration that is difficult to correct with another lens unit can occur.

When the positive refractive power of the third lens unit (e.g., B3-B3d) is too low and the value of Conditional Expression (2) is above the upper limit, the negative refractive power of the fourth lens unit (e.g., B4-B4d) can be reduced to obtain a desired field angle at the wide-angle end. As a result, the second and fourth lens units (e.g., B2-B2d and B4-B4d) can be moved long distances along the optical axis to obtain a certain change in magnification. Accordingly, the size of the overall lens system can be increased.

When the positive refractive power of the third lens unit (e.g., B3-B3d) is too high and the value of Conditional Expression (2) is below the lower limit, the back focus is too short and a space for placing a filter and a cover glass for the image pickup device can be reduced.

Conditional Expression (3) shows a condition of the negative refractive power of the fourth lens unit B4 at the wide-angle end.

When the negative refractive power of the fourth lens unit B4 is low and the value of Conditional Expression (3) is above the upper limit, the magnification-changing effect obtained by the fourth lens unit (e.g., B4-B4d) during zooming can be reduced. Therefore, each lens unit can be moved a long distance to obtain a certain zoom ratio. As a result, the length of the overall lens system can be increased.

When the value of Conditional Expression (3) is below the lower limit, effect of the telephoto system in the overall optical system can be increased and the back focus is excessively reduced. In addition, the diameter of the fourth lens unit (e.g., B4-B4d) can be increased to obtain a certain amount of peripheral light. In addition, large amounts of image-plane distortion and astigmatism can occur.

When the value of Conditional Expression (4) is above the upper limit, the back focus can be excessively reduced. When the value of Conditional Expression (4) is below the lower limit, the length of the overall lens system can be increased.

When the value of Conditional Expression (5) is out of the numerical range, it can be difficult to obtain high-quality images without increasing the size of the optical system.

More specifically, when the refractive power of the fourth lens unit (e.g., B4-B4d) is high relative to that of the third lens unit (e.g., B3-B3d) and the value of Conditional Expression (5) is above the upper limit, the overall length of the optical system can be effectively reduced since the effect of the telephoto system can be increased. However, large high-order off-axis aberration and lateral chromatic aberration, that are difficult to correct, can occur at the fourth lens unit.

In reverse, when the value of Conditional Expression (5) is below the lower limit, the overall length of the optical system can be increased. In addition, a large spherical aberration can occur at the third lens unit (e.g., B3-B3d).

The numerical ranges of Conditional Expressions (1) to (5) can also be set as follows:

$$2.5 < |F12w/Fw| < 5 \qquad (1a)$$

$$1.0 < |F3/Fw| < 1.4 \qquad (2a)$$

$$0.9 < |F4/Fw| < 1.4 \qquad (3a)$$

$$1.1 < \beta 4w < 1.5 \qquad (4a)$$

$$0.9 < |F3/F4| < 1.4 \qquad (5a)$$

To obtain a small, high-performance optical system including small number of lenses, it is effective to place one or more aspherical surfaces in each of the third and fourth lens units (e.g., B3-B3d and B4-B4d).

When the third lens unit (e.g., B3-B3d) can have an aspherical surface, it can be configured to reduce mainly a spherical aberration. In addition, when the fourth lens unit (e.g., B4-B4d) can have an aspherical surface, the off-axis aberrations can be reduced with a good balance.

To ensure the image quality over the entire zoom area without increasing the outer diameter (effective diameter) of the first lens unit (e.g., B1, B1a, B1b, B1c, and B1d), it is effective to place an aperture stop (e.g., SP, Spa, SPb, SPc, SPd) in the distance (space) between the second and third lens units (e.g., B2, B2a, B2b, B2c, B2d and B3, B3a, B3b, B3c, B3d).

In addition, to improve the image quality and reduce costs, the structures described below can be used.

In each exemplary embodiment, a compound aspherical lens (so-called replica aspherical lens) can be used as the lens having an aspherical surface (aspherical lens) to increase the number of kinds of lenses that can be used in view of productivity.

In addition, for ease of manufacturing, the aspherical lens can be made of a plastic material or any other easily manufactured optical material as known by one of ordinary skill in the relevant arts and equivalents.

An entrance pupil position can be set by moving the aperture stop (e.g., SP-SPd) along the optical axis individually of the lens units during zooming. Alternatively, the aperture stop (e.g., SP-SPd) can also be fixed on the optical axis during zooming to make the mechanical structure simpler.

The lens system can further include a diffractive optical element or a gradient index lens to improve the optical performance.

During shooting, to correct image shake, which degrades the image quality (e.g., caused by hand shake), the deflection angle or the deflection direction can be changed by decentering a lens unit or an element included in the lens unit, by rotating the reflective member, or by moving the reflective member.

Focusing from an object at infinity to an object at a finite distance can be performed by moving the fourth lens unit (e.g., B4-B4d) toward the object side along the optical axis. Alternatively, focusing can also be performed by moving the third lens unit (e.g., B3-B3d) or by moving both the third and fourth lens units (e.g., B3-B3d and B4-B4d) nearly simultaneously toward the object side along the optical axis.

The structure of each lens unit of the first to fifth exemplary embodiments will be described below.

The first lens unit (e.g., B1, B1a, B1b, B1c, and B1d) can include a first lens (e.g., G11, G11a, G11b, G11c, and G11d) having a negative refractive power and a deflecting member P, such as a prism or a reflective mirror, in order from the object side to the image side. The absolute value of the curvature of the first lens G11 on the image side can be larger than that on the object side. When the deflecting member is a prism, the negative lens (e.g., G11-G11d) and the prism can be combined (e.g., cemented together, operatively connected). In addition, the entrance surface or the exit surface of the prism can be a concave surface with a negative refractive power.

The second lens unit (e.g., B2, B2a, B2b, B2c, and B2d) can be a combination lens (e.g., cemented together, operatively connected, touching) including obtained by combining a negative lens and a positive lens together. When the second lens unit (e.g., B2-B2d) has such a structure, the variation in the chromatic aberration during zooming can be reduced and the spherical aberration can be reduced.

The third lens unit (e.g., B3, B3a, B3b, B3c, and B3d) can include a plurality of positive lenses and at least one negative lens. In each exemplary embodiment, the third lens unit (e.g., B3-B3d) includes a positive lens element (e.g., G31, G31a, G31b, G31c, G31d), a negative lens element (e.g., G32, G32a, G32b, G32c, G32d), and a positive lens element (e.g., G33, G33a, G33b, G33c, G33d) in order from the object side to the image side, and reduces the aberrations.

Each lens element is a group of one or more lenses.

In the fifth exemplary embodiment, the third lens unit (e.g., B3d) includes a combination lens obtained by combining three lenses consisting of a positive lens, a positive lens, and a negative lens together and a positive lens.

More specifically, the positive lens element G31d includes two simple positive lenses positioned on the object side, and the negative lens element G32d includes a simple negative lens. In addition, the positive lens element G33d includes a simple positive lens positioned on the image side.

The fourth lens unit (e.g., B4-B4d) can include one or two negative lenses.

When the fourth lens unit (e.g., B4-B4d) includes a simple negative lens, it can have a shape such that the curvature of the lens surface on the image side can be larger than that on the object side.

In addition, to increase the image quality, the fourth lens unit (e.g., B4-B4d) can include a negative lens on the object side of the lens having an aspherical surface on the object side, the negative lens having a concave surface on the image side.

As described above, according to the first to fifth exemplary embodiments, small zoom lenses that provide good optical performances can be obtained.

A lens unit having a small refractive power that does not largely influence the overall refractive-power arrangement can be additionally provided on the object side of the first lens unit (e.g., B1-B1d) or on the image side of the fourth lens unit (e.g., B4-B4d).

Next, first to fifth numerical examples corresponding to the first to fifth exemplary embodiments, respectively, will be described. In each numerical example, i indicates the surface number counted from the object side, Ri indicates the radius of curvature of the $i^{th}$ surface, Di indicates the distance between the $i^{th}$ and $(i+1)^{th}$ lens surfaces, and Ni and vi indicate the refractive index and the Abbe number, respectively, based on the d-line.

Two surfaces that are closest to the image side form an optical block LP. In addition, when x is the displacement from the surface vertex along the optical axis at a height of h from the optical axis, the shape of an aspherical surface is expressed as follows:

$$x=(h^2/R)/[1+\{1-(1+k)(h/R)^2\}^{1/2}]+Ah^2+Bh^4+Ch^6+Dh^8+Eh^{10}$$

where k is the conic constant, A, B, C, D, and E are the aspherical coefficients, and R is the paraxial radius of curvature.

In addition, "e-0X" indicates "×10$^{-X}$". In addition, f is the focal length, Fno is the F number, and ω is the half field angle. Table 1 shows the values of the above-described conditional expressions in each numerical example.

FIRST NUMERICAL EXAMPLE f = 5.82 to 15.50, Fno = 2.34 to 5.00, 2ω = 54.6 to 21.9

| | | | |
|---|---|---|---|
| R1 = 17.420 | D1 = 0.80 | N1 = 1.696797 | ν1 = 55.5 |
| R2 = 9.165 | D2 = 2.50 | | |
| R3 = ∞ | D3 = 6.50 | N2 = 1.696797 | ν2 = 55.5 |
| R4 = ∞ | D4 = variable | | |

-continued

| | | | |
|---|---|---|---|
| R5 = −13.555 | D5 = 0.70 | N3 = 1.696797 | ν3 = 55.5 |
| R6 = 50.746 | D6 = 1.30 | N4 = 1.834000 | ν4 = 37.2 |
| R7 = −22.278 | D7 = variable | | |
| R8 = diaphragm | D8 = 0.70 | | |
| R9 = 5.953 | D9 = 1.70 | N5 = 1.733997 | ν5 = 51.5 |
| R10 = 20.439 | D10 = 0.25 | | |
| R11 = −13.273 | D11 = 1.70 | N6 = 1.719995 | ν6 = 50.2 |
| R12 = −3.864 | D12 = 0.60 | N7 = 1.800999 | ν7 = 35.0 |
| R13 = −38.096 | D13 = 0.20 | | |
| *R14 = 13.106 | D14 = 1.70 | N8 = 1.487490 | ν8 = 70.2 |
| *R15 = −4.634 | D15 = variable | | |
| *R16 = 159.392 | D16 = 1.50 | N9 = 1.491710 | ν9 = 57.4 |
| *R17 = 112.510 | D17 = 0.60 | | |
| R18 = −3.771 | D18 = 0.70 | N10 = 1.729157 | ν10 = 54.7 |
| R19 = −18.062 | D19 = variable | | |
| R20 = ∞ | D20 = 0.60 | N11 = 1.516330 | ν11 = 64.1 |
| R21 = ∞ | | | |

| | Focal Length | | |
|---|---|---|---|
| Variable Distance | 5.82 | 10.46 | 15.50 |
| D4 | 2.51 | 0.73 | 1.19 |
| D7 | 7.30 | 5.16 | 0.80 |
| D15 | 2.68 | 0.97 | 0.49 |
| D19 | 1.00 | 6.62 | 11.01 |

Aspherical Coefficients

| 14th Surface: | k = −2.39711e+01 |
|---|---|
| | A = 0  B = −2.63697e−03  C = −3.10017e−04 |
| | D = −2.70261e−06  E = −6.08507e−06 |
| 15th Surface: | k = 3.75824e−01 |
| | A = 0  B = 3.45097e−04  C = −1.78596e−04 |
| | D = 1.09833e−05  E = −4.36814e−06 |
| 16th Surface: | k = −4.70761e+06 |
| | A = 0  B = 6.47376e−03  C = −2.44585e−04 |
| | D = 1.35856e−04  E = −1.02447e−05 |
| 17th Surface: | k = −3.93361e+06 |
| | A = 0  B = 5.70058e−03  C = 2.84537e−04 |
| | D = −2.77559e−05  E = 2.99998e−05 |

SECOND NUMERICAL EXAMPLE

| f = 5.81 to 17.40, Fno = 2.17 to 5.00, 2ω = 54.6 to 19.6 | | | |
|---|---|---|---|
| R1 = 22.207 | D1 = 0.80 | N1 = 1.696797 | ν1 = 55.5 |
| R2 = 10.567 | D2 = 2.50 | | |
| R3 = ∞ | D3 = 6.50 | N2 = 1.696797 | ν2 = 55.5 |
| R4 = ∞ | D4 = variable | | |
| R5 = −17.860 | D5 = 0.70 | N3 = 1.696797 | ν3 = 55.5 |
| R6 = 22.922 | D6 = 1.40 | N4 = 1.834000 | ν4 = 37.2 |
| R7 = −37.907 | D7 = variable | | |
| R8 = diaphragm | D8 = 0.70 | | |
| R9 = 5.861 | D9 = 1.70 | N5 = 1.733997 | ν5 = 51.5 |
| R10 = 16.392 | D10 = 0.40 | | |
| R11 = −13.982 | D11 = 1.70 | N6 = 1.719995 | ν6 = 50.2 |
| R12 = −3.927 | D12 = 0.60 | N7 = 1.800999 | ν7 = 35.0 |
| R13 = −33.158 | D13 = 0.20 | | |
| *R14 = 14.057 | D14 = 2.00 | N8 = 1.487490 | ν8 = 70.2 |
| *R15 = −4.784 | D15 = variable | | |
| *R16 = 1044.095 | D16 = 1.20 | N9 = 1.491710 | ν9 = 57.4 |
| *R17 = −2467.527 | D17 = 0.70 | | |
| R18 = −3.634 | D18 = 0.70 | N10 = 1.729157 | ν10 = 54.7 |
| R19 = −13.932 | D19 = variable | | |
| R20 = ∞ | D20 = 0.60 | N11 = 1.516330 | ν11 = 64.1 |
| R21 = ∞ | | | |

| | Focal Length | | |
|---|---|---|---|
| Variable Distance | 5.81 | 11.23 | 17.40 |
| D4 | 4.02 | 1.66 | 1.69 |
| D7 | 7.98 | 5.58 | 0.80 |
| D15 | 2.96 | 1.01 | 0.55 |
| D19 | 1.00 | 7.71 | 12.93 |

Aspherical Coefficients

| 14th Surface: | k = 1.21465e+01 |
|---|---|
| | A = 0  B = −3.99646e−03  C = −2.24782e−04 |
| | D = 9.20299e−06  E = −3.28205e−06 |
| 15th Surface: | k = 3.31649e−01 |
| | A = 0  B = 4.71148e−04  C = −9.90586e−05 |
| | D = 9.47969e−06  E = −1.90976e−06 |
| 16th Surface: | k = −4.70761e+06 |
| | A = 0  B = 7.60243e−03  C = −1.59383e−04 |
| | D = 1.36597e−04  E = −6.94020e−06 |
| 17th Surface: | k = −3.93361e+06 |
| | A = 0  B = 5.98738e−03  C = 5.26927e−04 |
| | D = −8.13470e−05  E = 4.19792e−05 |

THIRD NUMERICAL EXAMPLE

| f = 5.64 to 16.80, Fno = 2.13 to 5.00, 2ω = 56.0 to 20.2 | | | |
|---|---|---|---|
| R1 = 26.248 | D1 = 0.80 | N1 = 1.696797 | ν1 = 55.5 |
| R2 = 11.139 | D2 = 2.50 | | |
| R3 = ∞ | D3 = 10.00 | N2 = 1.696797 | ν2 = 55.5 |
| R4 = ∞ | D4 = variable | | |
| R5 = −34.597 | D5 = 0.70 | N3 = 1.603112 | ν3 = 60.6 |
| R6 = 43.046 | D6 = 1.40 | N4 = 1.805181 | ν4 = 25.4 |
| R7 = −140.373 | D7 = variable | | |
| R8 = diaphragm | D8 = 0.70 | | |
| R9 = 5.194 | D9 = 2.00 | N5 = 1.487490 | ν5 = 70.2 |
| R10 = −164.837 | D10 = 0.25 | | |
| R11 = −14.903 | D11 = 1.70 | N6 = 1.666718 | ν6 = 48.3 |
| R12 = −4.462 | D12 = 0.60 | N7 = 1.834000 | ν7 = 37.2 |
| R13 = −64.758 | D13 = 0.20 | | |
| *R14 = 13.569 | D14 = 2.00 | N8 = 1.487490 | ν8 = 70.2 |
| *R15 = −5.014 | D15 = variable | | |
| *R16 = 88.288 | D16 = 1.20 | N9 = 1.491710 | ν9 = 57.4 |
| *R17 = 67.332 | D17 = 1.00 | | |
| R18 = −3.408 | D18 = 0.70 | N10 = 1.729157 | ν10 = 54.7 |
| R19 = −12.646 | D19 = variable | | |
| R20 = ∞ | D20 = 0.60 | N11 = 1.516330 | ν11 = 64.1 |
| R21 = ∞ | | | |

| | Focal Length | | |
|---|---|---|---|
| Variable Distance | 5.64 | 11.15 | 16.80 |
| D4 | 1.50 | 6.60 | 4.01 |
| D7 | 12.31 | 2.71 | 0.80 |
| D15 | 3.17 | 1.40 | 0.88 |
| D19 | 0.70 | 6.97 | 12.00 |

Aspherical Coefficients

| 14th Surface: | k = 1.49021e+01 |
|---|---|
| | A = 0  B = −3.74979e−03  C = −2.23417e−04 |
| | D = 1.27559e−05  E = −3.03564e−06 |
| 15th Surface: | k = 2.94165e−01 |
| | A = 0  B = 4.67205e−04  C = −1.33565e−04 |
| | D = 1.28139e−05  E = −1.54544e−06 |
| 16th Surface: | k = −4.70761e+06 |
| | A = 0  B = 6.90793e−03  C = −3.09883e−04 |
| | D = 9.86846e−05  E = −1.24701e−06 |
| 17th Surface: | k = −3.93361e+06 |
| | A = 0  B = 5.49110e−03  C = −1.23267e−04 |
| | D = −1.25373e−06  E = 2.46770e−05 |

FOURTH NUMERICAL EXAMPLE f = 5.63 to 16.80, Fno = 2.08 to 5.00, 2ω = 56.1 to 20.2

| | | | |
|---|---|---|---|
| R1 = 48.153 | D1 = 0.80 | N1 = 1.603112 | ν1 = 60.6 |
| R2 = 11.083 | D2 = 2.30 | | |
| R3 = ∞ | D3 = 10.00 | N2 = 1.772499 | ν2 = 49.6 |
| R4 = ∞ | D4 = variable | | |
| R5 = 199.961 | D5 = 0.70 | N3 = 1.772499 | ν3 = 49.6 |
| R6 = 22.845 | D6 = 1.40 | N4 = 1.805181 | ν4 = 25.4 |
| R7 = 242.865 | D7 = variable | | |
| R8 = diaphragm | D8 = 0.70 | | |
| R9 = 5.245 | D9 = 2.00 | N5 = 1.487490 | ν5 = 70.2 |
| R10 = −35.017 | D10 = 0.25 | | |
| R11 = −12.568 | D11 = 1.70 | N6 = 1.719995 | ν6 = 50.2 |
| R12 = −3.940 | D12 = 0.60 | N7 = 1.834000 | ν7 = 37.2 |
| R13 = −109.961 | D13 = 0.50 | | |
| *R14 = 18.634 | D14 = 2.00 | N8 = 1.583126 | ν8 = 59.4 |
| *R15 = −5.135 | D15 = variable | | |
| *R16 = 151.895 | D16 = 1.20 | N9 = 1.749497 | ν9 = 35.3 |
| *R17 = 121.189 | D17 = 1.00 | | |
| R18 = −3.555 | D18 = 0.70 | N10 = 1.729157 | ν10 = 54.7 |
| R19 = −20.295 | D19 = variable | | |
| R20 = ∞ | D20 = 0.60 | N11 = 1.516330 | ν11 = 64.1 |
| R21 = ∞ | | | |

| | Focal Length | | |
|---|---|---|---|
| Variable Distance | 5.63 | 11.07 | 16.80 |
| D4 | 0.95 | 2.52 | 1.84 |
| D7 | 10.69 | 4.61 | 0.80 |
| D15 | 2.77 | 0.98 | 0.51 |
| D19 | 0.70 | 6.99 | 11.96 |

Aspherical Coefficients

14th Surface: k = 1.66335e+01
A = 0 B = −3.21818e−03 C = −1.86168e−04
D = 5.40611e−06 E = −2.02531e−06

15th Surface: k = 2.53718e−01
A = 0 B = 3.69525e−04 C = −1.49964e−04
D = 1.18370e−05 E = −1.34525e−06

16th Surface: k = −5.25720e+06
A = 0 B = 5.24497e−03 C = −1.79913e−04
D = 7.42054e−05 E = −3.94180e−06

17th Surface: k = −3.87782e+06
A = 0 B = 4.24203e−03 C = 4.38752e−05
D = 2.06324e−05 E = 5.70011e−06

FIFTH NUMERICAL EXAMPLE f = 5.44 to 10.80, Fno = 2.33 to 4.50, 2ω = 57.8 to 31.1

| | | | |
|---|---|---|---|
| R1 = 28.789 | D1 = 0.80 | N1 = 1.603112 | ν1 = 60.6 |
| R2 = 8.451 | D2 = 1.80 | | |
| R3 = ∞ | D3 = 8.00 | N2 = 1.772499 | ν2 = 49.6 |
| R4 = ∞ | D4 = variable | | |
| R5 = −106.294 | D5 = 0.60 | N3 = 1.772499 | ν3 = 49.6 |
| R6 = 13.391 | D6 = 1.30 | N4 = 1.805181 | ν4 = 25.4 |
| R7 = 196.529 | D7 = variable | | |
| R8 = diaphragm | D8 = variable | | |
| R9 = 5.241 | D9 = 2.10 | N5 = 1.487490 | ν5 = 70.2 |
| R10 = −12.689 | D10 = 2.00 | N6 = 1.719995 | ν6 = 50.2 |
| R11 = −3.116 | D11 = 0.60 | N7 = 1.834000 | ν7 = 37.2 |
| R12 = 76.863 | D12 = 0.50 | | |
| *R13 = 16.133 | D13 = 2.20 | N8 = 1.583126 | ν8 = 59.4 |
| *R14 = −4.841 | D14 = variable | | |
| *R15 = 724.667 | D15 = 1.20 | N9 = 1.749497 | ν9 = 35.3 |
| *R16 = 515.103 | D16 = 1.20 | | |
| R17 = −3.899 | D17 = 0.70 | N10 = 1.729157 | ν10 = 54.7 |
| R18 = −23.118 | D18 = variable | | |
| R19 = ∞ | D19 = 0.60 | N11 = 1.516330 | ν11 = 64.1 |
| R20 = ∞ | | | |

| | Focal Length | | |
|---|---|---|---|
| Variable Distance | 5.44 | 8.80 | 10.80 |
| D4 | 0.79 | 2.60 | 2.49 |
| D7 | 2.61 | 0.80 | 0.91 |
| D14 | 2.76 | 1.49 | 1.19 |
| D18 | 0.70 | 4.57 | 6.43 |

Aspherical Coefficients

13th Surface: k = 7.45902e+00
A = 0 B = −3.86276e−03 C = −7.97946e−05
D = −5.25583e−06 E = −1.40582e−06

14th Surface: k = 2.62115e−01
A = 0 B = 1.24566e−04 C = −1.22168e−04
D = 1.28930e−05 E = −1.31993e−06

15th Surface: k = −5.25720e+06
A = 0 B = 5.58683e−03 C = −3.26978e−04
D = 7.10164e−05 E = −2.09598e−06

16th Surface: k = −3.87782e+06
A = 0 B = 5.30136e−03 C = −1.60201e−04
D = 1.71346e−5 E = 1.02599e−05

TABLE 1

| Conditional Expression | 1st Example | 2nd Example | 3rd Example | 4th Example | 5th Example |
|---|---|---|---|---|---|
| (1) |F12w/Fw| | 3.83 | 3.74 | 4.03 | 4.56 | 2.97 |
| (2) F3/Fw | 1.15 | 1.21 | 1.29 | 1.22 | 1.18 |
| (3) |F4/Fw| | 1.14 | 1.20 | 1.13 | 1.03 | 1.12 |
| (4) β4w | 1.38 | 1.37 | 1.34 | 1.36 | 1.34 |
| (5) |F3/F4| | 1.01 | 1.01 | 1.15 | 1.19 | 1.06 |

Next, zoom lenses according to sixth to thirteenth exemplary embodiments will be described. Each of the zoom lenses according to the sixth to thirteenth exemplary embodiments includes three lens units including a first lens unit (e.g., B1e, B1f, B1g, B1h, B1i, B1j, B1k, and B1l) having a negative refractive power, a second lens unit (e.g., B2e, B2f, B2g, B2h, B2i, B2j, B2k, and B2l) having a positive refractive power, and a third lens unit (e.g., B3e, B3f, B3g, B3h, B3i, B3j, B3k, and B3l) having a negative refractive power in order from the object side to the image side.

Figure 16A:
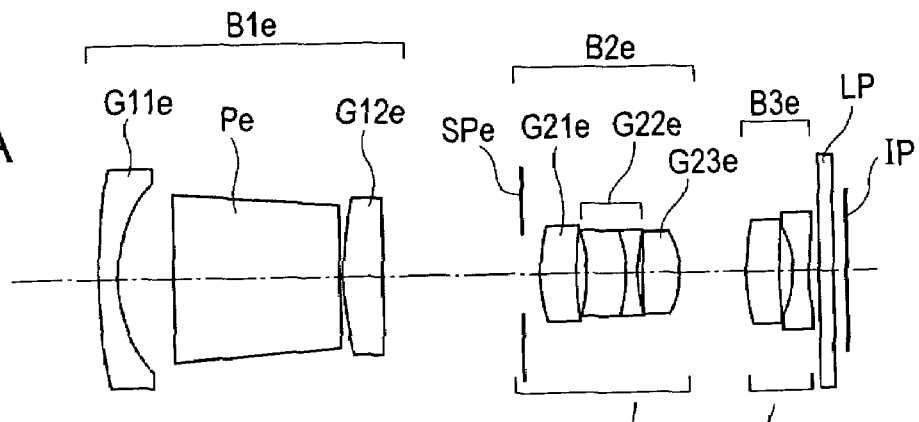
FIGS. 16A to 16C illustrate optical sectional views of a zoom lens according to a sixth exemplary embodiment.
Figure 16B:
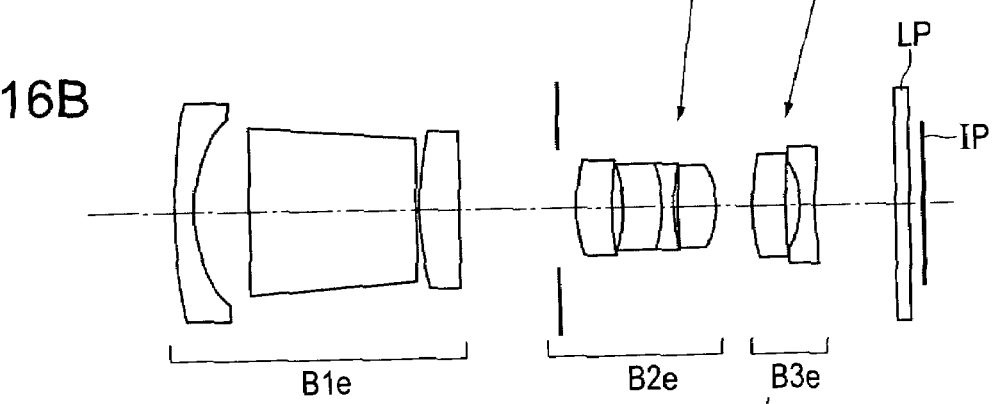
Figure 16C:
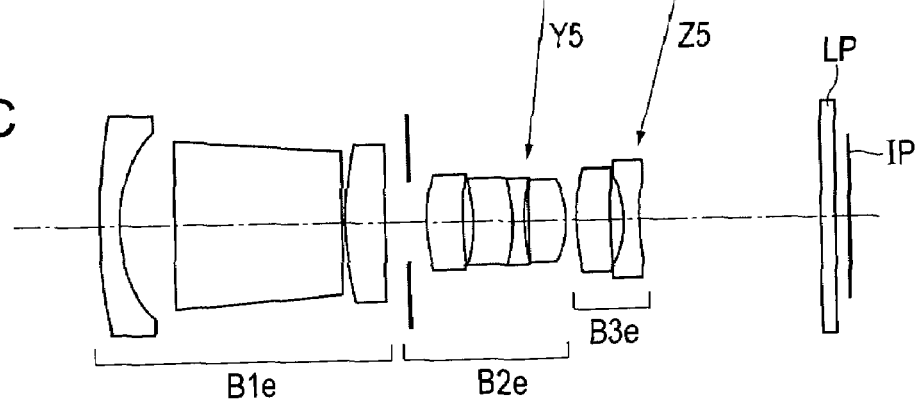
Figure 17:
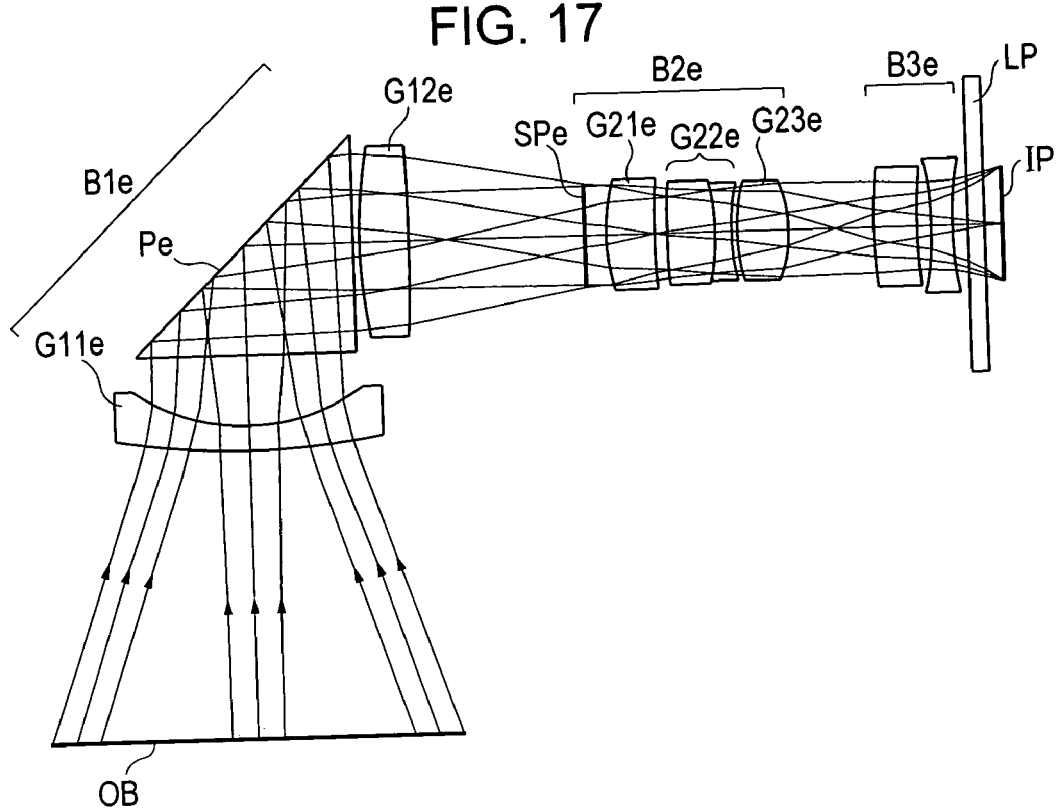
FIG. 17 illustrates a diagram showing the actual optical path in the zoom lens according to the sixth exemplary embodiment.
Figure 18A:
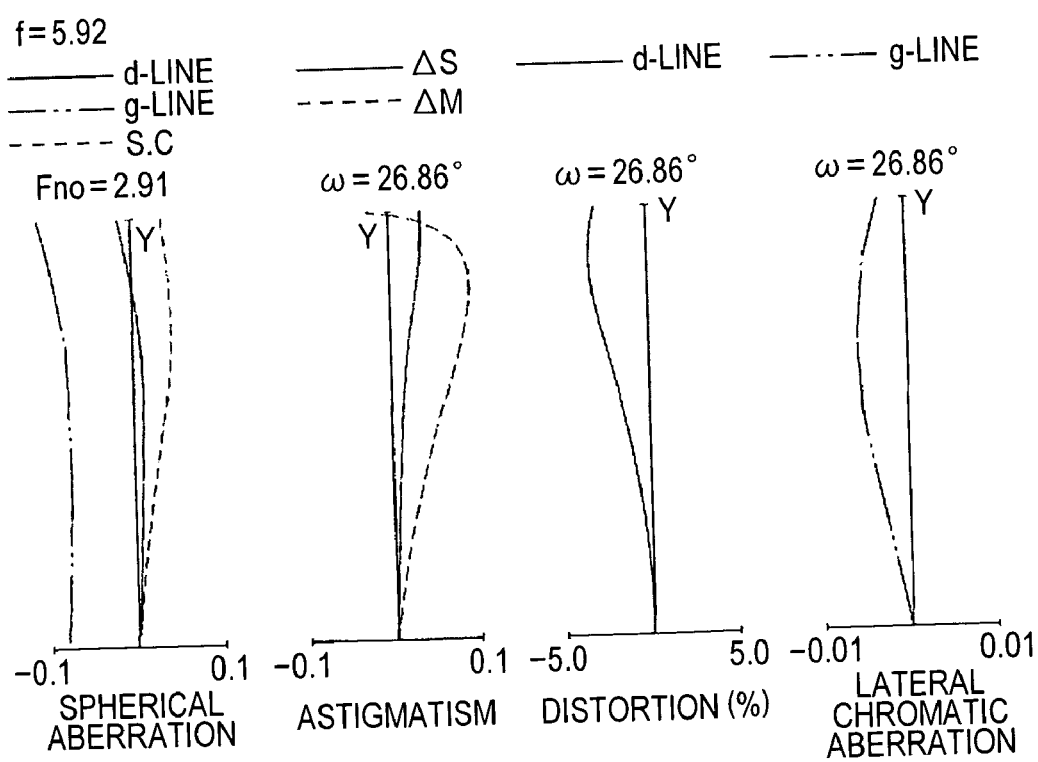
FIGS. 18A to 18C illustrate aberration diagrams of the zoom lens according to the sixth exemplary embodiment.
Figure 18B:
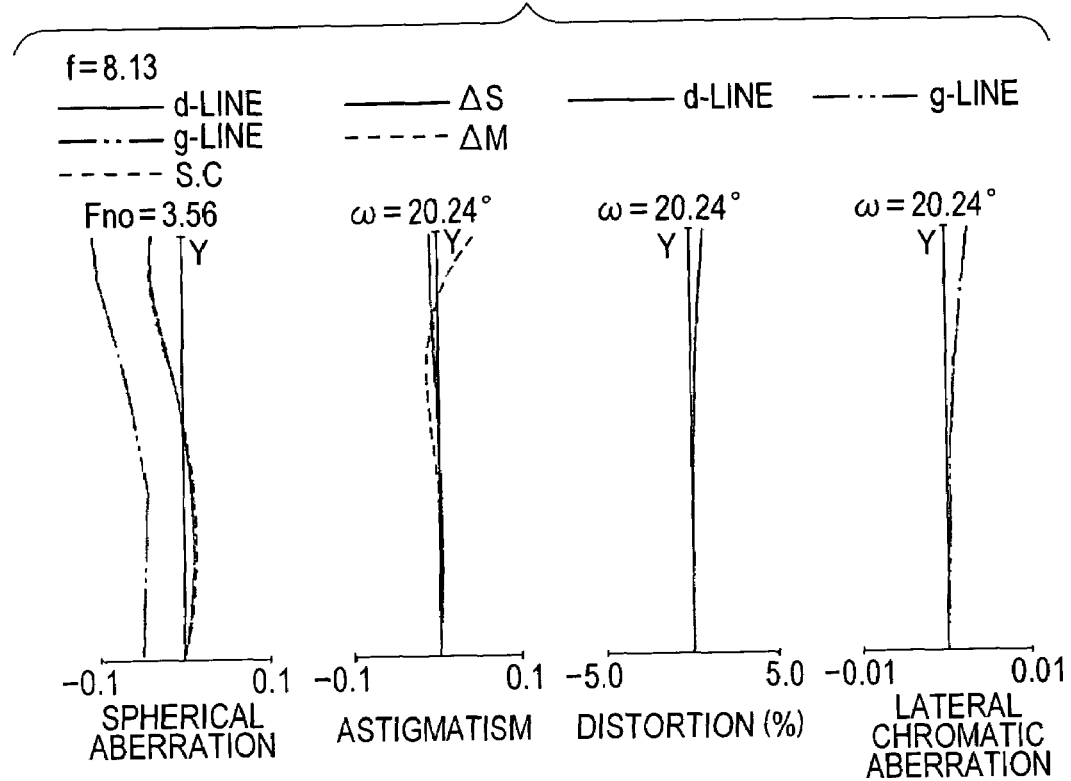
Figure 18C:
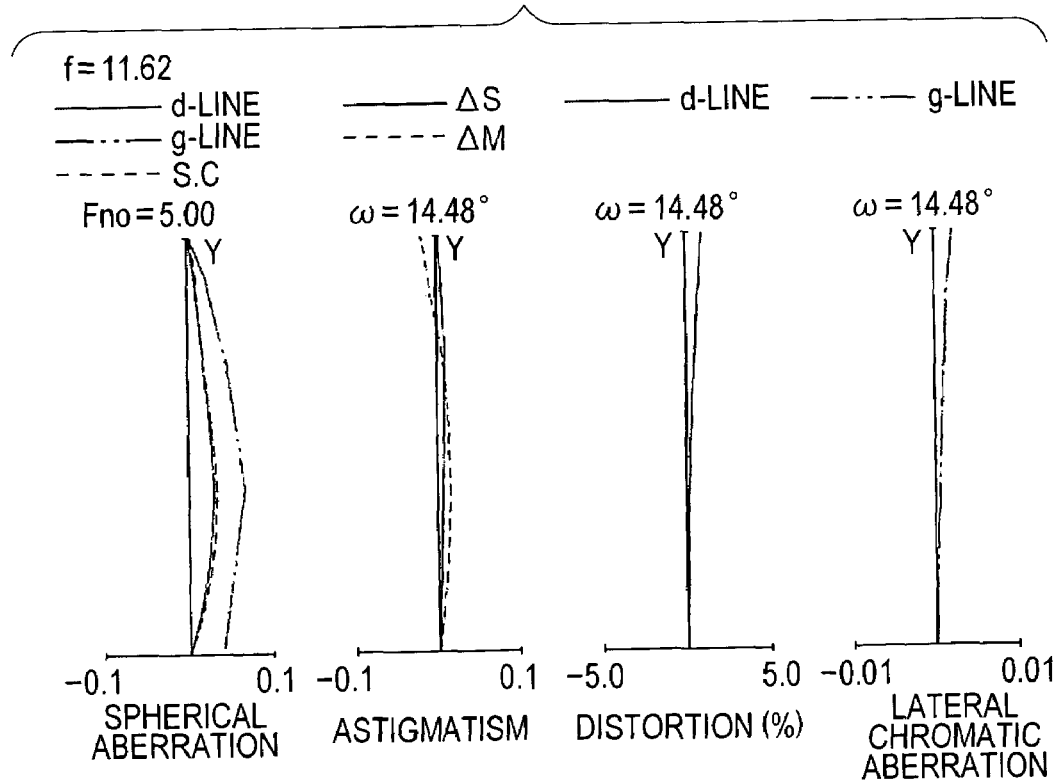

FIGS. 16A to 16C illustrate sectional views of the zoom lens according to the sixth exemplary embodiment at the wide-angle end, the middle zoom position, and the telephoto end, respectively. FIG. 17 illustrates a diagram showing the actual optical path in the zoom lens according to the sixth exemplary embodiment. FIGS. 18A to 18C illustrate aberration diagrams of the zoom lens according to the sixth exemplary embodiment at the wide-angle end, the middle zoom position, and the telephoto end, respectively.

Figure 19A:
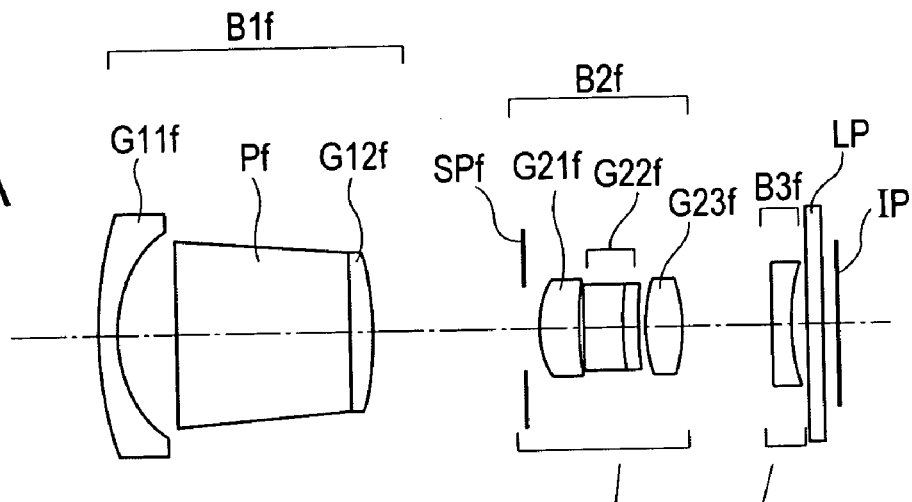
FIGS. 19A to 19C illustrate optical sectional views of a zoom lens according to a seventh exemplary embodiment.
Figure 19B:
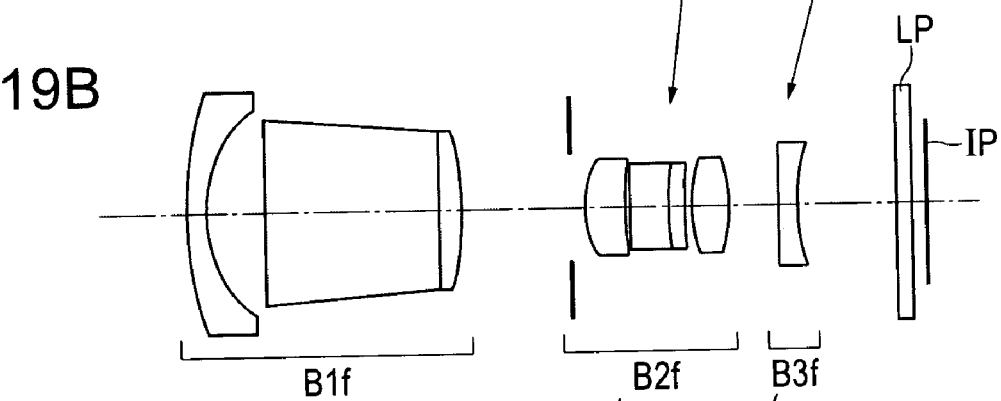
Figure 19C:
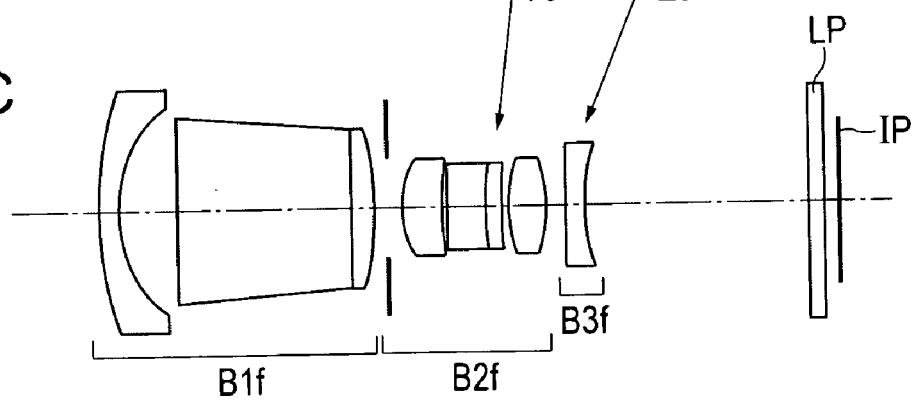
Figure 20:
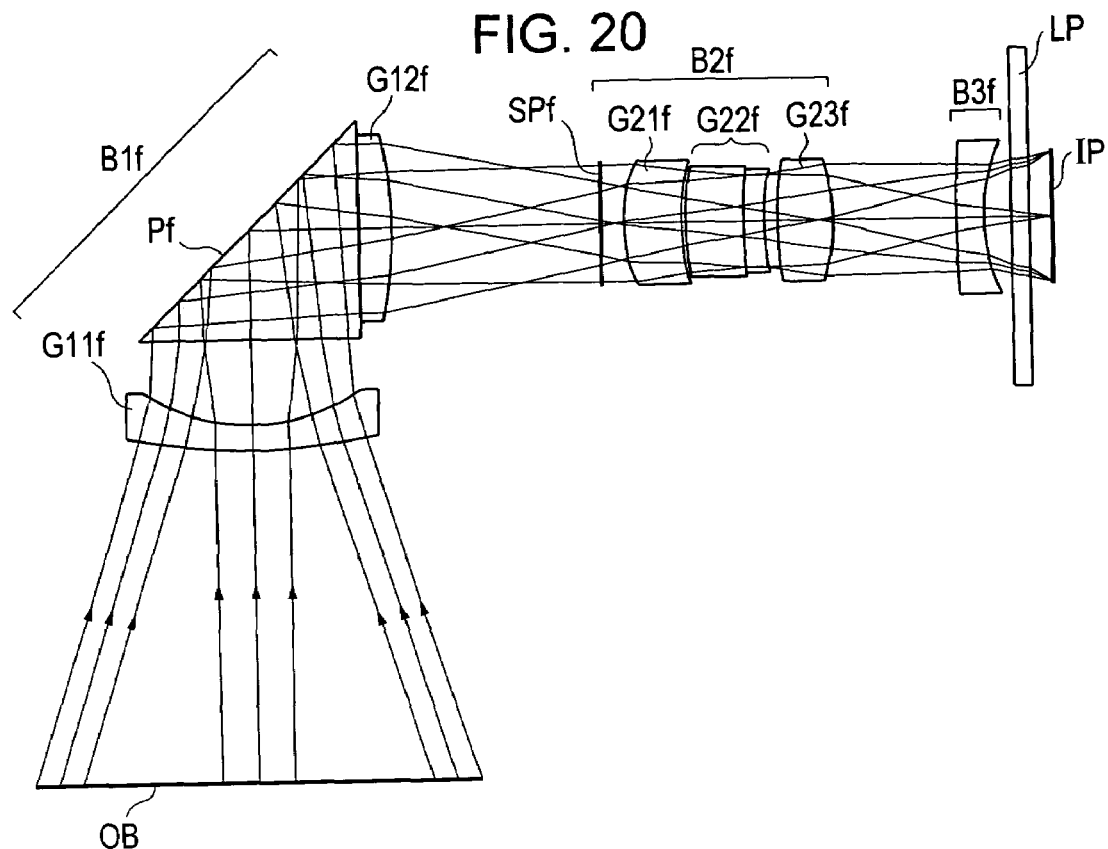
FIG. 20 illustrates a diagram showing the actual optical path in the zoom lens according to the seventh exemplary embodiment.
Figure 21A:
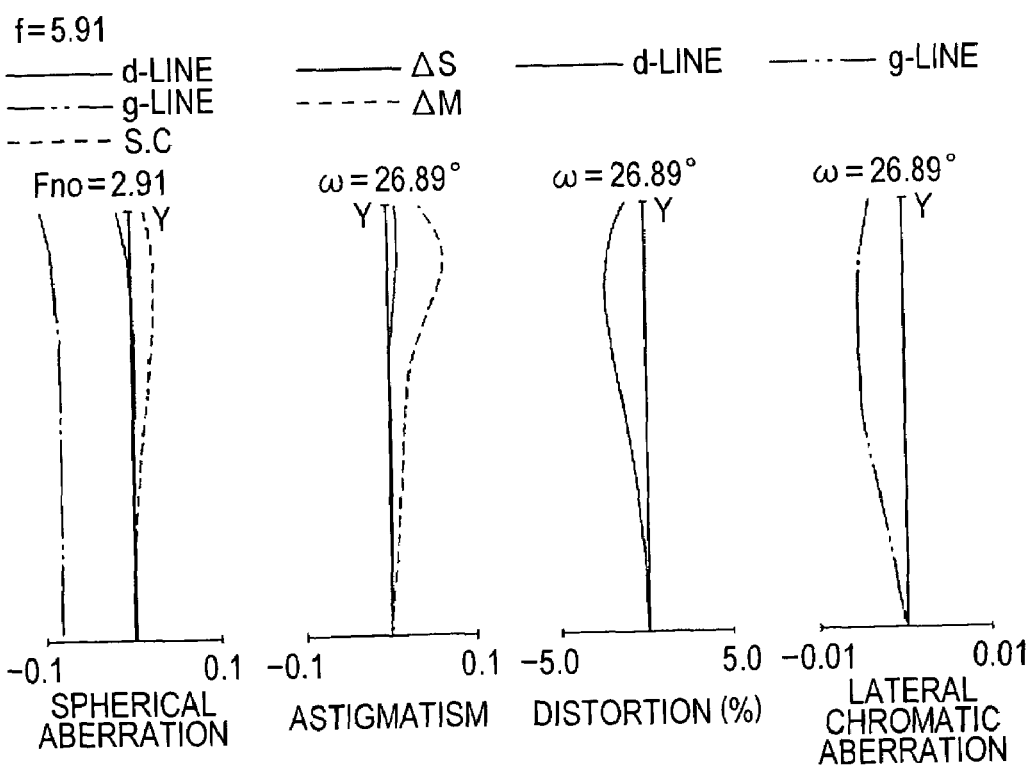
FIGS. 21A to 21C illustrate aberration diagrams of the zoom lens according to the seventh exemplary embodiment.
Figure 21B:
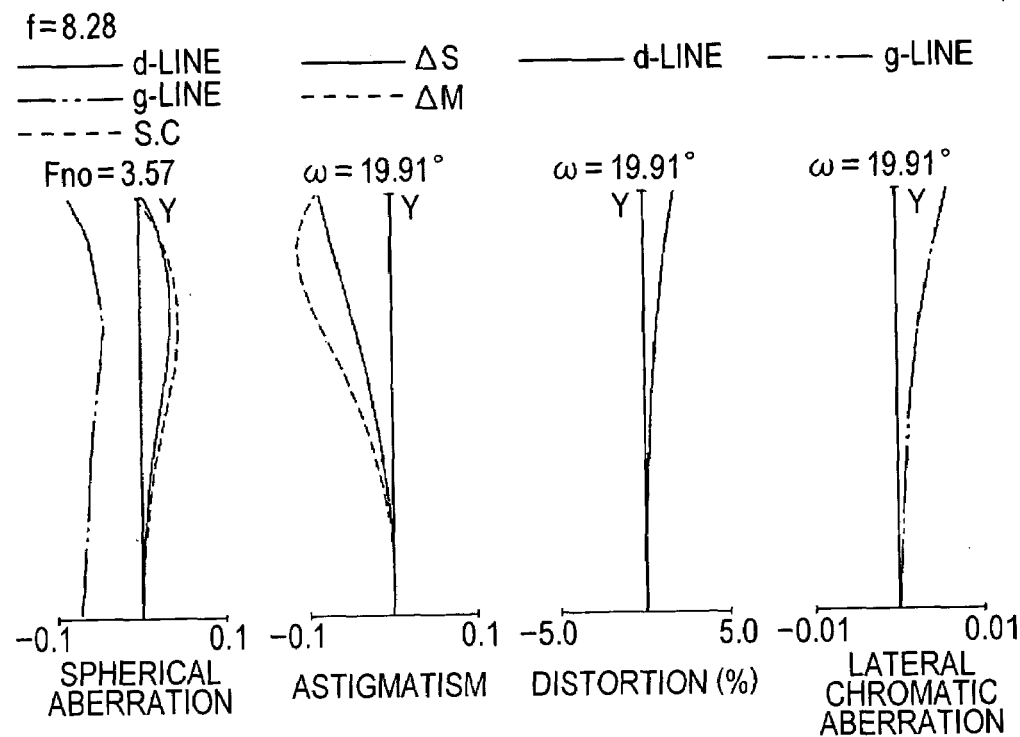
Figure 21C:
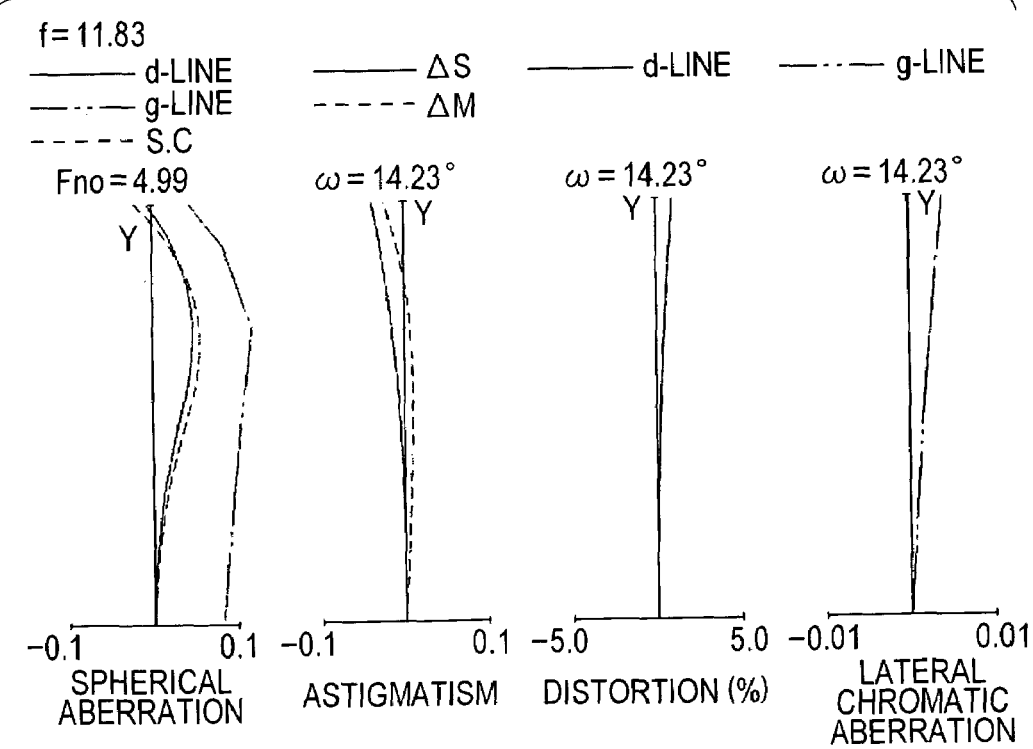

FIGS. 19A to 19C illustrate sectional views of the zoom lens according to the seventh exemplary embodiment at the wide-angle end, the middle zoom position, and the telephoto end, respectively. FIG. 20 illustrates a diagram showing the actual optical path in the zoom lens according to the seventh exemplary embodiment. FIGS. 21A to 21C illustrate aberration diagrams of the zoom lens according to the seventh exemplary embodiment at the wide-angle end, the middle zoom position, and the telephoto end, respectively.

Figure 22A:
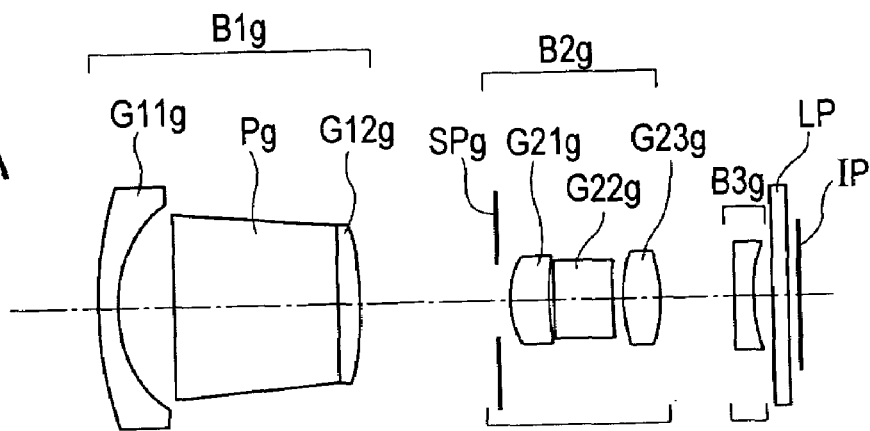
FIGS. 22A to 22C illustrate optical sectional views of a zoom lens according to an eighth exemplary embodiment.
Figure 22B:
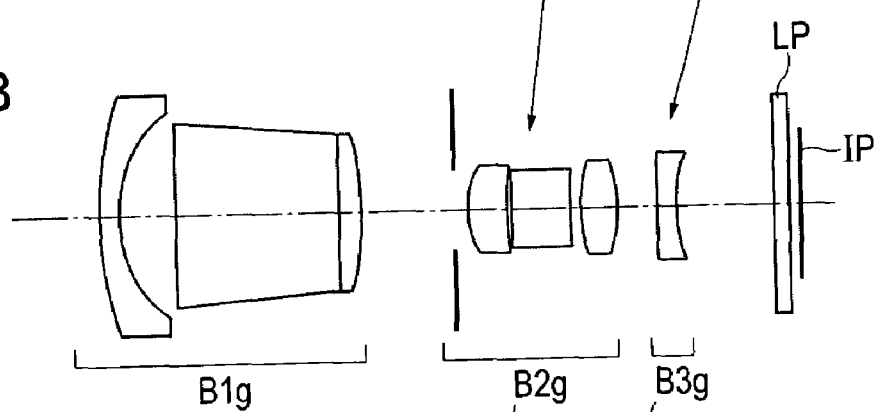
Figure 22C:
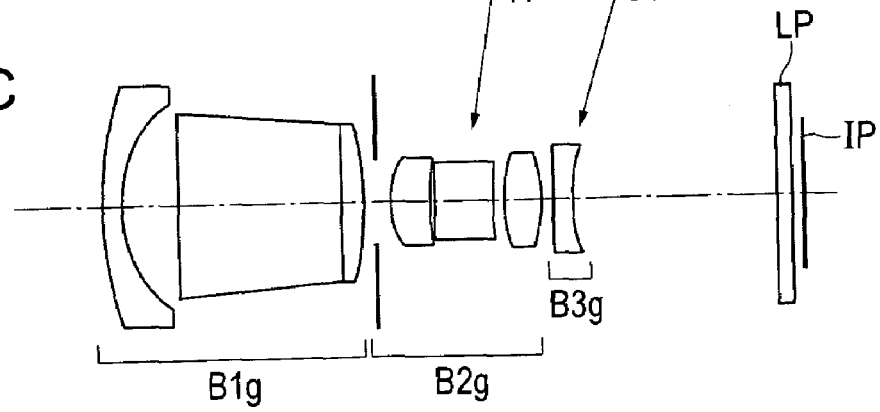
Figure 23:
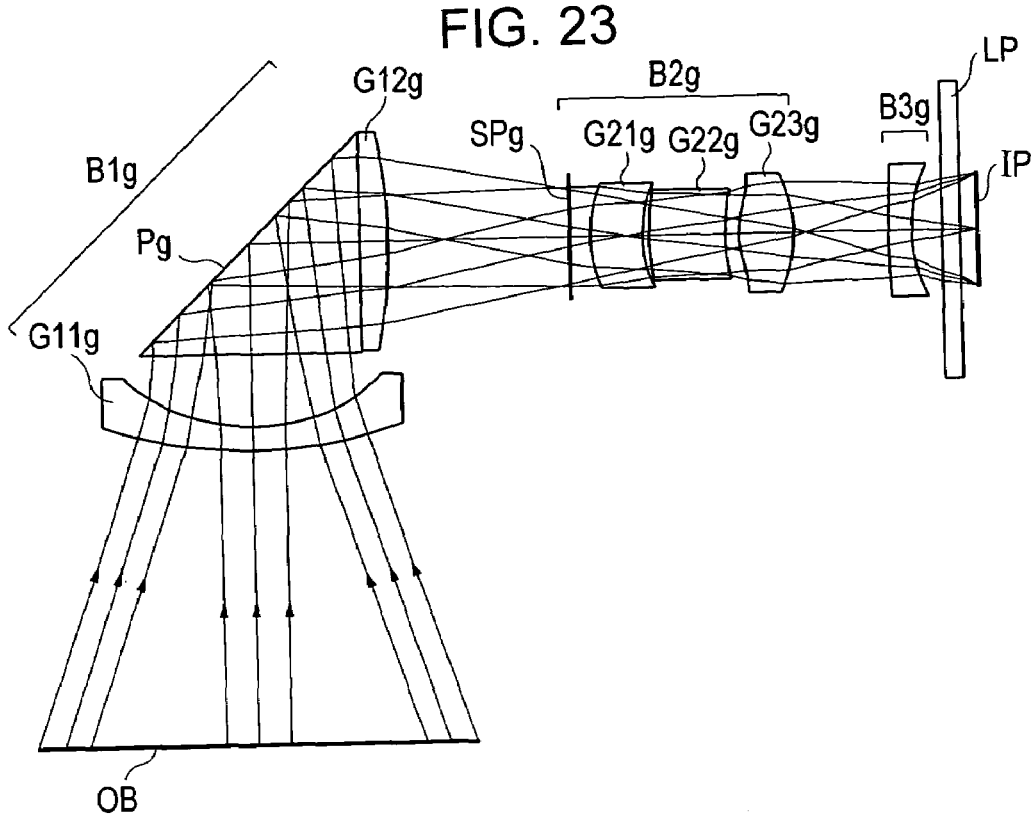
FIG. 23 illustrates a diagram showing the actual optical path in the zoom lens according to the eighth exemplary embodiment.
Figure 24A:
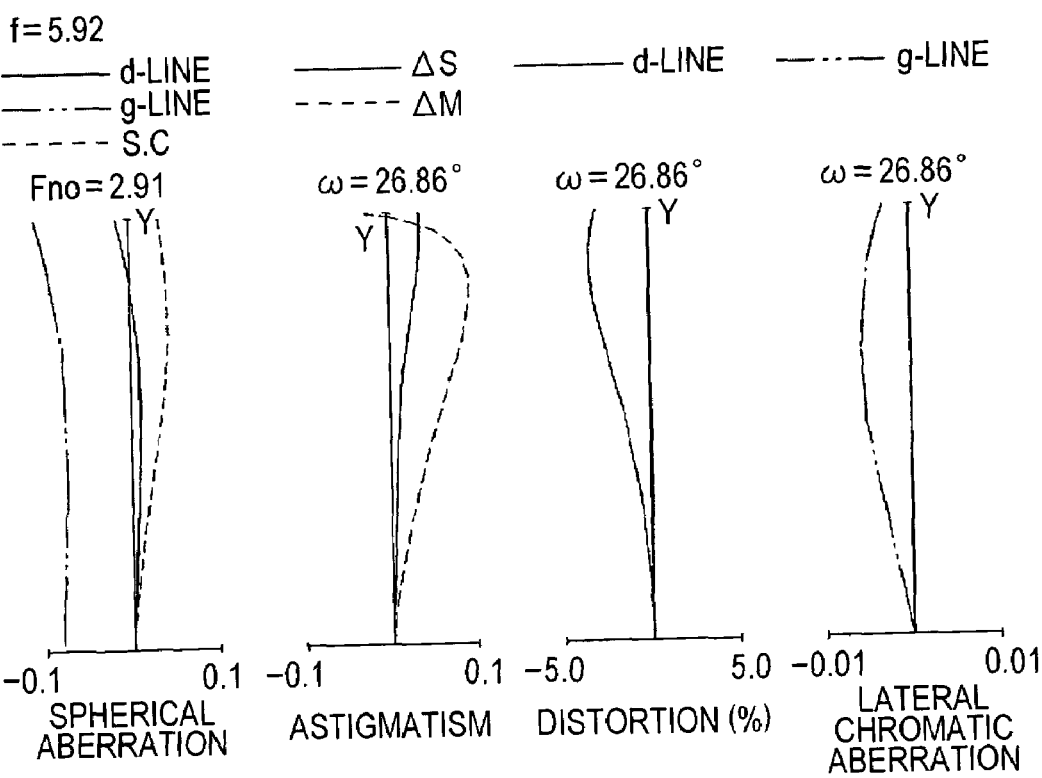
FIGS. 24A to 24C illustrate aberration diagrams of the zoom lens according to the eighth exemplary embodiment.
Figure 24B:
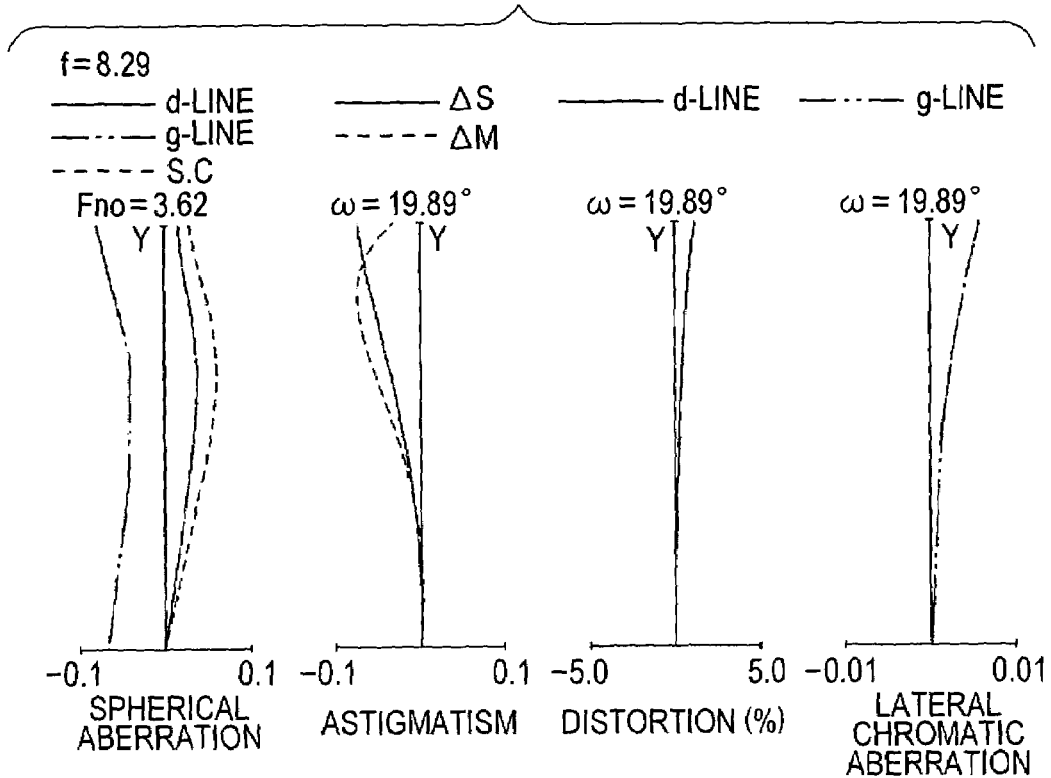
Figure 24C:
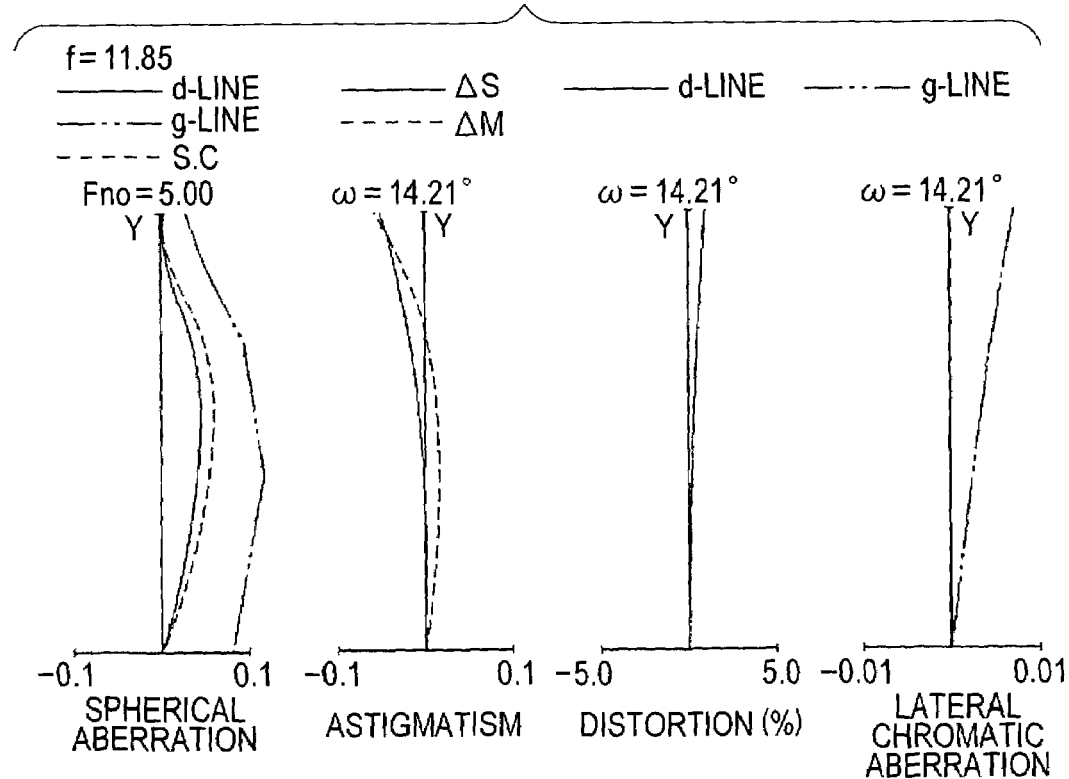

FIGS. 22A to 22C illustrate sectional views of the zoom lens according to the eighth exemplary embodiment at the wide-angle end, the middle zoom position, and the telephoto end, respectively. FIG. 23 illustrates a diagram showing the actual optical path in the zoom lens according to the eighth exemplary embodiment. FIGS. 24A to 24C illustrate aberration diagrams of the zoom lens according to the eighth exemplary embodiment at the wide-angle end, the middle zoom position, and the telephoto end, respectively.

Figure 25A:
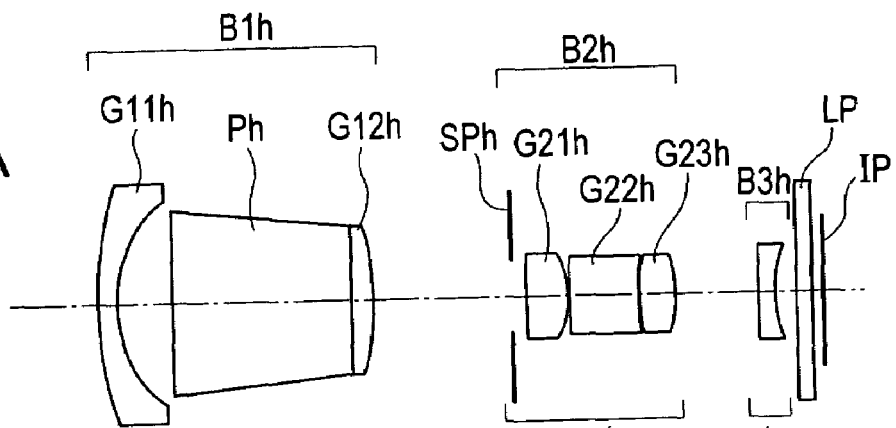
FIGS. 25A to 25C illustrate optical sectional views of a zoom lens according to a ninth exemplary embodiment.
Figure 25B:
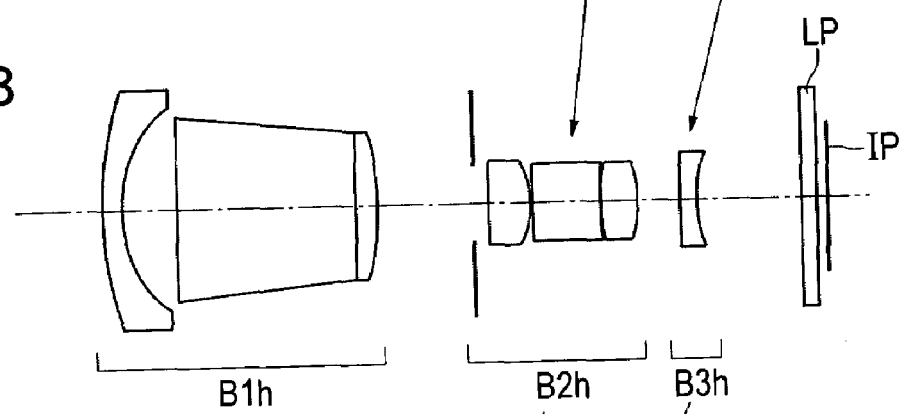
Figure 25C:
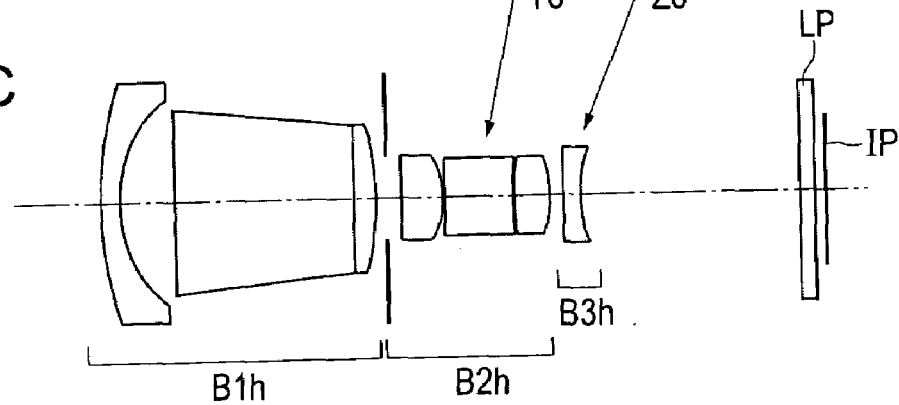
Figure 26:
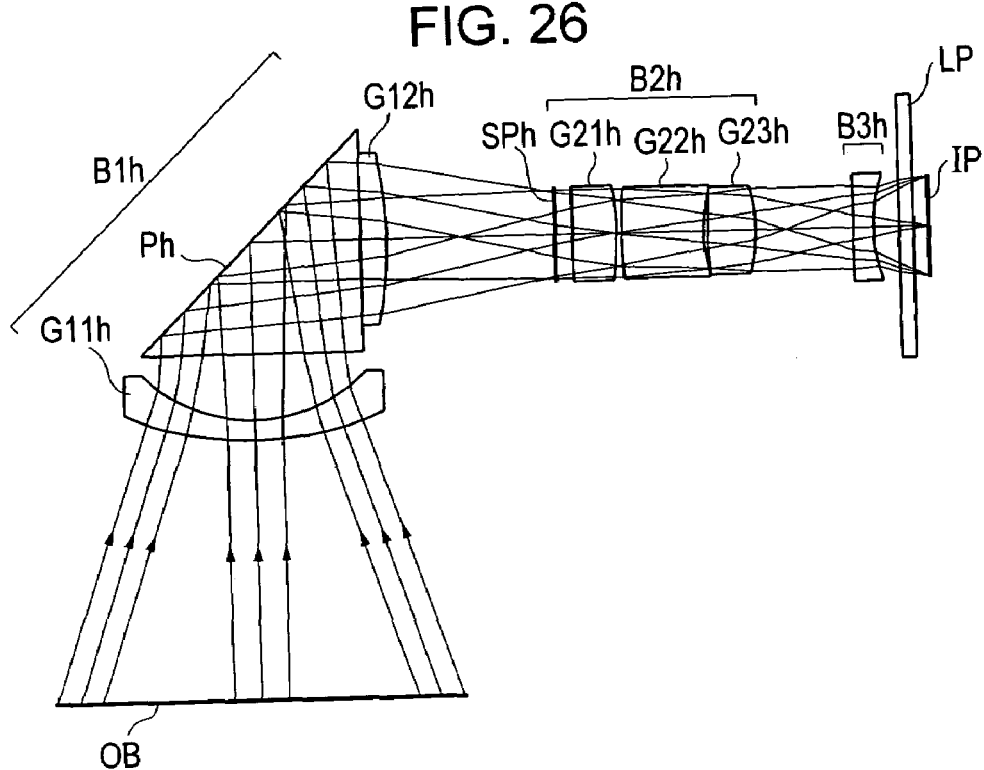
FIG. 26 illustrates a diagram showing the actual optical path in the zoom lens according to the ninth exemplary embodiment.
Figure 27A:
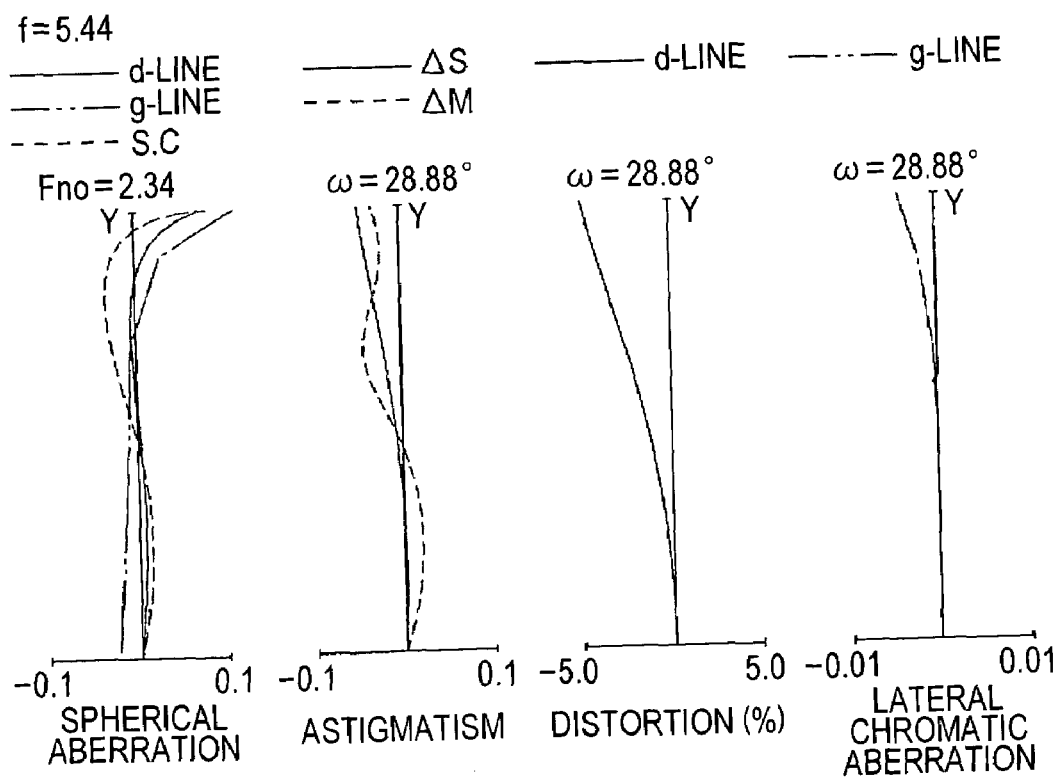
FIGS. 27A to 27C illustrate aberration diagrams of the zoom lens according to the ninth exemplary embodiment.
Figure 27B:
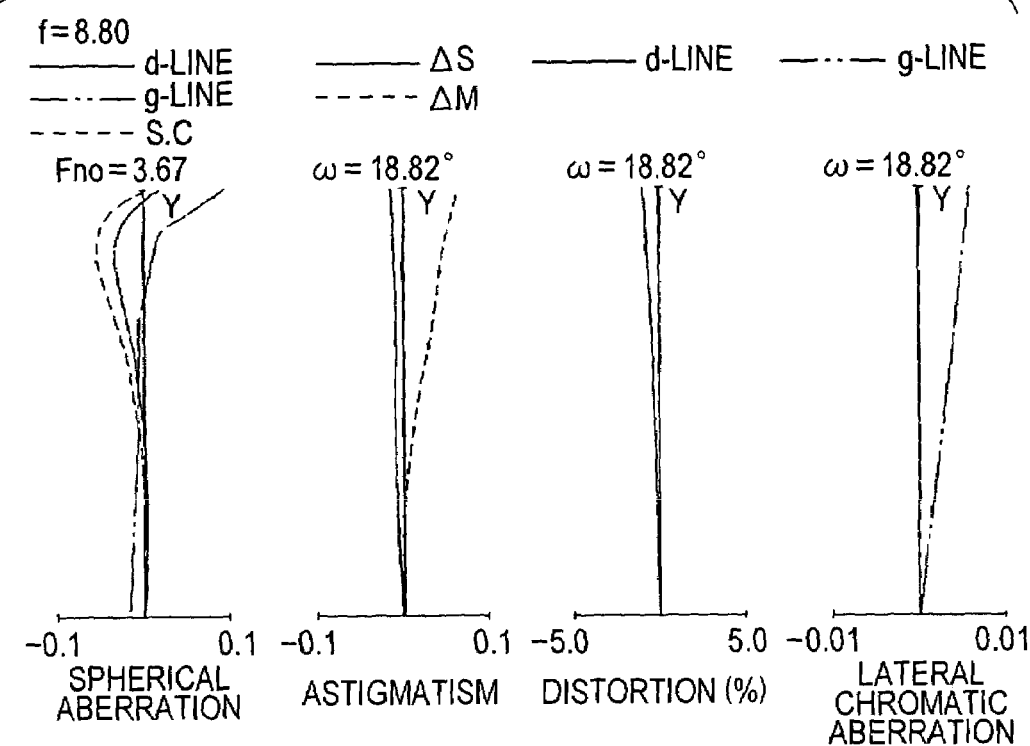
Figure 27C:
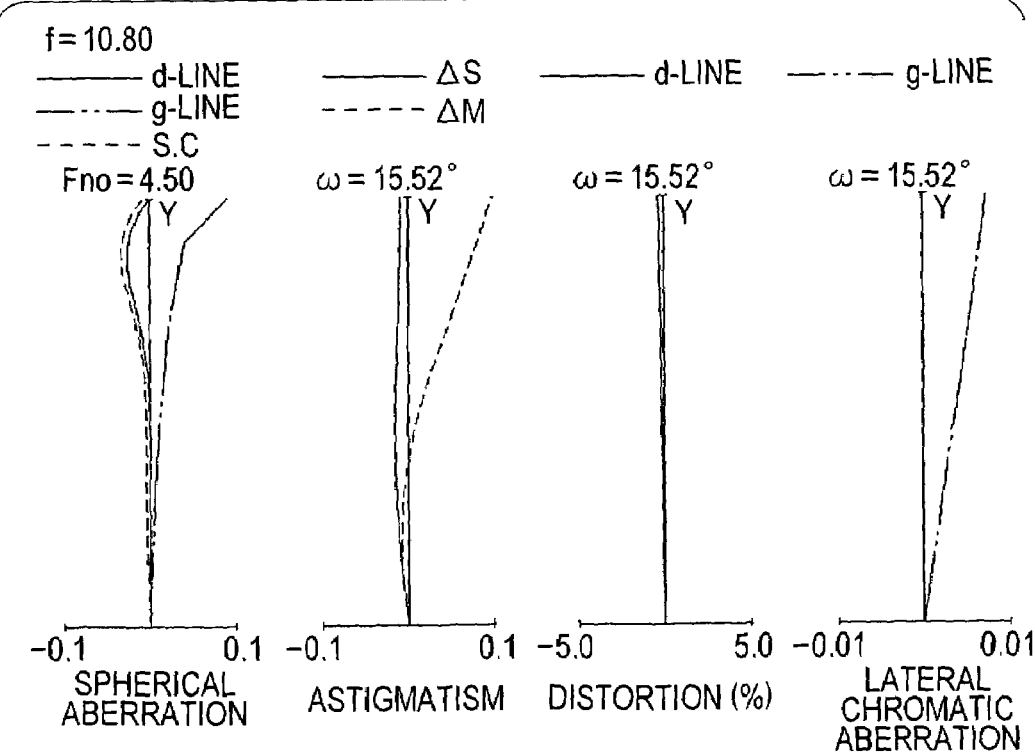

FIGS. 25A to 25C illustrate sectional views of the zoom lens according to the ninth exemplary embodiment at the wide-angle end, the middle zoom position, and the telephoto end, respectively. FIG. 26 illustrates a diagram showing the actual optical path in the zoom lens according to the fourth exemplary embodiment. FIGS. 27A to 27C illustrate aberration diagrams of the zoom lens according to the ninth exemplary embodiment at the wide-angle end, the middle zoom position, and the telephoto end, respectively.

Figure 28A:
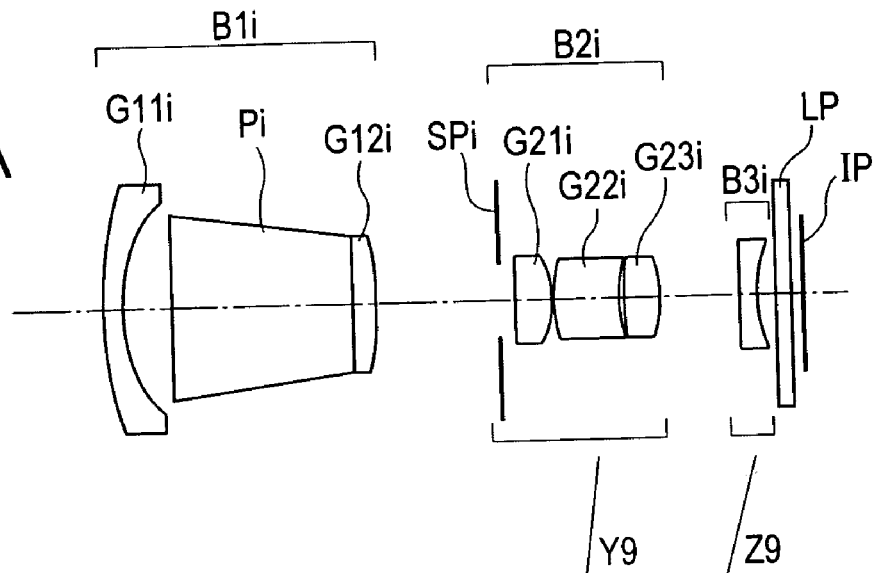
FIGS. 28A to 28C illustrate optical sectional views of a zoom lens according to a tenth exemplary embodiment.
Figure 28B:
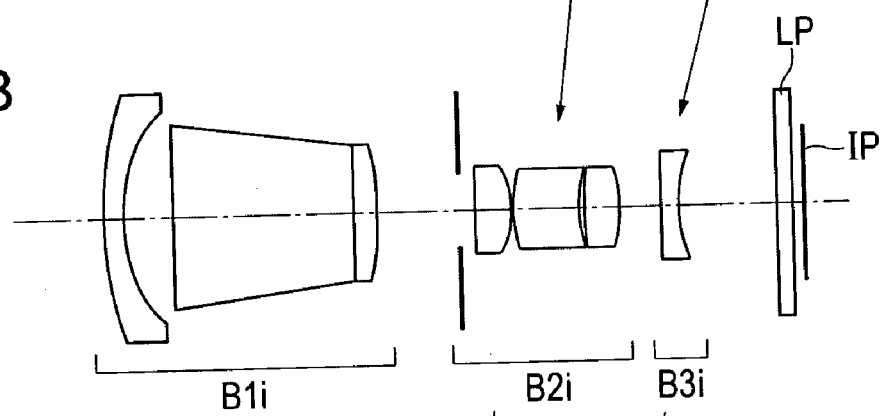
Figure 28C:
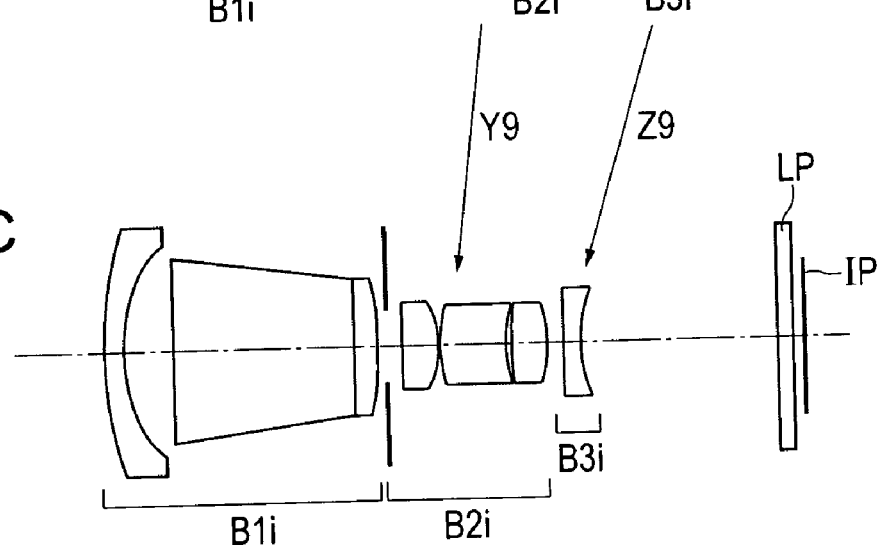
Figure 29:
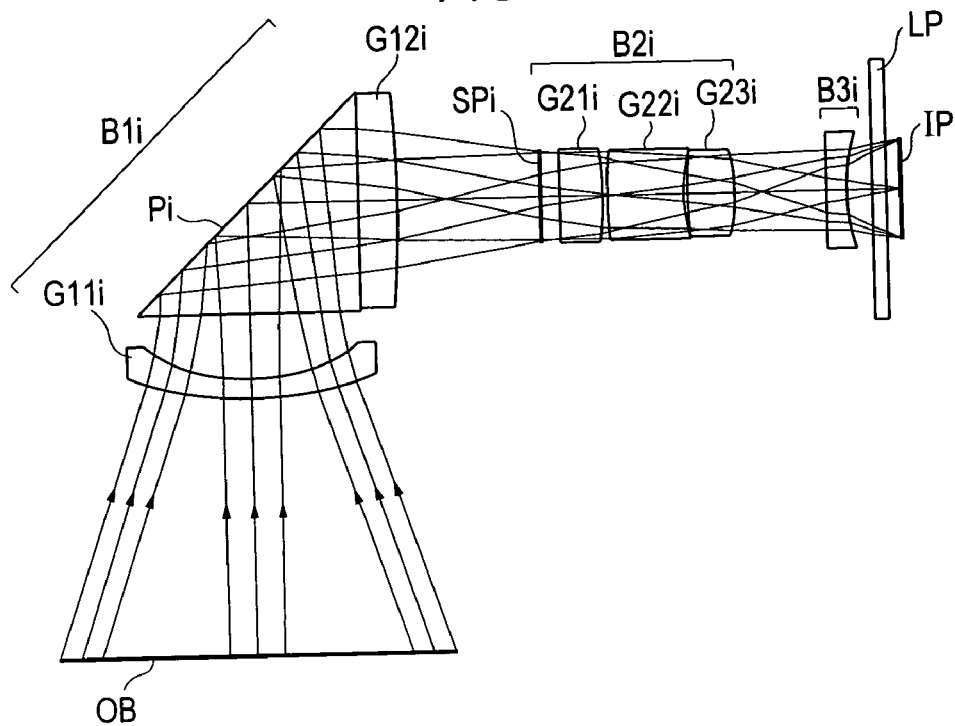
FIG. 29 illustrates a diagram showing the actual optical path in the zoom lens according to the tenth exemplary embodiment.
Figure 30A:
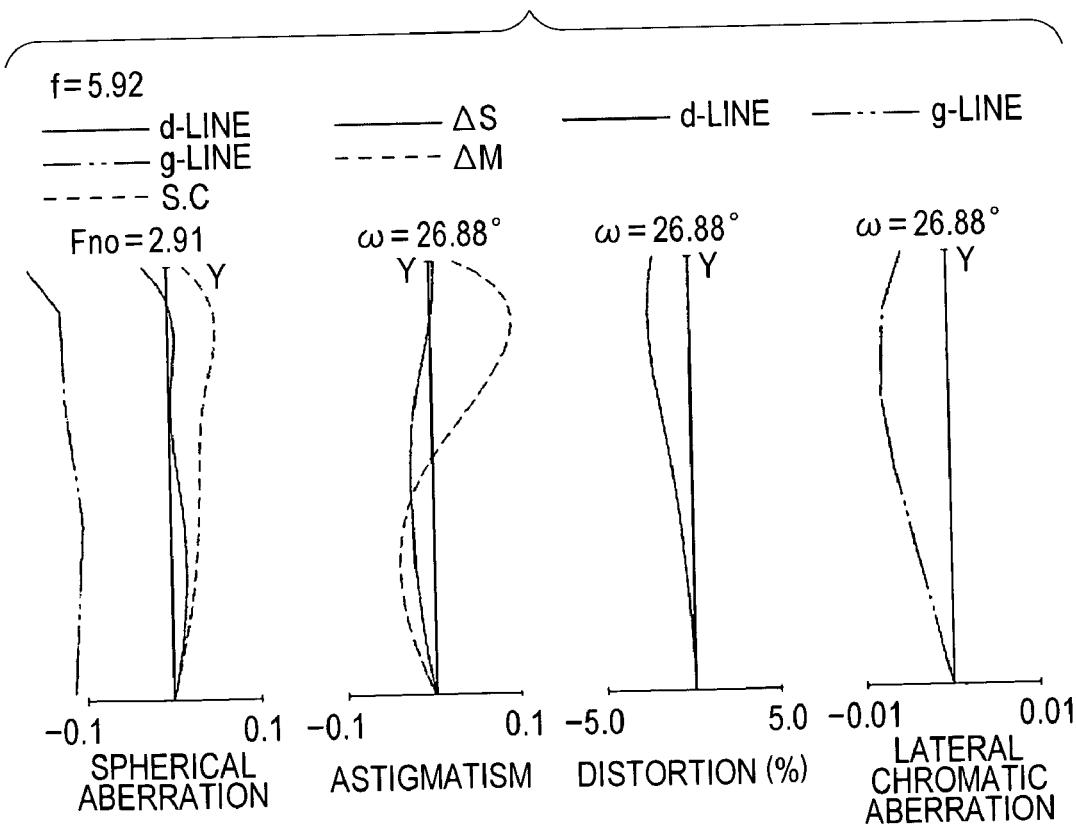
FIGS. 30A to 30C illustrate aberration diagrams of the zoom lens according to the tenth exemplary embodiment.
Figure 30B:
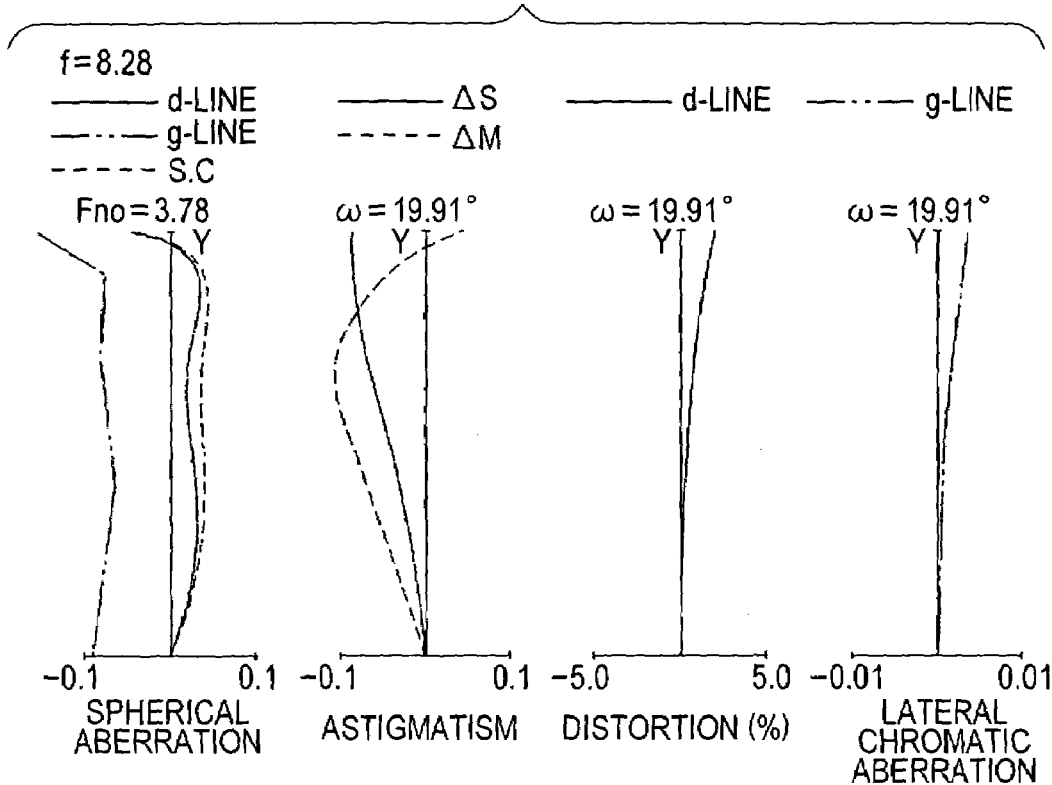
Figure 30C:
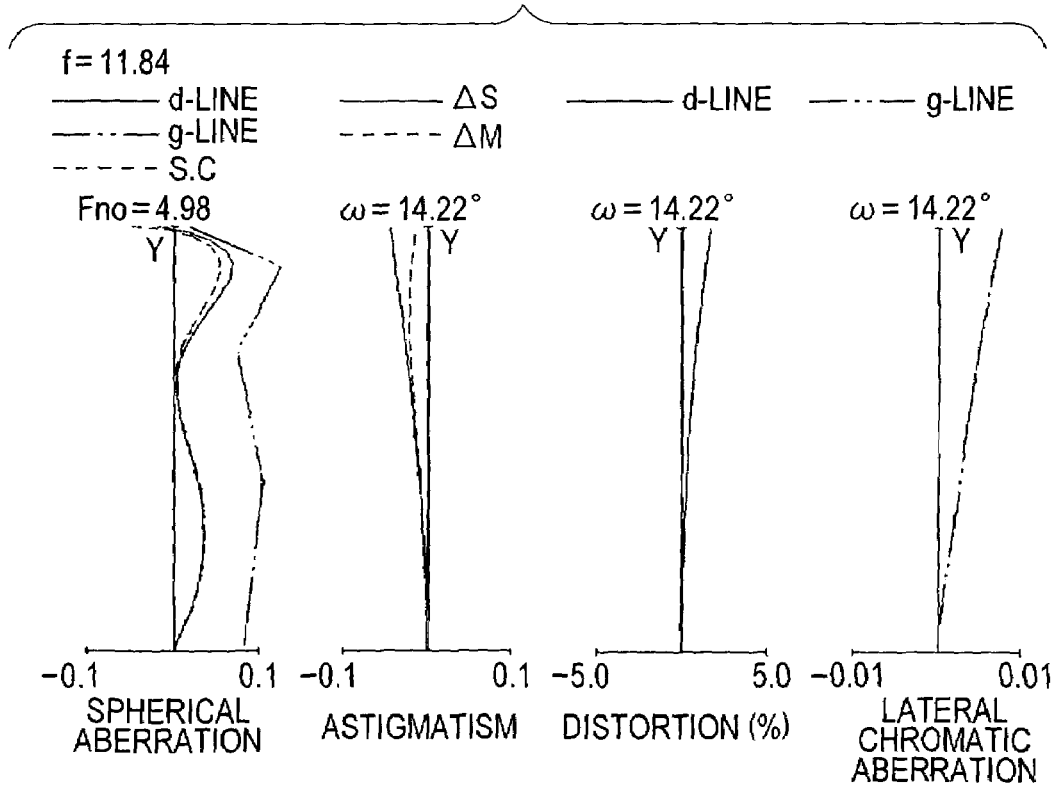

FIGS. 28A to 28C illustrate sectional views of the zoom lens according to the tenth exemplary embodiment at the wide-angle end, the middle zoom position, and the telephoto end, respectively. FIG. 29 illustrates a diagram showing the actual optical path in the zoom lens according to the tenth exemplary embodiment. FIGS. 30A to 30C illustrate aberration diagrams of the zoom lens according to the tenth exemplary embodiment at the wide-angle end, the middle zoom position, and the telephoto end, respectively.

Figure 31A:
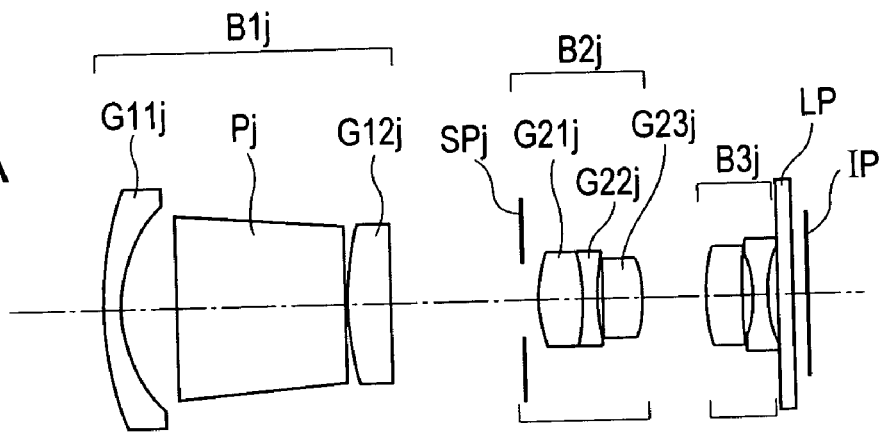
FIGS. 31A to 31C illustrate optical sectional views of a zoom lens according to an eleventh exemplary embodiment.
Figure 31B:
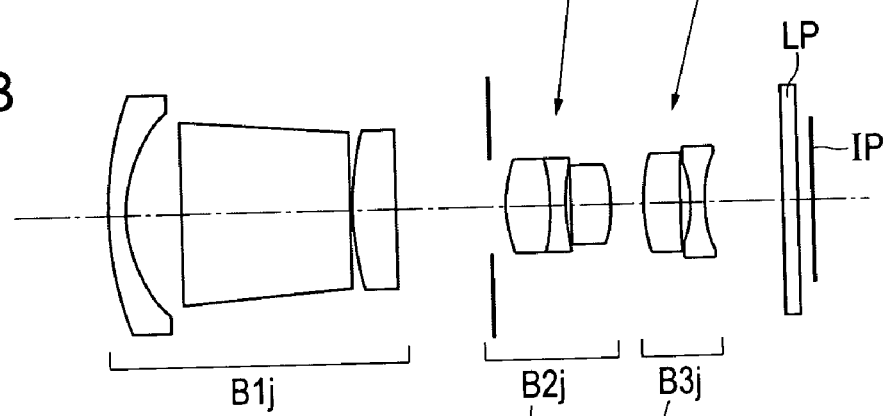
Figure 31C:
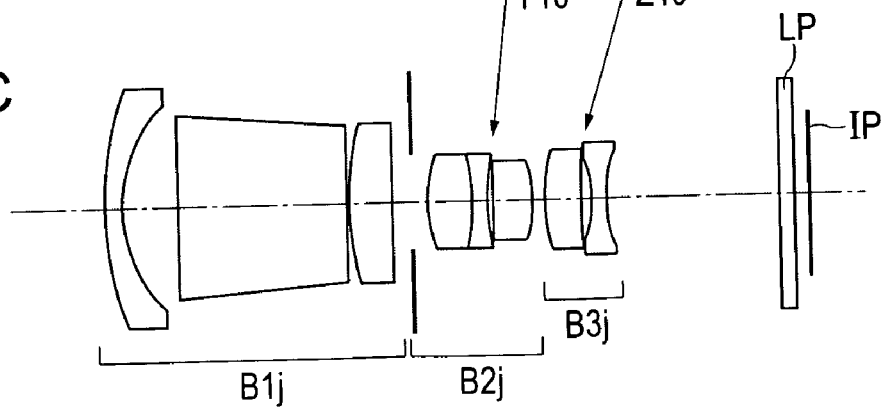
Figure 32:
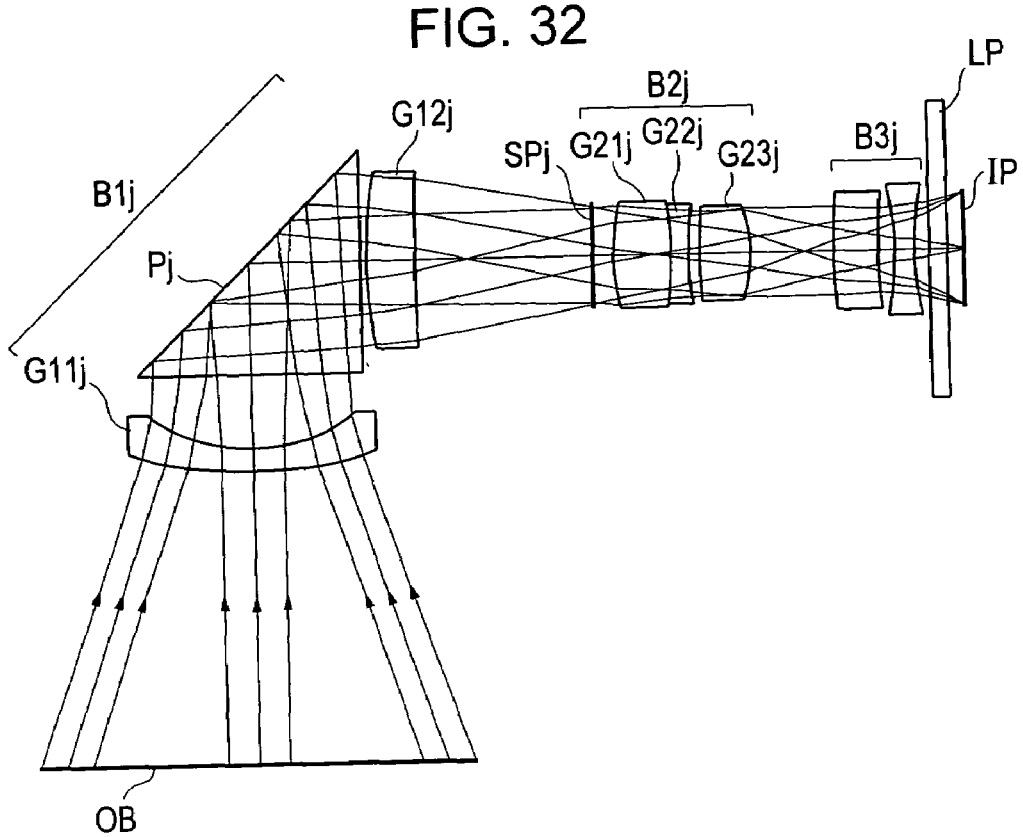
FIG. 32 illustrates a diagram showing the actual optical path in the zoom lens according to the eleventh exemplary embodiment.
Figure 33A:
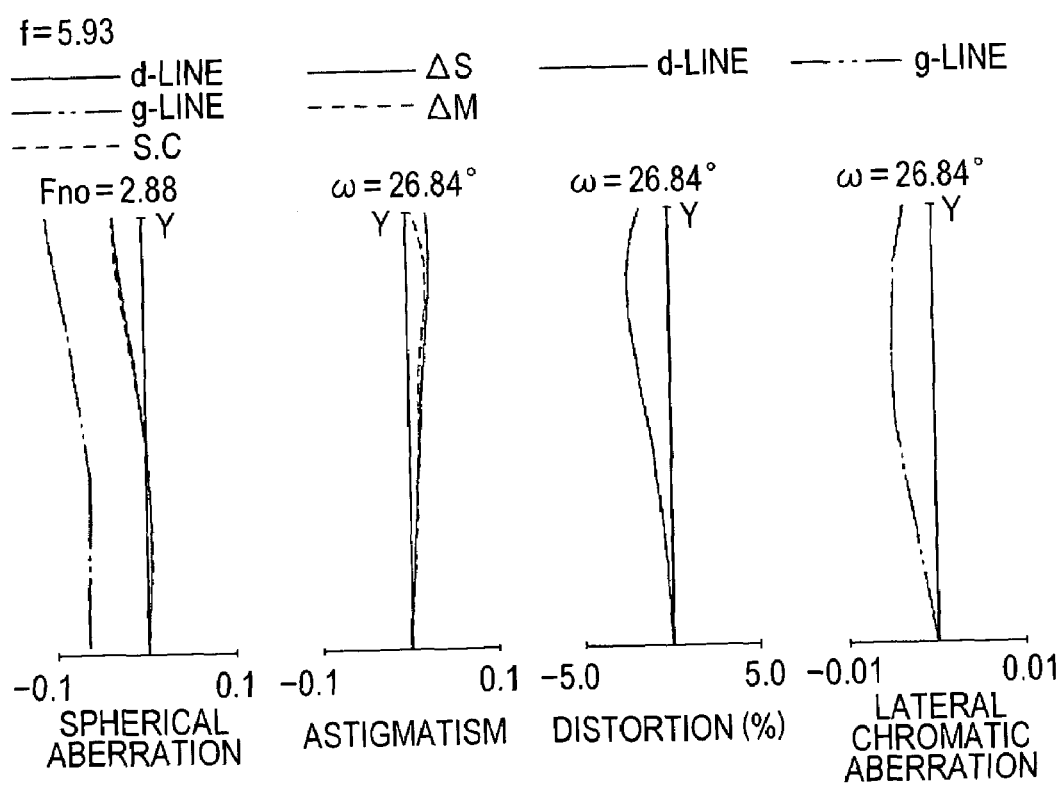

FIGS. 31A to 31C illustrate sectional views of the zoom lens according to the eleventh exemplary embodiment at the wide-angle end, the middle zoom position, and the telephoto end, respectively. FIG. 32 illustrates a diagram showing the actual optical path in the zoom lens according to the eleventh exemplary embodiment. FIGS. 33A to 33C illustrate aberration diagrams of the zoom lens according to the eleventh exemplary embodiment at the wide-angle end, the middle zoom position, and the telephoto end, respectively.

Figure 34A:
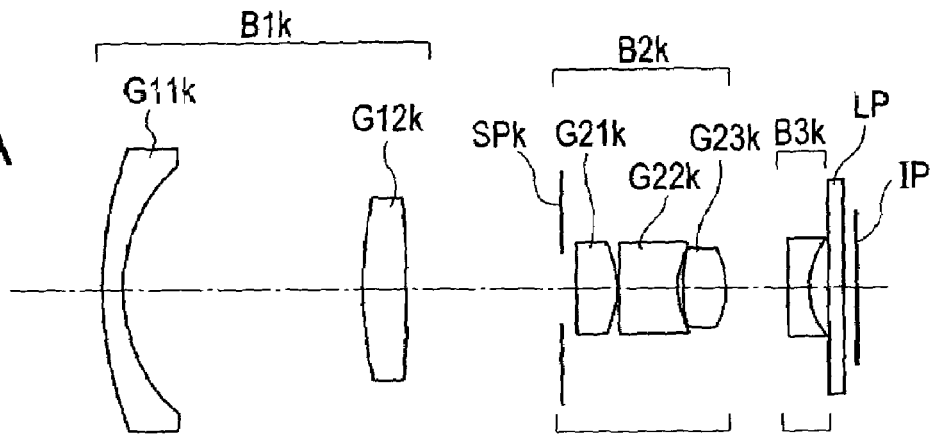
FIGS. 34A to 34C illustrate optical sectional views of a zoom lens according to a twelfth exemplary embodiment.
Figure 34B:
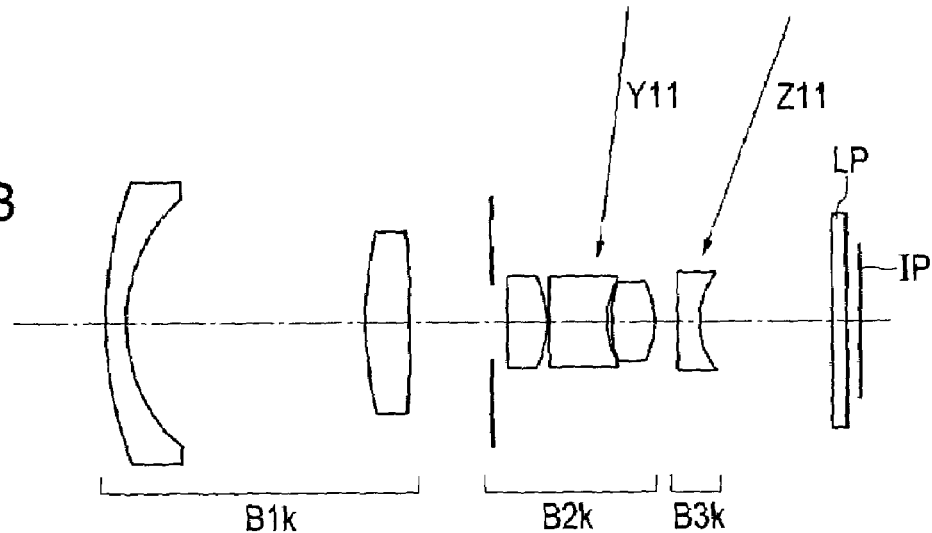
Figure 34C:
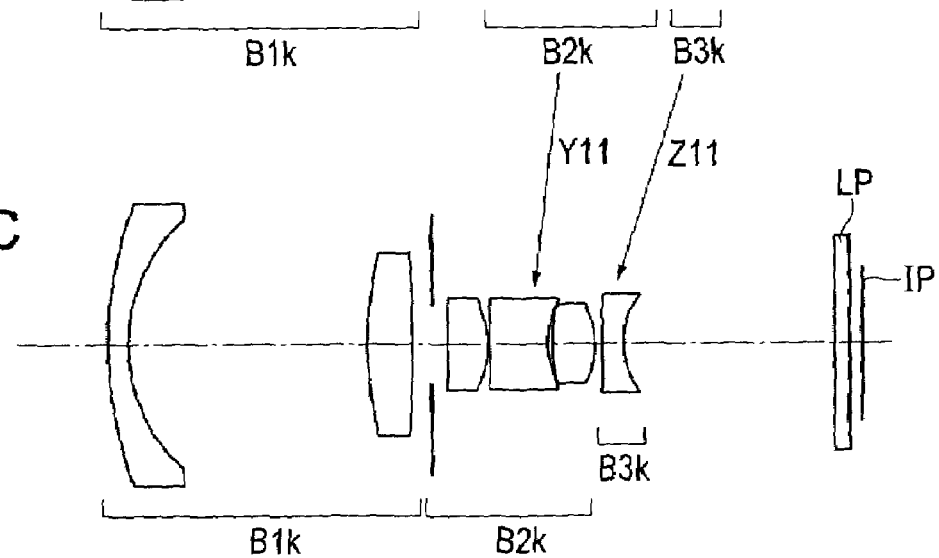
Figure 35:
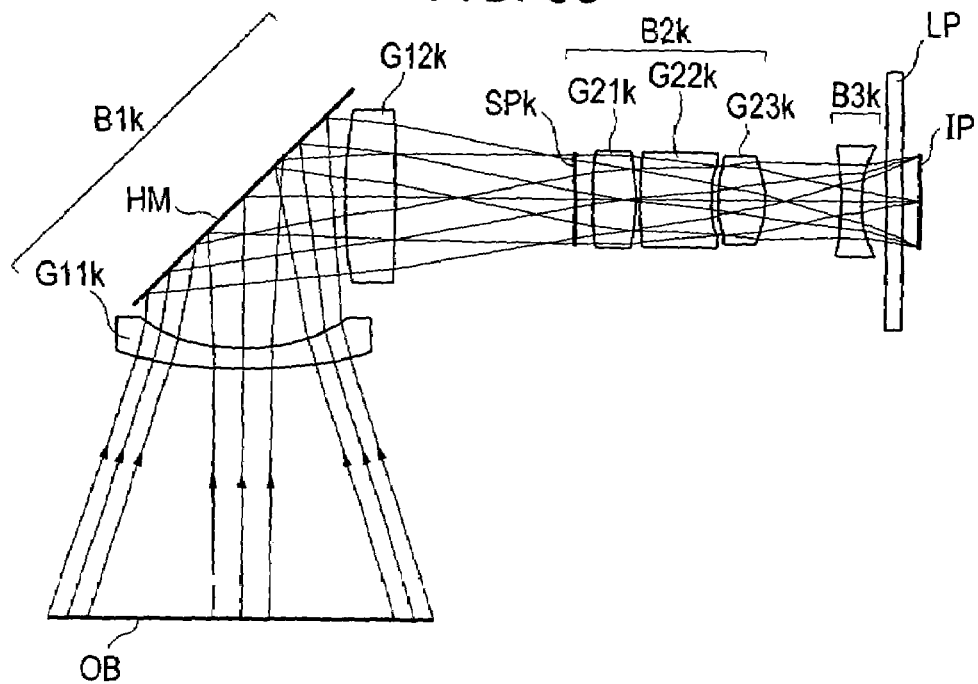
FIG. 35 illustrates a diagram showing the actual optical path in the zoom lens according to the twelfth exemplary embodiment.
Figure 36A:
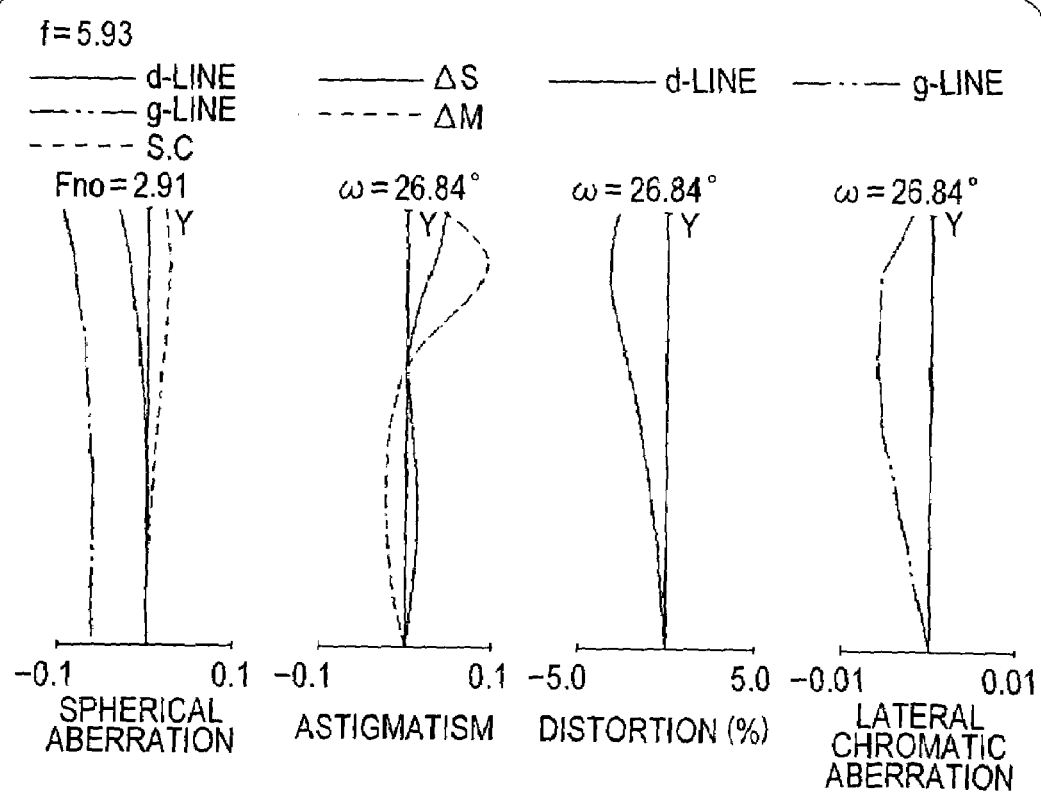

FIGS. 34A to 34C illustrate sectional views of the zoom lens according to the twelfth exemplary embodiment at the wide-angle end, the middle zoom position, and the telephoto end, respectively. FIG. 35 illustrates a diagram showing the actual optical path in the zoom lens according to the twelfth exemplary embodiment. FIGS. 36A to 36C illustrate aberration diagrams of the zoom lens according to the twelfth exemplary embodiment at the wide-angle end, the middle zoom position, and the telephoto end, respectively.

Figure 37A:
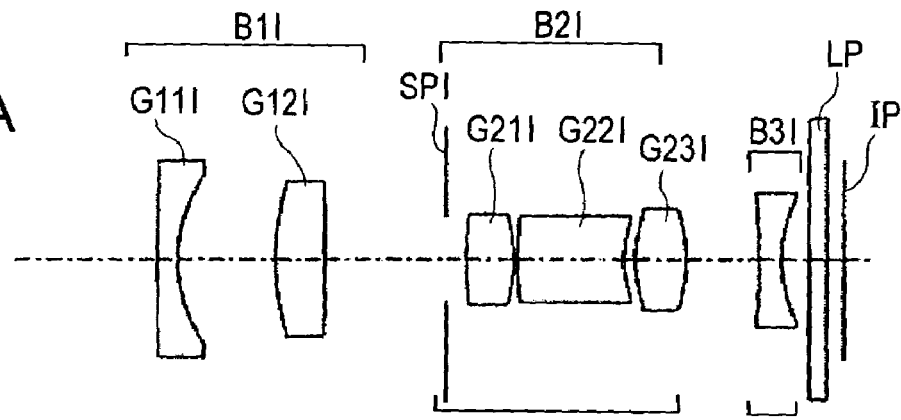
FIGS. 37A to 37C illustrate optical sectional views of a zoom lens according to a thirteenth exemplary embodiment.
Figure 37B:
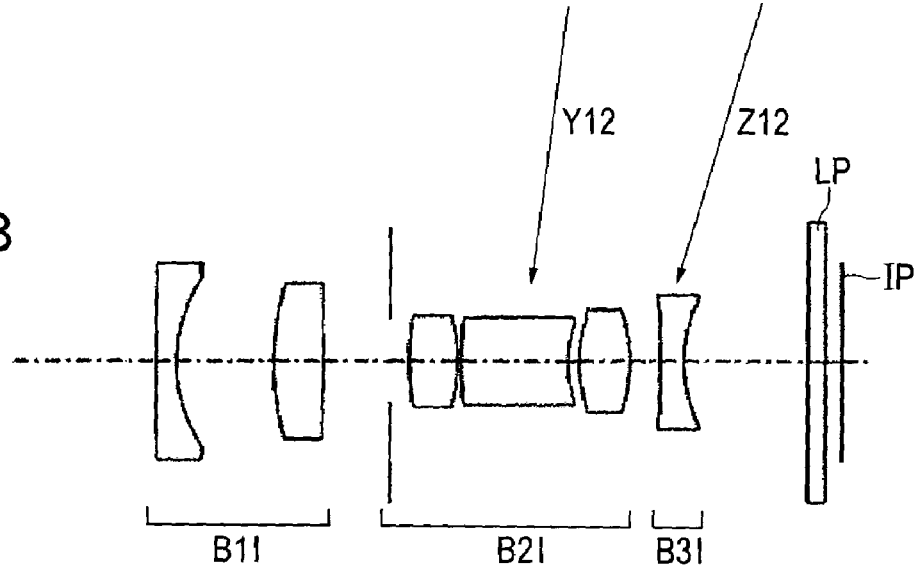
Figure 37C:
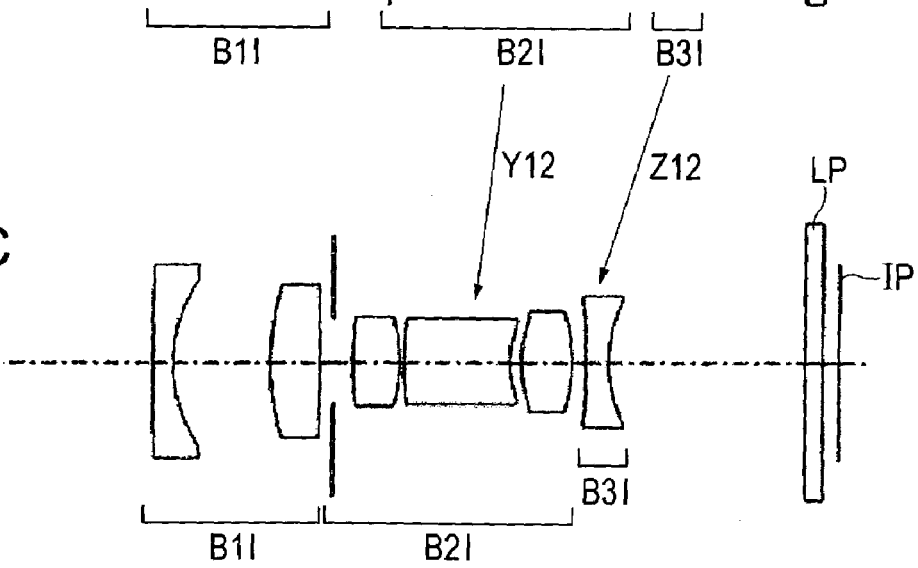
Figure 38A:
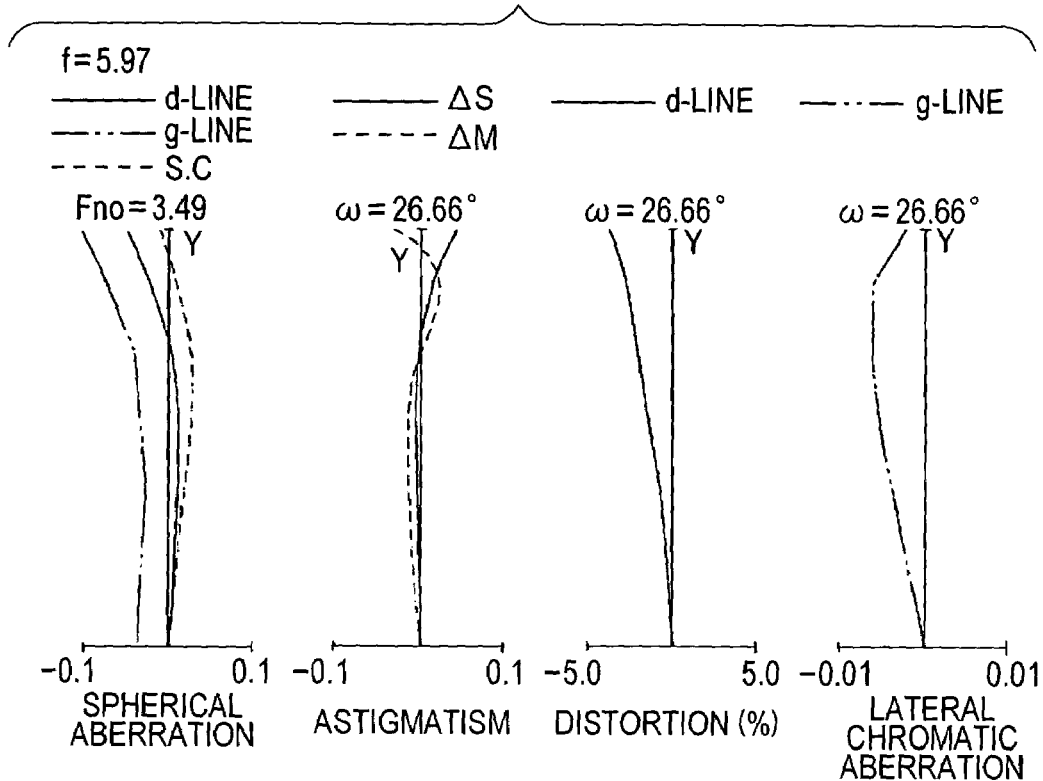
FIGS. 38A to 38C illustrate aberration diagrams of the zoom lens according to the thirteenth exemplary embodiment.
Figure 38B:
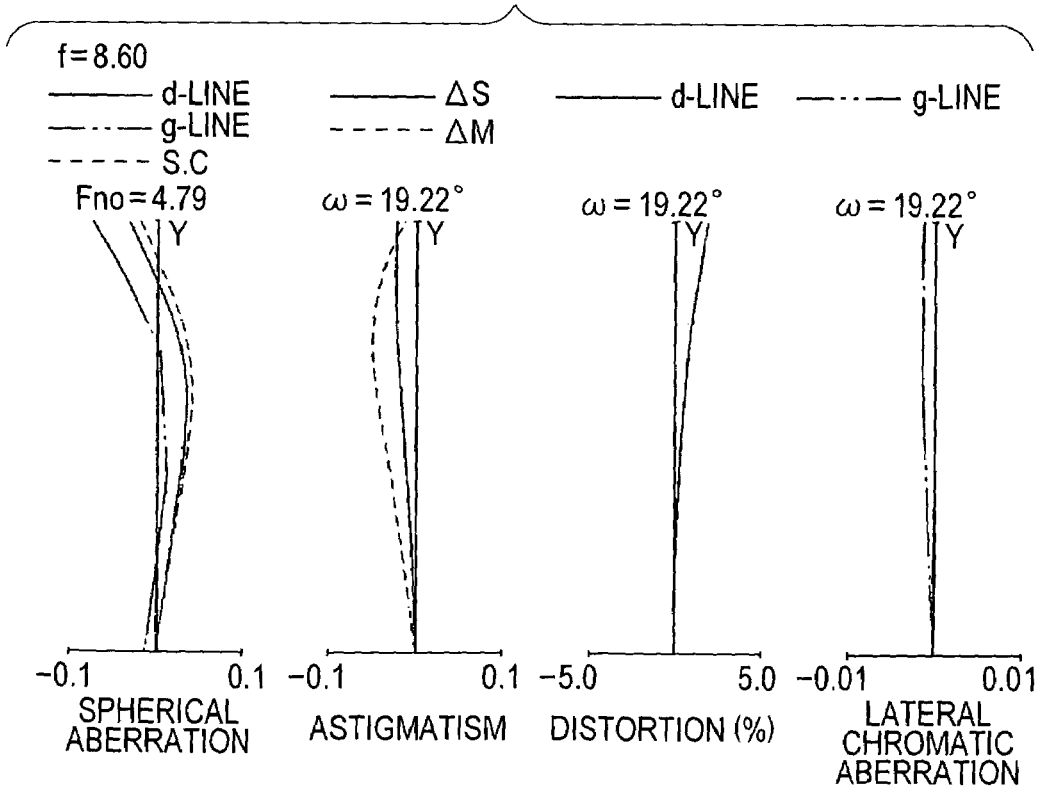
Figure 38C:
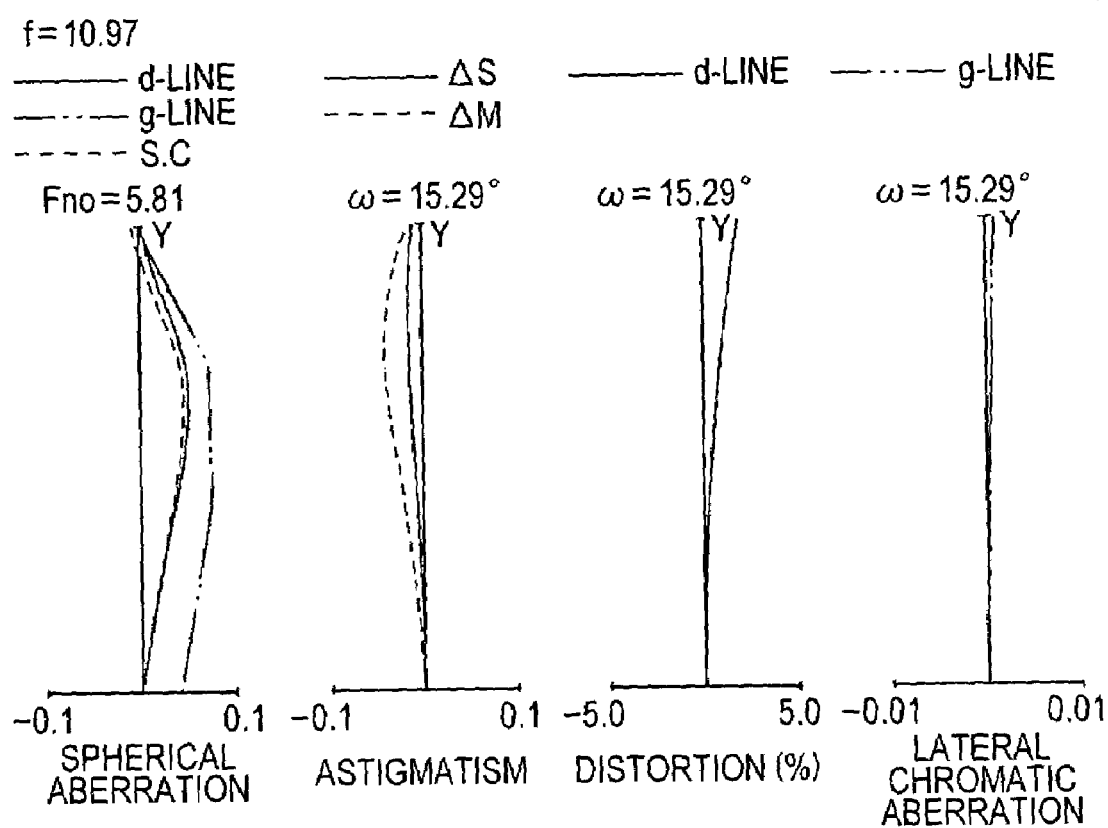

FIGS. 37A to 37C illustrate sectional views of the zoom lens according to the thirteenth exemplary embodiment at the wide-angle end, the middle zoom position, and the telephoto end, respectively. FIGS. 38A to 38C illustrate aberration diagrams of the zoom lens according to the thirteenth exemplary embodiment at the wide-angle end, the middle zoom position, and the telephoto end, respectively.

In each of the sectional views of the sixth to thirteenth exemplary embodiments, B1$e$, B1$f$, B1$g$, B1$h$, B1$i$, B1$j$, B1$k$, and B1$l$ denote first lens units having positive or negative refractive powers, the first lens unit including a lens element having negative refractive powers, B2$e$, B2$f$, B2$g$, B2$h$, B2$i$, B2$j$, B2$k$, and B2$l$ denote second lens units having positive refractive powers, and B3$e$, B3$f$, B3$g$, B3$h$, B3$i$, B3$j$, B3$k$, and B3$l$ denote third lens units having negative refractive powers. SPe, SPf, SPg, SPh, SPi, SPj, SPk, and SPl denote aperture stops (iris diaphragm) that are on the object side of the second lens unit (e.g., B2$e$-B2$l$).

In the sixth to eleventh and thirteenth exemplary embodiments, the first lens unit (e.g., B1$e$-B1$l$) can have a negative refractive power. In the twelfth exemplary embodiment, the first lens unit B1 can have a positive refractive power.

Pe, Pf, Pg, Ph, Pi, Pj, Pk, and Pl denotes a prism included in the first lens unit (e.g., B1$e$-B1$l$), provided with reflective surfaces for bending the optical path, where OB denotes an object.

LP denotes an optical block (e.g., an optical filter, a faceplate, a quartz low-pass filter, an infrared-cut filter, or other optical filter as known by one of ordinary skill in the relevant arts). IP denotes an image plane. Similar to the first to fifth exemplary embodiments, the image pickup plane of a solid-state image pickup device (photoelectric converter) or a film surface is placed on the image plane IP.

The characters used in the aberration diagrams are similar to those of the aberration diagrams of the first to fifth exemplary embodiments.

In the zoom lens according to the sixth to thirteenth exemplary embodiments, during zooming from the wide-angle end to the telephoto end, the second and third lens units (e.g., B2$e$-B2$l$ and B3$e$-B3$l$) can move (e.g., Y5-Y12, and Z5-Z12) toward the object side such that the spaces between the first and second lens units (e.g., B1$e$-B1$l$ and B2$e$-B2$l$) and between the second and third lens units (e.g., B2$e$-B2$l$ and B3$e$-B3$l$) are smaller at the telephoto end than at the wide-angle end. The first lens unit (e.g., B1$e$-B1$l$) does not have to move along the optical axis for zooming.

Thus, the overall optical length can be reduced by performing zooming so as to increase the effect of the telephoto system in the overall optical system.

In addition, the first lens unit (e.g., B1$e$-B1$l$) includes a lens element (e.g., G11$e$-G11$l$) having a negative refractive power. Accordingly, the entrance pupil position can be set to an adequate position, which allows balanced settings of the outer diameters of the lenses near the pupil position in the optical system. In addition, on-axis and off-axis optical paths can be adequately set, and aberrations can be reduced to improve the image quality.

The first lens unit (e.g., B1$e$-B1$l$) also includes a lens element (e.g., G12$e$-G12$l$) having a positive refractive power, and therefore the overall refractive power of the first lens unit (e.g., B1$e$-B1$l$) can either be positive or negative.

The zooming operation of the optical system is mainly performed by changing the positional relationship between the second and third lens units (e.g., B2$e$-B2$l$ and B3$e$-B3$l$).

The third lens unit (e.g., B3$e$-B3$l$) can be configured to form an image of the object obtained by the combination of the first and second lens units (e.g., B1$e$-B1$l$ and B2$e$-B2$l$). Then, the magnification can be changed by changing the position of the third lens unit (e.g., B3$e$-B3$l$) with respect to the second lens unit (e.g., B2$e$-B2$l$). The movement of the image-forming position caused when the magnification is changed can be compensated for by moving the third lens unit (e.g., B3$e$-B3$l$) along the optical axis at the same time.

In the sixth to twelfth exemplary embodiments, the first lens unit (e.g., B1$e$-B1$l$) includes a reflective member that deflects the optical axis by a designed angle (e.g., approximately 90°). Accordingly, the lens thickness in the direction toward the object (along the depth of the image pickup apparatus) can be reduced.

In the sixth to eleventh exemplary embodiments, the reflective member that deflects the optical axis by a designed angular amount (e.g., about 90°) can be a prism (e.g., Pe-Pj) having a reflective surface. In addition, a plane mirror HM can be used in the twelfth exemplary embodiment, and no reflective member is used in the thirteenth exemplary embodiment.

In the sixth to thirteenth exemplary embodiments, one or more of the conditional expressions shown below can be satisfied to obtain high image quality with a small system.

When Fi is the focal length of the $i^{th}$ lens unit (i=1, 2, 3) and Fw is the focal length of the overall system at the wide-angle end, one or more of the following expressions can be satisfied:

$$-0.5 < Fw/F1 < 0.1 \quad (6)$$

$$0.9 < F2/Fw < 1.6 \quad (7)$$

$$0.9 < |F3/Fw| < 1.9 \quad (8)$$

Conditional Expression (6) shows a condition of the refractive power of the first lens unit (e.g., B1e-B1l) at the wide-angle and. Conditional Expression (6) can be set for reducing the lens diameters and obtaining high image quality.

When the value of Conditional Expression (6) is above the upper limit, the positive refractive power of the first lens unit (e.g., B1e-B1l) can be too high, and therefore the position of the virtual image of the object formed by the first lens unit (e.g., B1e-B1l) is shifted toward the object side. Accordingly, the back focus of the object image formed by the second and third lens units (e.g., B2e-B2l and B3e-B3l) can be reduced. As a result, the diameter of the third lens unit (e.g., B3e-B3l) can be increased to obtain a certain amount of peripheral light.

When the value of Conditional Expression (6) is below the lower limit, the negative refractive power of the first lens unit B1 can be too high. Therefore, a large positive spherical aberration that is difficult to correct can occur at the first lens unit (e.g., B1e-B1l) when the zoom position is at the telephoto end.

Conditional Expression (7) shows a condition of the refractive power of the second lens unit (e.g., B2e-B2l).

When the positive refractive power of the second lens unit (e.g., B2e-B2l) is too low and the value of Conditional Expression (7) is above the upper limit, the negative refractive power of the third lens unit (e.g., B3e-B3l) can be reduced to obtain a desired field angle at the wide-angle end.

As a result, the second and third lens units B2 and B3 can be moved long distances along the optical axis to obtain a certain zooming effect, which increases the size of the overall lens system.

When the positive refractive power of the second lens unit B2 can be too high and the value of Conditional Expression (7) is below the lower limit, the back focus is too short and a space for placing a filter and a cover glass for the image pickup device cannot be ensured.

Conditional Expression (8) shows a condition of the negative refractive power of the third lens unit (e.g., B3e-B3l).

When the negative refractive power of the third lens unit (e.g., B3e-B3l) is low and the value of Conditional Expression (8) is above the upper limit, the magnification-changing effect obtained by the third lens unit (e.g., B3e-B3l) during zooming can be reduced. Therefore, each lens unit can be moved a long distance to obtain a certain zoom ratio. As a result, the length of the overall lens system can be increased.

When the value of Conditional Expression (8) is below the lower limit, effect of the telephoto system in the overall optical system can be increased and the back focus is excessively reduced. In addition, the diameter of the third lens unit (e.g., B3e-B3l) can be increased to obtain a certain amount of peripheral light. In addition, large amounts of image-plane distortion and astigmatism occur.

When the lateral magnification of the third lens unit (e.g., B3e-B3l) at the wide-angle end is $\beta 3w$, the following expression can be satisfied:

$$1 < \beta 3w < 1.6 \quad (9)$$

When the value of Conditional Expression (9) is above the upper limit, the back focus is excessively reduced. When the value of Conditional Expression (9) is below the lower limit, the length of the overall lens system can be increased.

The ratio of the refractive power of the third lens unit (e.g., B3e-B3l) to the refractive power of the second lens unit (e.g., B2e-B2l) can satisfy the following expression:

$$0.6 < |F2/F3| < 1.4 \quad (10)$$

When the value of Conditional Expression (10) is out of the numerical range, it is difficult to obtain high-quality images without increasing the size of the optical system.

More specifically, when the value of Conditional Expression (10) is above the upper limit, the refractive power of the third lens unit (e.g., B3e-B3l) is high relative to that of the second lens unit (e.g., B2e-B2l). This can reduce the overall length of the optical system since the effect of the telephoto system can be increased. However, large high-order off-axis aberration and lateral chromatic aberration that can be difficult to correct occur at the third lens unit (e.g. B3e-B3l).

In reverse, when the value of Conditional Expression (10) is below the lower limit, the overall length of the optical system can be increased. In addition, a large spherical aberration can occur at the second lens unit (e.g., B2e-B2l).

The numerical ranges of Conditional Expressions (6) to (10) can also be set as follows:

$$-0.4 < Fw/F1 < 0.05 \quad (6a)$$

$$1.0 < F2/Fw < 1.5 \quad (7a)$$

$$1.0 < |F3/Fw| < 1.7 \quad (8a)$$

$$1.1 < \beta 3w < 1.5 \quad (9a)$$

$$0.7 < |F2/F3| < 1.3 \quad (10a)$$

To obtain a small, high-performance optical system including a small number of lenses, it can be effective to place one or more aspherical surfaces in each of the second and third lens units (e.g., B2e-B2l and B3e-B3l). When the second lens unit (e.g., B2e-B2l) has an aspherical surface, it can be configured to reduce mainly a spherical aberration. When the third lens unit (e.g., B3e-B3l) has an aspherical surface, the off-axis aberrations can be reduced with a good balance.

To ensure the image quality over the entire zoom area without increasing the outer diameter (effective diameter) of the first lens unit (e.g., B1e-B1l), it is effective to place an aperture stop (e.g., SPe-SPl) between the first and second lens units (e.g., B1e-B1l and B2e-B2l). In addition, to improve the image quality and reduce costs, the structures described below can be used.

In each exemplary embodiment, a compound aspherical lens (so-called replica aspherical lens) can be used as the lens having an aspherical surface (aspherical lens) to increase the number of kinds of lenses that can be used in view of productivity.

In addition, for ease of manufacturing, the aspherical lens can be made of a plastic material or any other easily manufactured optical material as known by one of ordinary skill in the relevant arts and equivalents.

An entrance pupil position can be set by moving the aperture stop (e.g., SPe-SPl) along the optical axis individually of the lens units during zooming. Alternatively, the aperture stop (e.g., SPe-SPl) can also be fixed on the optical axis during zooming to make the mechanical structure simpler.

The lens system can further include a diffractive optical element or a gradient index lens to increase the optical performance.

During shooting, to correct image shake, which can degrade the image quality, caused by hand shake, the deflection angle or the deflection direction can be changed by decentering a lens unit or an element included in the lens unit, by rotating the reflective member, or by moving the reflective member.

Focusing from an object at infinity to an object at a finite distance can be performed by moving (e.g., Z5-Z12) the third lens unit (e.g., B3e-B3l) toward the object side along the optical axis. Alternatively, focusing can also be performed by moving (e.g., Y5-Y12) the second lens unit B2 or by moving both the second and third lens units B2 and B3 simultaneously toward the object side along the optical axis.

The structure of the lens unit according to the sixth to thirteenth exemplary embodiments will be described below.

The first lens unit (e.g., B1e-B1l) can include an eleventh lens element (e.g., G11e-G11l) having a negative refractive power, the deflecting member (e.g., a prism P, a reflective mirror, or other deflective member as known by one of ordinary skill and equivalents), and a twelfth lens element (e.g., G12e-G12l) having a positive refractive power in order from the object side to the image side. The curvature (reciprocal of radius of curvature) of the eleventh lens element (e.g., G11e-G11l) can be larger on the image side than on the object side.

Each lens element includes one or more lenses. The twelfth lens element (e.g., G12e-G12l) can be combination to the prism (e.g. Pe-Pj') when the prism is used as the deflecting member. The exit surface of the prism (e.g. Pe-Pj) can be formed in a convex shape so as to provide a positive refractive power. In addition, the entrance surface of the prism (e.g. Pe-Pj) can be formed in a concave shape so as to provide a negative refractive power. The eleventh lens element (e.g., G11e-G11l) can also be combined with the prism (e.g. Pe-Pj).

When the deflecting function is not required in the optical system, the air distance (space) between the eleventh and twelfth lens elements (e.g., G11k-G11l and G12k-G12l) can be reduced to shorten the length of the overall optical system.

In such a case, the eleventh lens element (e.g., G11k-G11l) can be fixed on the optical axis to make the mechanism simpler. However, the eleventh lens element (e.g., G11k-G11l) can also be designed to be moveable during zooming to improve the optical performance.

The second lens unit (e.g., B2k-B2l) can include a plurality of positive lenses and at least one negative lens. For example, the second lens unit (e.g., B2k-B2l) includes a positive lens element (e.g., G21k-G21l), a negative lens element (e.g., G22k-G22l), and a positive lens element (e.g., G23k-G23l) in order from the object side to the image side, and reduces the aberrations.

The third lens unit (e.g., B3k-B3l) includes a negative lens element including only one negative lens or both a positive lens and a negative lens.

When the third lens unit (e.g., B3k-B3l) includes a negative lens element including a simple negative lens, it can be formed in a shape such that the curvature of the surface on the image side can be larger than that of the surface on the object side.

In addition, to increase the image quality, the third lens unit (e.g., B3k-B3l) can include a negative lens on the object side of the lens having an aspherical surface on the image side, the negative lens having a concave surface on the image side.

A lens unit having a small refractive power that does not largely influence the overall refractive-power arrangement can be additionally provided on the object side of the first lens unit (e.g., B1e-B1l) or on the image side of the third lens unit (e.g., B3e-B1l).

Next, sixth to thirteenth numerical examples corresponding to the sixth to thirteenth exemplary embodiments, respectively, will be described. Symbols used in each numeral example is similar to those used in the first to fifth numerical examples, and explanations thereof are thus omitted.

Table 2 shows the values of Conditional Expressions (6) to (10) in each of the sixth to thirteenth exemplary embodiments.

SIXTH NUMERICAL EXAMPLE f = 5.81 to 11.62, Fno = 2.58 to 5.00, 2ω = 54.6 to 28.9

| R1 = 31.228 | D1 = 0.80 | N1 = 1.696797 | ν1 = 55.5 |
|---|---|---|---|
| R2 = 6.560 | D2 = 2.50 | | |
| R3 = ∞ | D3 = 7.50 | N2 = 1.696797 | ν2 = 55.5 |
| R4 = ∞ | D4 = 0.20 | | |
| R5 = 17.090 | D5 = 1.70 | N3 = 1.719995 | ν3 = 50.2 |
| R6 = −184.750 | D6 = variable | | |
| R7 = diaphragm | D7 = 0.70 | | |
| R8 = 8.734 | D8 = 1.70 | N4 = 1.733997 | ν4 = 51.5 |
| R9 = 20.421 | D9 = 0.40 | | |
| R10 = 34.530 | D10 = 1.70 | N5 = 1.719995 | ν5 = 50.2 |
| R11 = −8.541 | D11 = 0.60 | N6 = 1.800999 | ν6 = 35.0 |
| R12 = 12.151 | D12 = 0.20 | | |
| *R13 = 7.827 | D13 = 1.70 | N7 = 1.487490 | ν7 = 70.2 |
| *R14 = −4.744 | D14 = variable | | |
| *R15 = 926.758 | D15 = 1.50 | N8 = 1.749497 | ν8 = 35.3 |
| *R16 = −1871.398 | D16 = 0.50 | | |
| R17 = −7.786 | D17 = 0.70 | N9 = 1.729157 | ν9 = 54.7 |
| R18 = 12.012 | D18 = variable | | |
| R19 = ∞ | D19 = 0.60 | N10 = 1.516330 | ν10 = 64.1 |
| R20 = ∞ | | | |

| | Focal Length | | |
|---|---|---|---|
| Variable Distance | 5.81 | 8.13 | 11.62 |
| D6 | 6.18 | 4.45 | 0.98 |
| D14 | 2.93 | 1.53 | 0.49 |
| D18 | 0.50 | 3.64 | 8.14 |

Aspherical Coefficients

13th Surface: k = −1.46645e+01 A = 0 B = −6.87569e−04
  C = −6.88440e−04 D = −3.51490e−05 E = −1.21669e−05
14th Surface: k = 7.03414e−01 A = 0 B = 1.17600e−04
  C = −4.53702e−04 D = 1.23625e−05 E = −8.60067e−06
15th Surface: k = −4.70761e+06 A = 0 B = 4.09016e−03
  C = −4.72506e−04 D = 1.62987e−04 E = −1.49799e−05
16th Surface: k = −3.93361e+06 A = 0 B = 4.73146e−03
  C = −5.89916e−05 D = 1.00802e−04 E = −2.00945e−06

SEVENTH NUMERICAL EXAMPLE

| f = 5.91 to 11.83, Fno = 2.57 to 5.00, 2ω = 53.8 to 28.5 ||||
|---|---|---|---|
| R1 = 15.692 | D1 = 0.80 | N1 = 1.696797 | ν1 = 55.5 |
| R2 = 5.961 | D2 = 2.50 | | |
| R3 = ∞ | D3 = 7.50 | N2 = 1.491710 | ν2 = 57.4 |
| R4 = ∞ | D4 = 1.00 | N3 = 1.491710 | ν3 = 57.4 |
| *R5 = −11.800 | D5 = variable | | |
| R6 = diaphragm | D6 = 0.70 | | |
| R7 = 4.465 | D7 = 1.70 | N4 = 1.516330 | ν4 = 64.1 |
| R8 = 6.154 | D8 = 0.15 | | |
| R9 = 21.445 | D9 = 1.70 | N5 = 1.719995 | ν5 = 50.2 |
| R10 = 11.791 | D10 = 0.60 | N6 = 1.846660 | ν6 = 23.8 |
| R11 = 6.475 | D11 = 0.40 | | |
| *R12 = 5.672 | D12 = 1.70 | N7 = 1.583126 | ν7 = 59.4 |
| *R13 = −5.766 | D13 = variable | | |
| R14 = 53.004 | D14 = 0.80 | N8 = 1.806098 | ν8 = 40.9 |
| *R15 = 5.515 | D15 = variable | | |
| R16 = ∞ | D16 = 0.60 | N9 = 1.806098 | ν9 = 40.9 |
| R17 = ∞ | | | |

| | Focal Length | | |
|---|---|---|---|
| Variable Distance | 5.91 | 8.28 | 11.83 |
| D5 | 6.40 | 4.51 | 0.50 |
| D13 | 3.73 | 1.96 | 0.64 |
| D15 | 0.80 | 4.47 | 9.80 |

| Aspherical Coefficients ||
|---|---|
| 5th Surface: | k = −1.53416e+00 A = 0 B = −6.35417e−05 |
| | C = 5.63914e−08 D = 3.57834e−07 E = −3.17390e−08 |
| 12th Surface: | k = −3.37130e+00 A = 0 B = −1.45081e−03 |
| | C = −6.48134e−04 D = 5.78733e−05 E = −2.29300e−05 |
| 13th Surface: | k = 1.75909e+00 A = 0 B = 1.29360e−03 |
| | C = −5.63191e−04 D = 4.14608e−05 E = −1.20433e−05 |
| 15th Surface: | k = 2.69325e+00 A = 0 B = −2.49330e−03 |
| | C = −2.68396e−04 D = 7.85789e−05 E = −1.02456e−05 |

EIGHTH NUMERICAL EXAMPLE

| f = 5.92 to 11.85, Fno = 2.62 to 5.00, 2ω = 53.7 to 28.4 ||||
|---|---|---|---|
| R1 = 14.211 | D1 = 0.80 | N1 = 1.696797 | ν1 = 55.5 |
| R2 = 6.127 | D2 = 2.50 | | |
| R3 = ∞ | D3 = 7.50 | N2 = 1.491710 | ν2 = 57.4 |
| R4 = ∞ | D4 = 1.00 | N3 = 1.491710 | ν3 = 57.4 |
| *R5 = −14.152 | D5 = variable | | |
| R6 = diaphragm | D6 = 0.70 | | |
| R7 = 4.089 | D7 = 1.70 | N4 = 1.516330 | ν4 = 64.1 |
| R8 = 4.539 | D8 = 0.30 | | |
| R9 = 15.349 | D9 = 2.50 | N5 = 1.846660 | ν5 = 23.8 |
| R10 = 6.833 | D10 = 0.47 | | |
| *R11 = 5.404 | D11 = 1.80 | N6 = 1.583126 | ν6 = 59.4 |
| *R12 = −5.275 | D12 = variable | | |
| R13 = 54.937 | D13 = 0.80 | N7 = 1.806098 | ν7 = 40.9 |
| *R14 = 5.259 | D14 = variable | | |
| R15 = ∞ | D15 = 0.60 | N8 = 1.806098 | ν8 = 40.9 |
| R16 = ∞ | | | |

| | Focal Length | | |
|---|---|---|---|
| Variable Distance | 5.92 | 8.29 | 11.85 |
| D5 | 6.18 | 4.27 | 0.50 |
| D12 | 3.24 | 1.65 | 0.49 |
| D14 | 1.00 | 4.49 | 9.44 |

| Aspherical Coefficients ||
|---|---|
| 5th Surface: | k = −2.45148e+00 A = 0 B = −1.03381e−04 |
| | C = 1.84803e−05 D = −1.44811e−06 E = 3.64019e−08 |
| 11th Surface: | k = −6.26930e+00 A = 0 B = −8.07681e−04 |
| | C = −6.45572e−04 D = −1.08870e−04 E = −2.14301e−05 |
| 12th Surface: | k = 2.14224e+00 A = 0 B = 1.16212e−03 |
| | C = −5.93987e−04 D = 7.89318e−06 E = −1.37650e−05 |
| 14th Surface: | k = 2.20048e+00 A = 0 B = −2.68794e−03 |
| | C = −1.97216e−04 D = 7.61739e−05 E = −9.79035e−06 |

NINTH NUMERICAL EXAMPLE

| f = 5.93 to 11.87, Fno = 2.64 to 5.00, 2ω = 53.6 to 28.4 ||||
|---|---|---|---|
| R1 = 12.912 | D1 = 0.80 | N1 = 1.696797 | ν1 = 55.5 |
| R2 = 6.375 | D2 = 2.50 | | |
| R3 = ∞ | D3 = 8.50 | N2 = 1.491710 | ν2 = 57.4 |
| R4 = ∞ | D4 = 1.00 | N3 = 1.491710 | ν3 = 57.4 |
| *R5 = −17.336 | D5 = variable | | |
| R6 = diaphragm | D6 = 0.70 | | |
| *R7 = 322.434 | D7 = 1.70 | N4 = 1.491710 | ν4 = 57.4 |
| R8 = −8.961 | D8 = 0.15 | | |
| R9 = 17.520 | D9 = 3.20 | N5 = 1.846660 | ν5 = 23.8 |
| R10 = 7.208 | D10 = 0.10 | | |
| R11 = 10.962 | D11 = 1.80 | N6 = 1.696797 | ν6 = 55.5 |
| R12 = −6.532 | D12 = variable | | |
| R13 = 41.137 | D13 = 0.80 | N7 = 1.806098 | ν7 = 40.9 |
| *R14 = 5.701 | D14 = variable | | |
| R15 = ∞ | D15 = 0.60 | N8 = 1.806098 | ν8 = 40.9 |
| R16 = ∞ | | | |

| | Focal Length | | |
|---|---|---|---|
| Variable Distance | 5.93 | 8.31 | 11.87 |
| D5 | 6.49 | 4.50 | 0.50 |
| D12 | 3.69 | 1.84 | 0.49 |
| D14 | 1.00 | 4.84 | 10.19 |

| Aspherical Coefficients ||
|---|---|
| 5th Surface: | k = −4.81713e+01 A = 0 B = −9.73980e−04 |
| | C = 5.78651e−05 D = −2.13889e−06 E = 4.60793e−08 |
| 7th Surface: | k = −7.55840e+05 A = 0 B = −6.77442e−05 |
| | C = −6.21837e−05 D = −5.42421e−05 E = 1.10957e−05 |
| 14th Surface: | k = 2.99027e+00 A = 0 B = −2.40642e−03 |
| | C = 3.74033e−05 D = −3.47200e−05 E = −1.26362e−06 |

TENTH NUMERICAL EXAMPLE

| f = 5.92 to 11.84, Fno = 2.83 to 5.00 2ω = 53.8 to 28.4 ||||
|---|---|---|---|
| R1 = 13.901 | D1 = 0.80 | N1 = 1.696797 | ν1 = 55.5 |
| R2 = 6.887 | D2 = 2.50 | | |
| R3 = ∞ | D3 = 8.50 | N2 = 1.491710 | ν2 = 57.4 |
| R4 = ∞ | D4 = 1.00 | N3 = 1.491710 | ν3 = 57.4 |
| *R5 = −47.696 | D5 = variable | | |
| R6 = diaphragm | D6 = 0.70 | | |
| *R7 = 390.050 | D7 = 1.70 | N4 = 1.491710 | ν4 = 57.4 |
| R8 = −4.718 | D8 = 0.15 | | |
| R9 = 13.728 | D9 = 3.00 | N5 = 1.846660 | ν5 = 23.8 |
| R10 = 6.445 | D10 = 0.20 | | |
| R11 = −28.965 | D11 = 1.80 | N6 = 1.491710 | ν6 = 57.4 |
| *R12 = −3.873 | D12 = variable | | |

-continued

| | | | |
|---|---|---|---|
| R13 = 62.333 | D13 = 0.80 | N7 = 1.583060 | ν7 = 30.2 |
| *R14 = 4.834 | D14 = variable | | |
| R15 = ∞ | D15 = 0.60 | N8 = 1.516330 | ν8 = 64.1 |
| R16 = ∞ | | | |

| | Focal Length | | |
|---|---|---|---|
| Variable Distance | 5.92 | 8.28 | 11.84 |
| D5 | 5.75 | 3.85 | 0.48 |
| D12 | 3.51 | 1.68 | 0.48 |
| D14 | 1.00 | 4.72 | 9.30 |

Aspherical Coefficients

| | | | |
|---|---|---|---|
| 5th Surface: | k = −2.68908e+02<br>C = 1.06059e−04 | A = 0<br>D = −1.02065e−05 | B = −3.87119e−04<br>E = 4.31045e−07 |
| 7th Surface: | k = −7.55840e+05<br>C = −1.19637e−04 | A = 0<br>D = −4.73134e−05 | B = −3.18389e−03<br>E = 1.19132e−05 |
| 12th Surface: | k = 8.38632e−02<br>C = −3.04922e−04 | A = 0<br>D = −1.10847e−05 | B = 1.68911e−03<br>E = 8.92638e−06 |
| 14th Surface: | k = 1.89274e+00<br>C = 1.34005e−04 | A = 0<br>D = −1.45233e−05 | B = −3.63853e−03<br>E = −5.43804e−06 |

ELEVENTH NUMERICAL EXAMPLE f = 5.93 to 11.86, Fno = 2.53 to 4.90, 2ω = 53.7 to 28.4

| | | | |
|---|---|---|---|
| R1 = 14.850 | D1 = 0.80 | N1 = 1.696797 | ν1 = 55.5 |
| R2 = 6.000 | D2 = 2.50 | | |
| R3 = ∞ | D3 = 7.50 | N2 = 1.696797 | ν2 = 55.5 |
| R4 = ∞ | D4 = 0.20 | | |
| R5 = 15.414 | D5 = 1.70 | N3 = 1.719995 | ν3 = 50.2 |
| R6 = 101.631 | D6 = variable | | |
| R7 = diaphragm | D7 = 0.70 | | |
| R8 = 8.005 | D8 = 2.00 | N4 = 1.729157 | ν4 = 54.7 |
| R9 = −10.983 | D9 = 0.60 | N5 = 1.800999 | ν5 = 35.0 |
| R10 = 10.278 | D10 = 0.40 | | |
| *R11 = 16.834 | D11 = 1.70 | N6 = 1.583126 | ν6 = 59.4 |
| *R12 = −4.797 | D12 = variable | | |
| *R13 = 200.460 | D13 = 1.50 | N7 = 1.491710 | ν7 = 57.4 |
| *R14 = 140.915 | D14 = 0.50 | | |
| R15 = −10.529 | D15 = 0.70 | N8 = 1.799516 | ν8 = 42.2 |
| R16 = 9.677 | D16 = variable | | |
| R17 = ∞ | D17 = 0.60 | N9 = 1.516330 | ν9 = 64.1 |
| R18 = ∞ | | | |

| | Focal Length | | |
|---|---|---|---|
| Variable Distance | 5.93 | 8.30 | 11.86 |
| D6 | 6.03 | 4.35 | 1.01 |
| D12 | 2.80 | 1.45 | 0.45 |
| D16 | 0.50 | 3.53 | 7.86 |

Aspherical Coefficients

| | | | |
|---|---|---|---|
| 11th Surface: | k = −3.39128e+01<br>C = −6.45997e−04 | A = 0<br>D = −3.15980e−05 | B = −4.24625e−03<br>E = −9.25428e−06 |
| 12th Surface: | k = 1.53104e+00<br>C = −4.72887e−04 | A = 0<br>D = 8.34842e−05 | B = −2.36218e−04<br>E = −1.28464e−05 |
| 13th Surface: | k = −4.70761e+06<br>C = −6.31844e−04 | A = 0<br>D = 2.57699e−04 | B = 4.40682e−03<br>E = −2.64686e−05 |
| 14th Surface: | k = −3.93361e+06<br>C = −5.28202e−04 | A = 0<br>D = 2.96821e−04 | B = 6.67082e−03<br>E = −2.08240e−05 |

TWELFTH NUMERICAL EXAMPLE f = 5.93 to 11.86, Fno = 2.49 to 5.00, 2ω = 53.7 to 28.4

| | | | |
|---|---|---|---|
| R1 = 18.708 | D1 = 0.80 | N1 = 1.696797 | ν1 = 55.5 |
| R2 = 7.473 | D2 = 11.00 | | |
| R3 = 20.885 | D3 = 2.00 | N2 = 1.491710 | ν2 = 57.4 |
| *R4 = −40.235 | D4 = variable | | |
| R5 = diaphragm | D5 = 0.70 | | |
| *R6 = 26.740 | D6 = 1.70 | N3 = 1.491710 | ν3 = 57.4 |
| *R7 = −9.798 | D7 = 0.15 | | |
| R8 = 13.824 | D8 = 2.77 | N4 = 1.846660 | ν4 = 23.8 |
| R9 = 5.059 | D9 = 0.30 | | |
| R10 = 5.955 | D10 = 1.80 | N5 = 1.491710 | ν5 = 57.4 |
| *R11 = −4.398 | D11 = variable | | |
| R12 = −20.197 | D12 = 0.80 | N6 = 1.491710 | ν6 = 57.4 |
| *R13 = 3.820 | D13 = variable | | |
| R14 = ∞ | D14 = 0.60 | N7 = 1.516330 | ν7 = 64.1 |
| R15 = ∞ | | | |

| | Focal Length | | |
|---|---|---|---|
| Variable Distance | 5.93 | 9.49 | 11.86 |
| D4 | 7.12 | 3.78 | 0.88 |
| D11 | 2.95 | 1.10 | 0.48 |
| D13 | 1.00 | 6.20 | 9.71 |

Aspherical Coefficients

| | | | |
|---|---|---|---|
| 4th Surface: | k = −7.77277e+02<br>C = 1.43807e−04 | A = 0<br>D = −8.13715e−06 | B = −1.20138e−03<br>E = 1.87133e−07 |
| 6th Surface: | k = −2.38206e+01<br>C = −1.34884e−04 | A = 0<br>D = 2.17279e−05 | B = 1.13757e−06<br>E = 3.36371e−06 |
| 7th Surface: | k = −1.77778e+00<br>C = 2.10087e−06 | A = 0<br>D = 4.64865e−06 | B = 9.70736e−04<br>E = 5.30854e−06 |
| 11th Surface: | k = 3.02269e−01<br>C = −4.12710e−04 | A = 0<br>D = −1.35887e−05 | B = 2.42257e−03<br>E = 1.68140e−05 |
| 13th Surface: | k = 4.37899e−01<br>C = 4.24352e−04 | A = 0<br>D = −9.46709e−05 | B = −3.66696e−03<br>E = 5.73950e−06 |

THIRTEENTH NUMERICAL EXAMPLE f = 5.97 to 10.97, Fno = 3.50 to 5.81, 2ω = 53.3 to 30.6

| | | | |
|---|---|---|---|
| R1 = 209.202 | D1 = 0.70 | N1 = 1.696797 | ν1 = 55.5 |
| R2 = 5.287 | D2 = 3.50 | | |
| R3 = 9.454 | D3 = 1.80 | N2 = 1.491710 | ν2 = 57.4 |
| *R4 = −100.183 | D4 = variable | | |
| R5 = diaphragm | D5 = 0.70 | | |
| *R6 = 10.729 | D6 = 1.70 | N3 = 1.491710 | ν3 = 57.4 |
| *R7 = −6.370 | D7 = 0.15 | | |
| R8 = 14.561 | D8 = 3.76 | N4 = 1.846660 | ν4 = 23.8 |
| R9 = 3.803 | D9 = 0.40 | | |
| R10 = 4.806 | D10 = 1.80 | N5 = 1.491710 | ν5 = 57.4 |
| *R11 = −5.655 | D11 = variable | | |
| *R12 = −348.275 | D12 = 0.80 | N6 = 1.583126 | ν6 = 59.4 |
| *R13 = 4.505 | D13 = variable | | |
| R14 = ∞ | D14 = 0.60 | N7 = 1.516330 | ν7 = 64.1 |
| R15 = ∞ | | | |

| | Focal Length | | |
|---|---|---|---|
| Variable Distance | 5.97 | 8.60 | 10.97 |
| D4 | 4.36 | 2.42 | 0.48 |
| D11 | 2.58 | 1.10 | 0.47 |
| D13 | 1.00 | 4.43 | 6.99 |

Aspherical Coefficients

| | | | |
|---|---|---|---|
| 4th Surface: | k = −1.92585e+03<br>C = 9.20184e−05 | A = 0<br>D = −1.02091e−05 | B = −4.32227e−04<br>E = 8.78649e−07 |

-continued

| | | |
|---|---|---|
| 6th Surface: | k = −2.47387e+01<br>C = −2.21213e−04 | A = 0<br>D = 3.51954e−05 | B = −7.74285e−04<br>E = −8.81065e−06 |
| 7th Surface: | k = −2.68210e+00<br>C = −9.83717e−05 | A = 0<br>D = 3.02356e−05 | B = −2.63207e−03<br>E = −5.93077e−06 |
| 11th Surface: | k = 4.99059e+00<br>C = 1.02007e−04 | A = 0<br>D = −9.44702e−05 | B = 4.83772e−03<br>E = 2.93900e−05 |
| 12th Surface: | k = 2.68521e+04<br>C = −1.15506e−04 | A = 0<br>D = −1.03795e−04 | B = −5.91408e−04<br>E = −9.30555e−06 |
| 13th Surface: | k = 1.98556e+00<br>C = −3.92360e−05 | A = 0<br>D = −9.42590e−05 | B = −4.57464e−03<br>E = −1.31748e−05 |

TABLE 2

| Conditional Expression | 6th Example | 7th Example | 8th Example | 9th Example | 10th Example | 11th Example | 12th Example | 13th Example |
|---|---|---|---|---|---|---|---|---|
| (6) |F12w/Fw| | −0.06 | −0.03 | −0.06 | −0.07 | −0.20 | −0.05 | 0.01 | −0.27 |
| (7) F3/Fw | 1.28 | 1.31 | 1.23 | 1.23 | 1.23 | 1.18 | 1.23 | 1.23 |
| (8) |F4/Fw| | 1.11 | 1.32 | 1.25 | 1.43 | 1.55 | 1.06 | 1.11 | 1.31 |
| (9) β4w | 1.27 | 1.22 | 1.26 | 1.22 | 1.22 | 1.27 | 1.32 | 1.26 |
| (10) |F3/F4| | 1.15 | 0.99 | 0.98 | 0.86 | 0.79 | 1.11 | 1.11 | 0.94 |

Next, zoom lenses according to fourteenth to eighteenth exemplary embodiments will be described. Each of the zoom lenses according to the fourteenth to eighteenth exemplary embodiments includes four lens units including a first lens unit (e.g., B1$m$-B1$q$) having a positive or negative refractive power, a second lens unit (e.g., B2$m$-B2$q$) having a negative refractive power, a third lens unit (e.g., B3$m$-B3$q$) having a positive refractive power, and a fourth lens unit (e.g., B4$m$-B4$q$) having a negative refractive power in order from the object side to the image side.

Figure 39A:
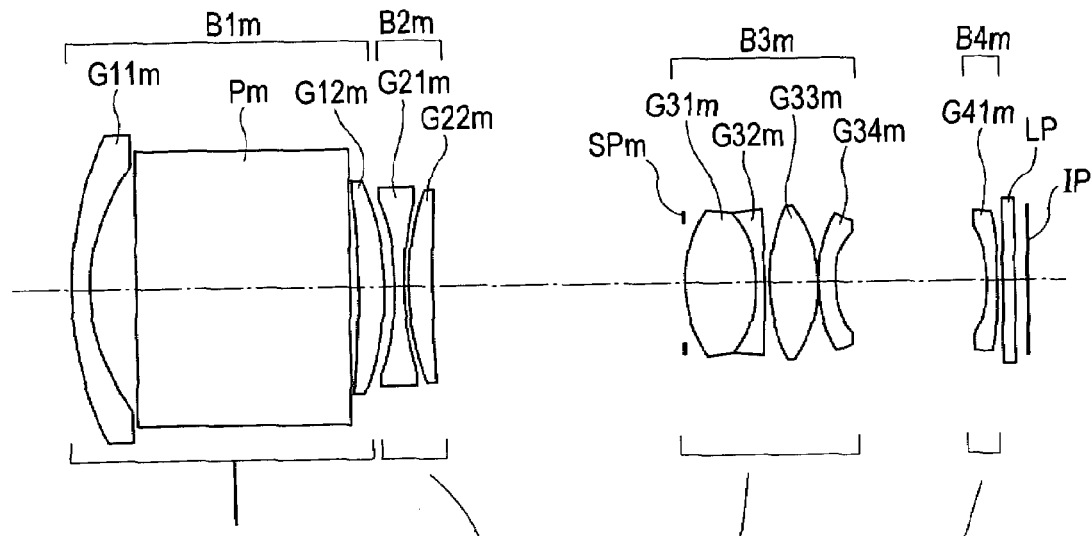
FIGS. 39A to 39C illustrate optical sectional views of a zoom lens according to a fourteenth exemplary embodiment.
Figure 39B:
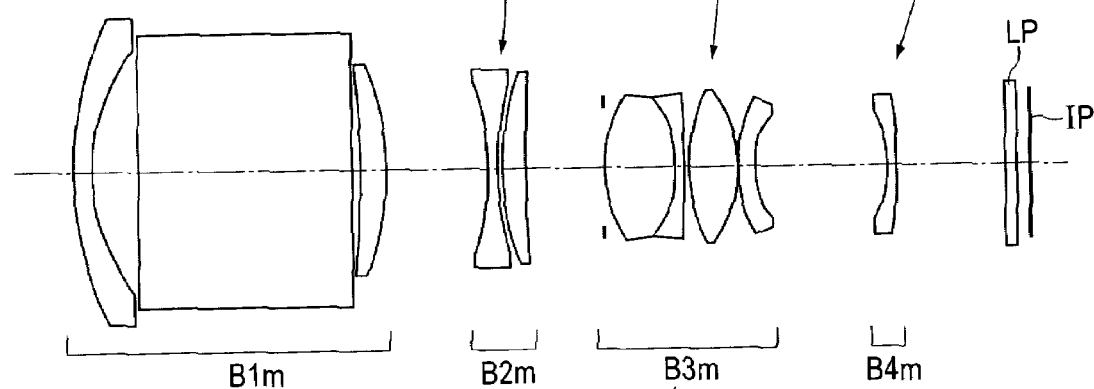
Figure 39C:
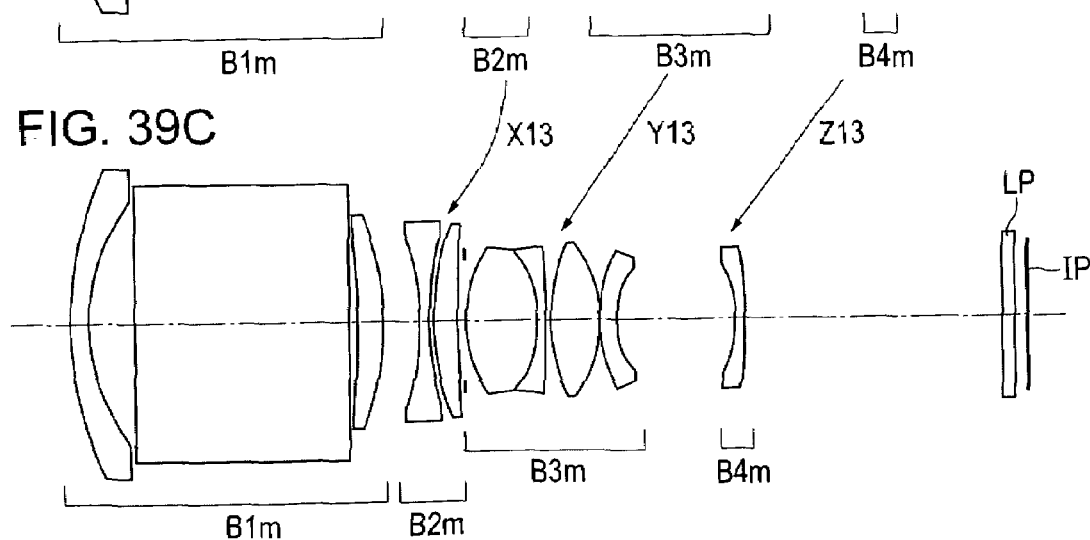
Figure 40A:
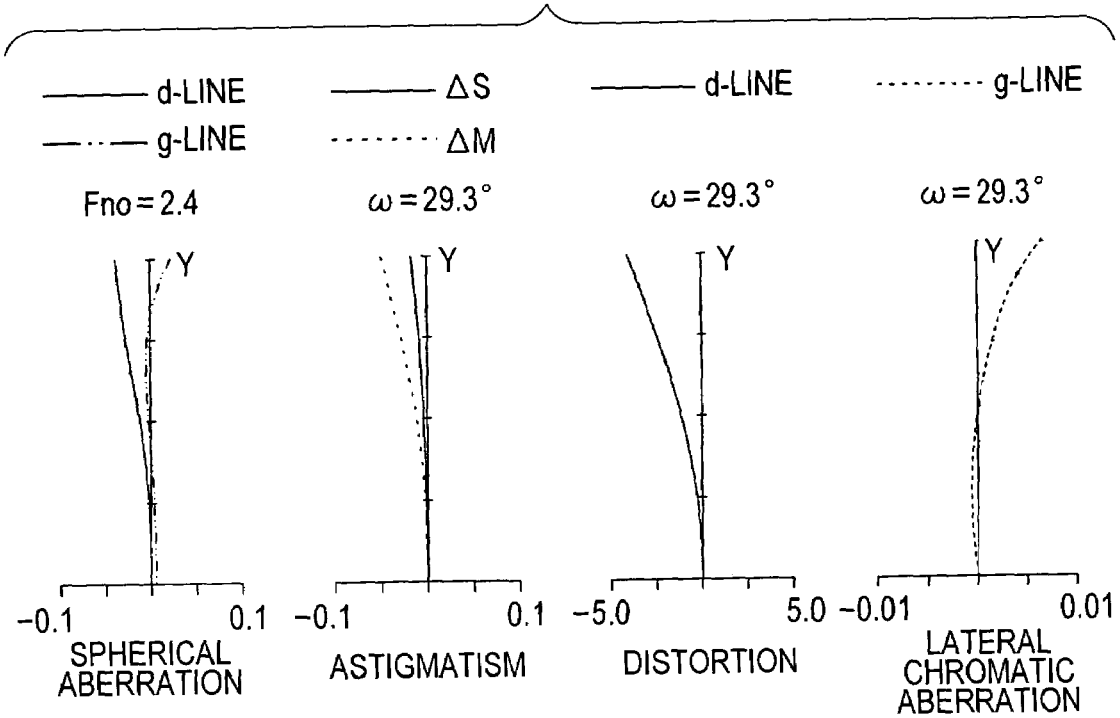
FIGS. 40A to 40C illustrate aberration diagrams of the zoom lens according to the fourteenth exemplary embodiment.
Figure 40B:
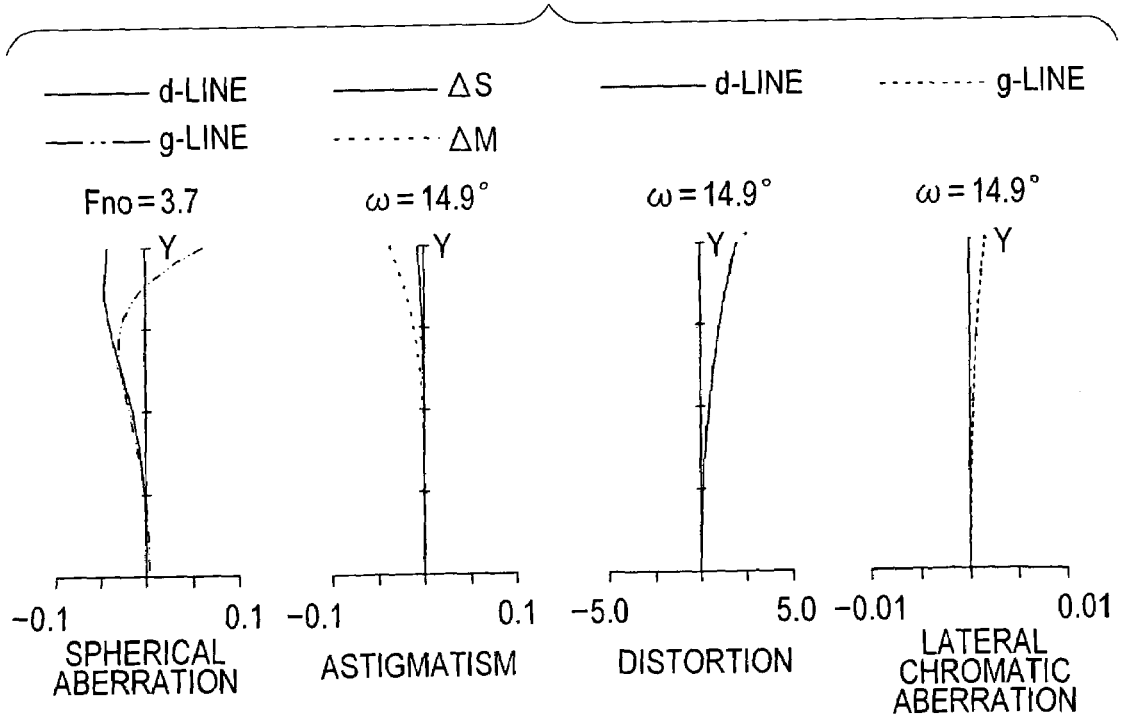
Figure 40C:
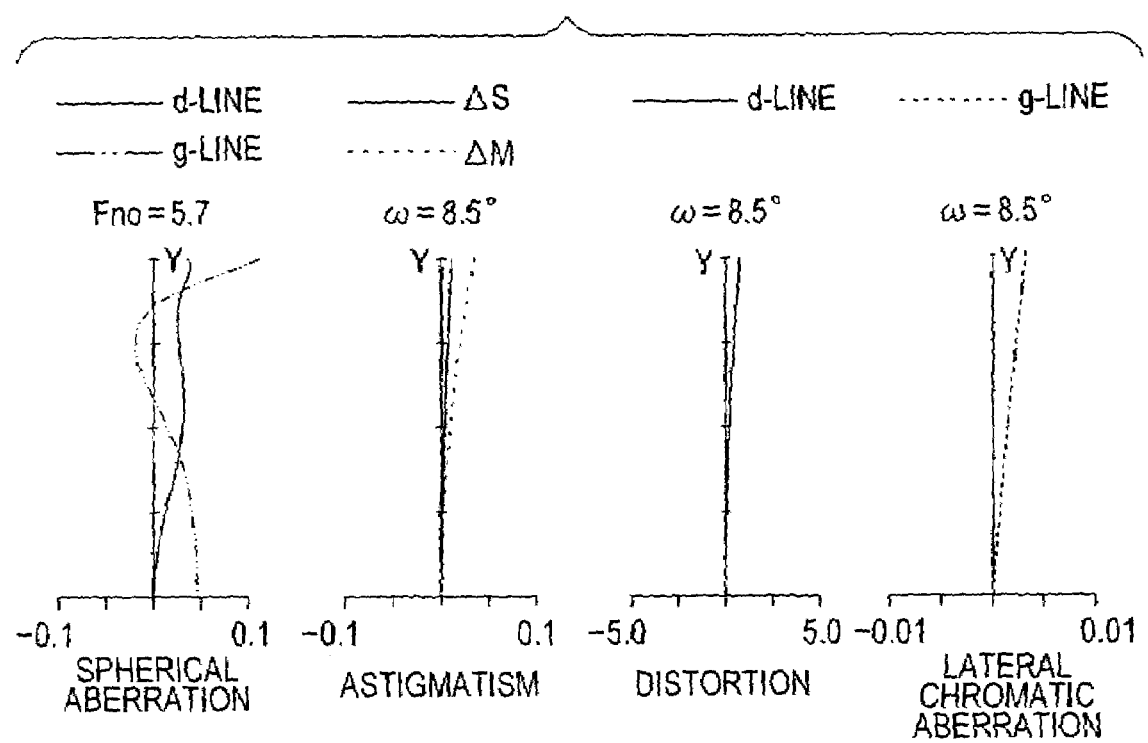

FIGS. 39A to 39C illustrate sectional views of the zoom lens according to the fourteenth exemplary embodiment at the wide-angle end, the middle zoom position, and the telephoto end, respectively. FIGS. 40A to 40C illustrate aberration diagrams of the zoom lens according to the fourteenth exemplary embodiment at the wide-angle end, the middle zoom position, and the telephoto end, respectively.

Figure 41A:
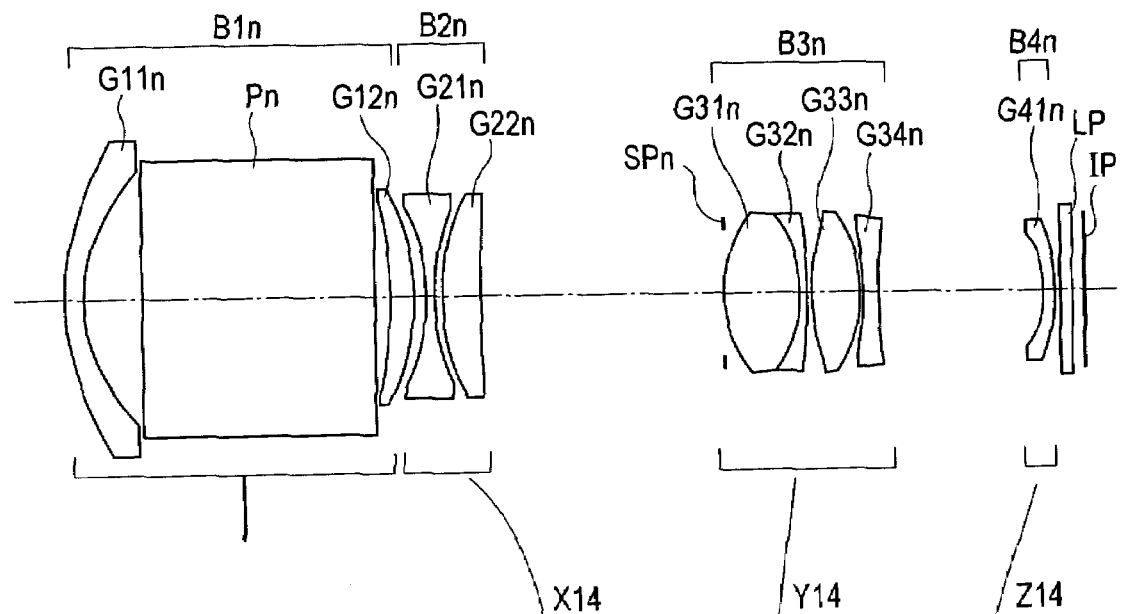
FIGS. 41A to 41C illustrate optical sectional views of a zoom lens according to a fifteenth exemplary embodiment.
Figure 41B:
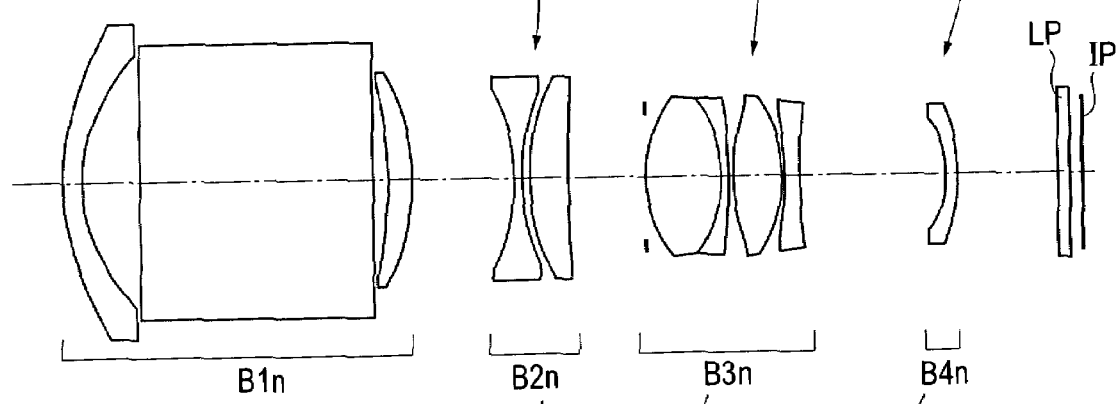
Figure 41C:
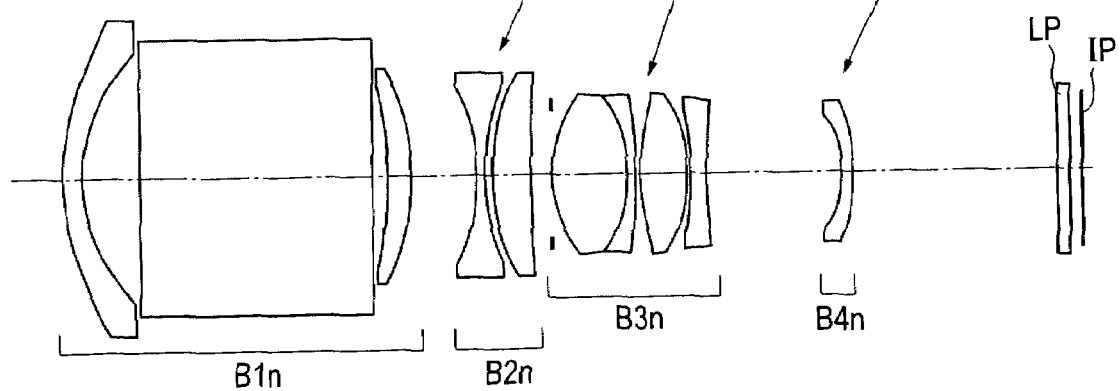
Figure 42A:
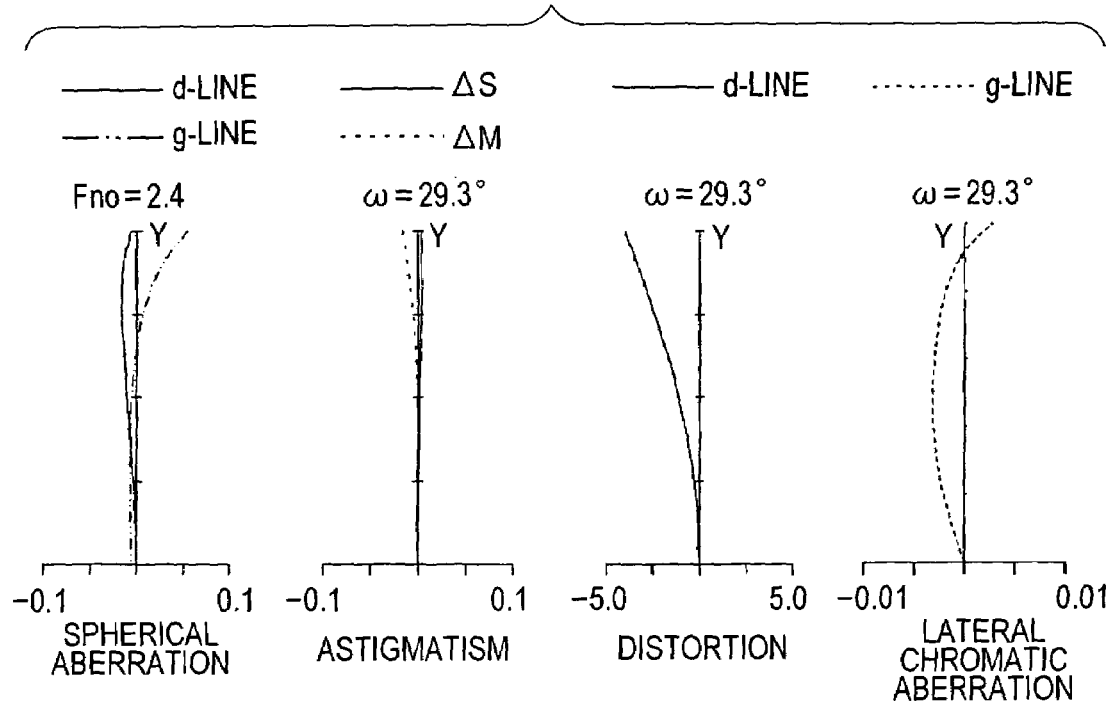
FIGS. 42A to 42C illustrate aberration diagrams of the zoom lens according to the fifteenth exemplary embodiment.
Figure 42B:
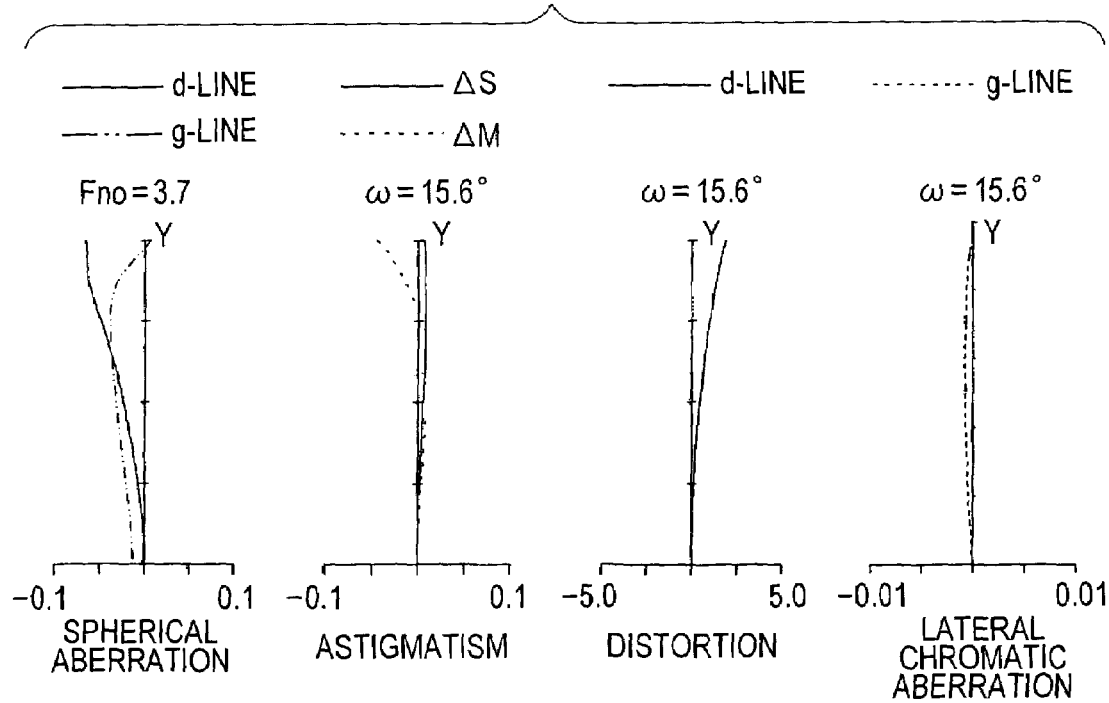
Figure 42C:
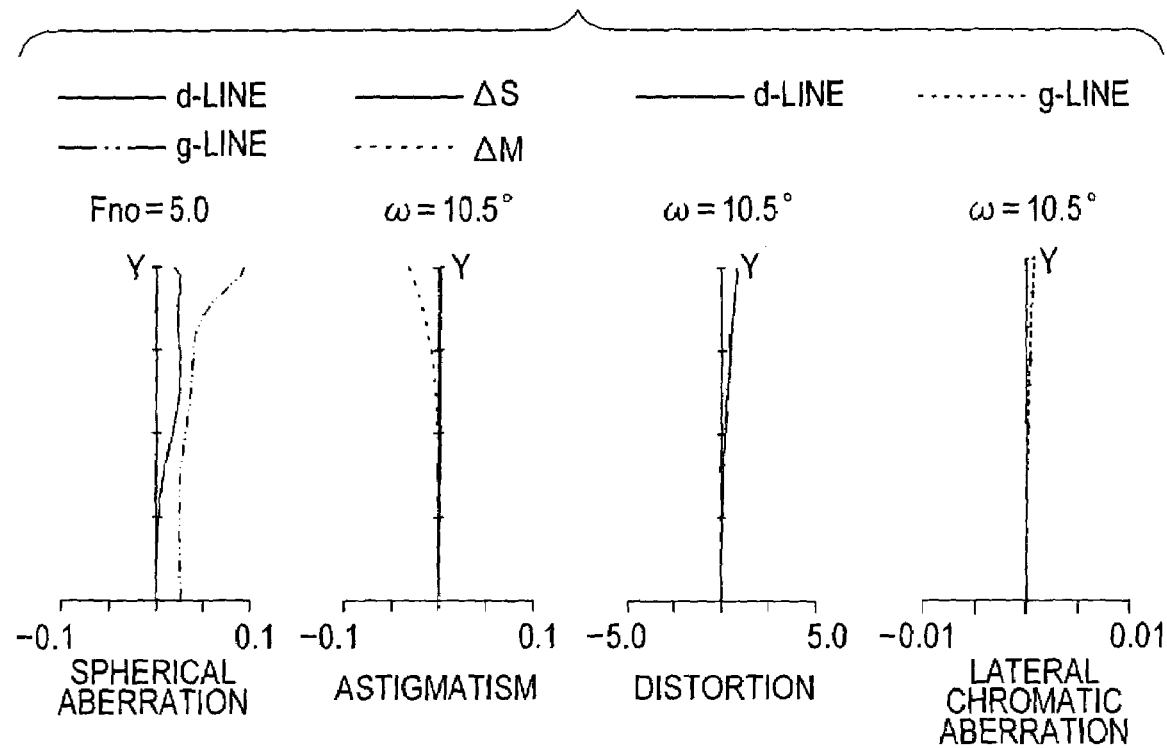

FIGS. 41A to 41C illustrate sectional views of the zoom lens according to the fifteenth exemplary embodiment at the wide-angle end, the middle zoom position, and the telephoto end, respectively. FIGS. 42A to 42C illustrate aberration diagrams of the zoom lens according to the fifteenth exemplary embodiment at the wide-angle end, the middle zoom position, and the telephoto end, respectively.

Figure 43A:
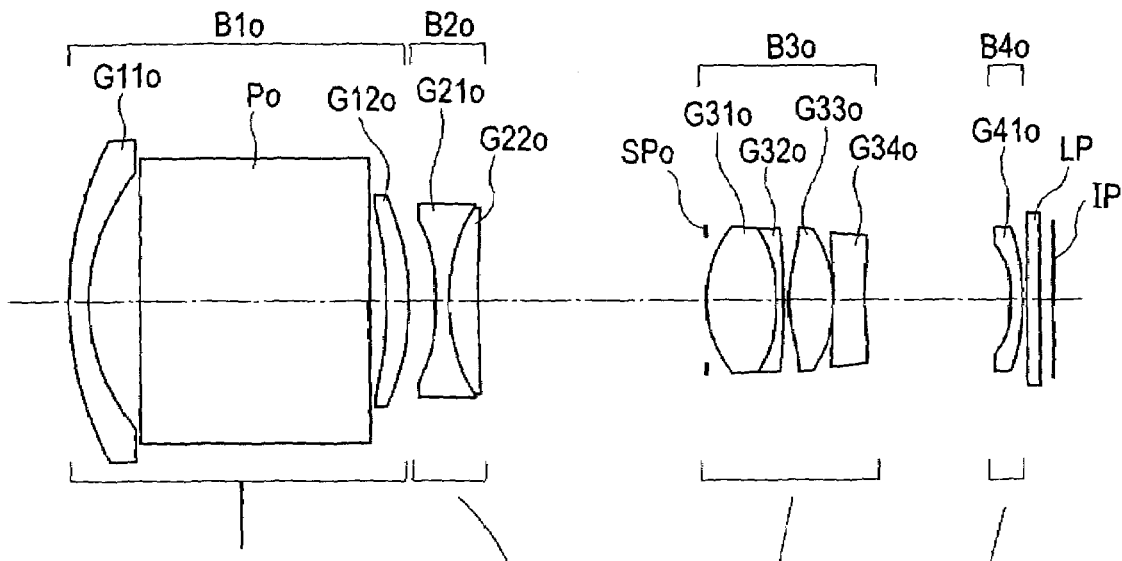
FIGS. 43A to 43C illustrate optical sectional views of a zoom lens according to a sixteenth exemplary embodiment.
Figure 43B:
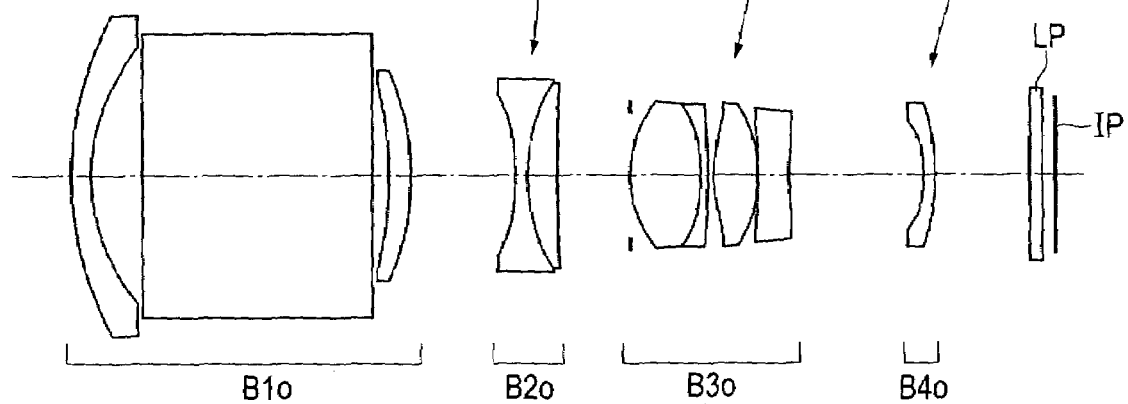
Figure 43C:
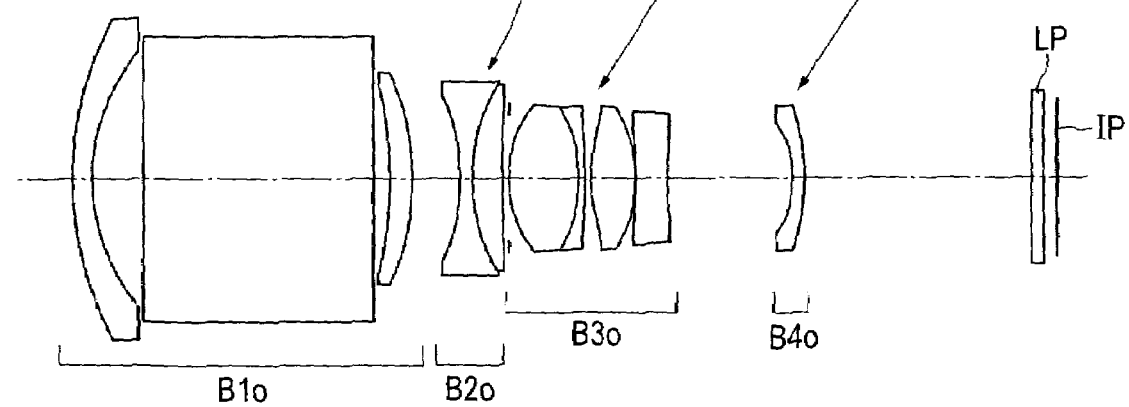
Figure 44A:
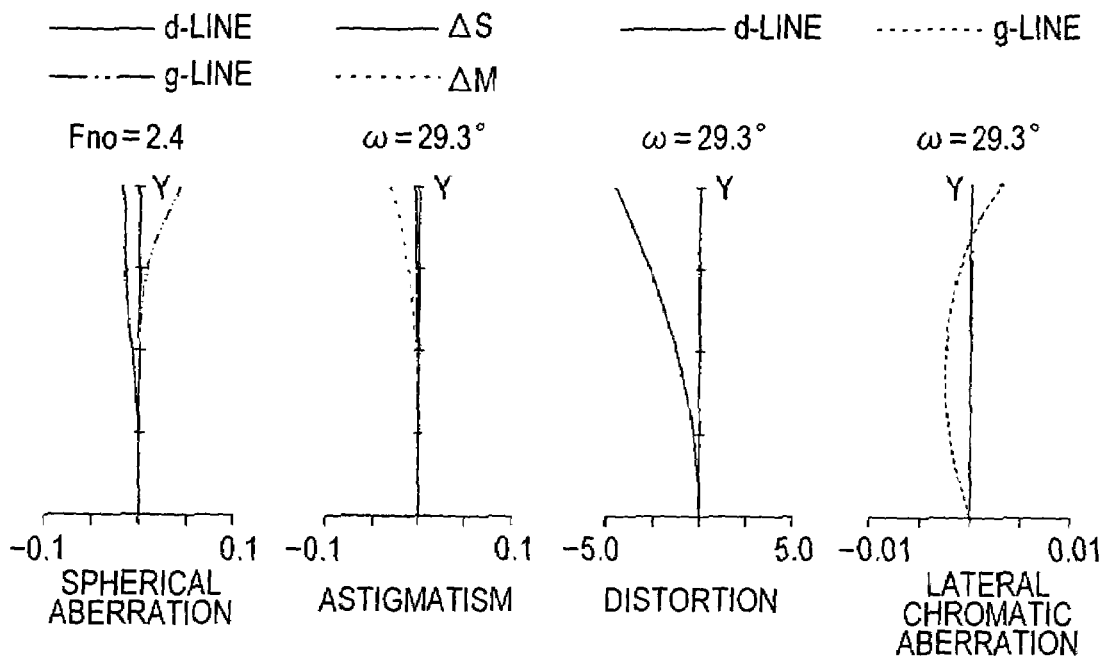
FIGS. 44A to 44C illustrate aberration diagrams of the zoom lens according to the sixteenth exemplary embodiment.
Figure 44B:
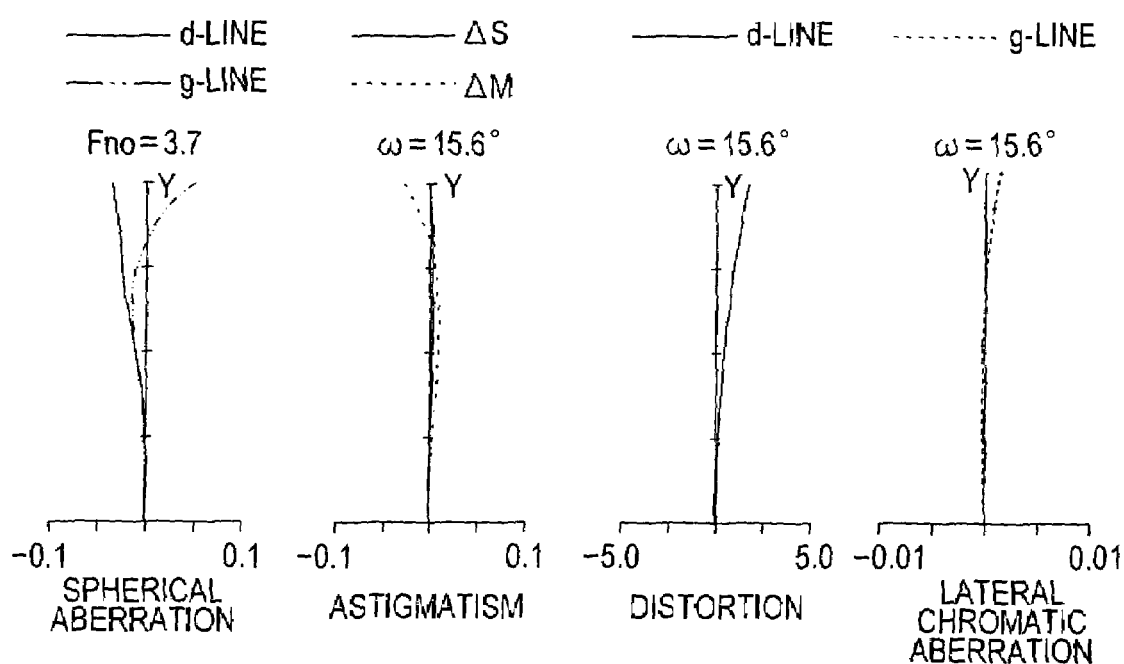
Figure 44C:
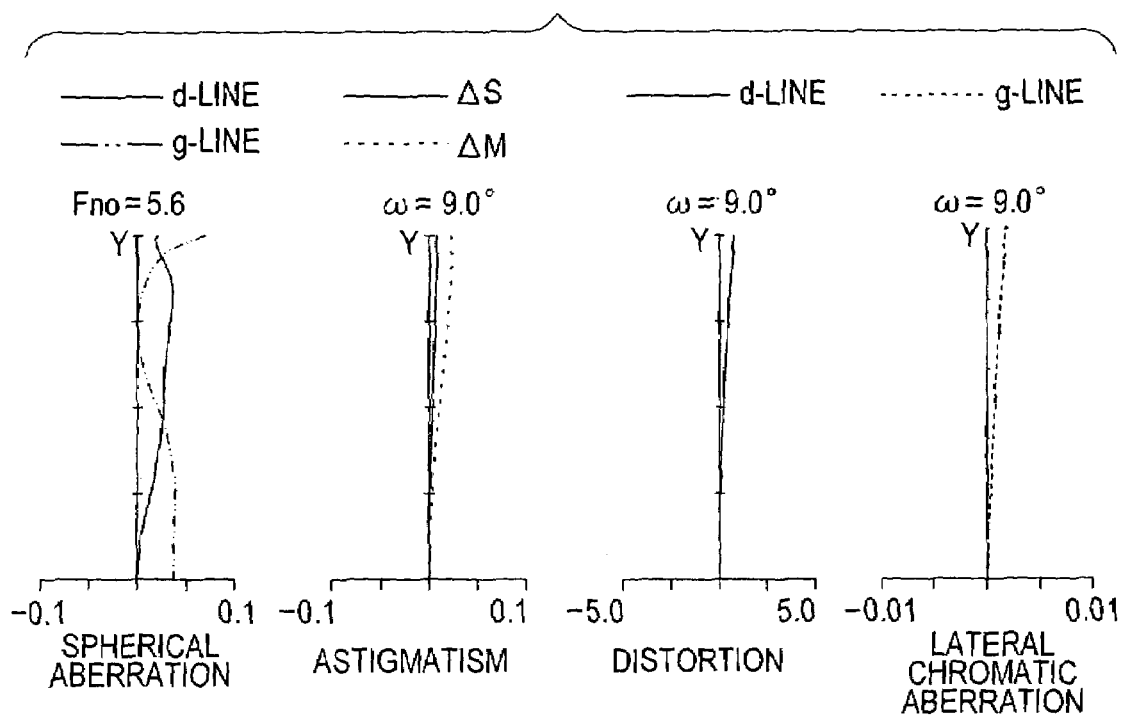

FIGS. 43A to 43C illustrate sectional views of the zoom lens according to the sixteenth exemplary embodiment at the wide-angle end, the middle zoom position, and the telephoto end, respectively. FIGS. 44A to 44C illustrate aberration diagrams of the zoom lens according to the sixteenth exemplary embodiment at the wide-angle end, the middle zoom position, and the telephoto end, respectively.

Figure 45A:
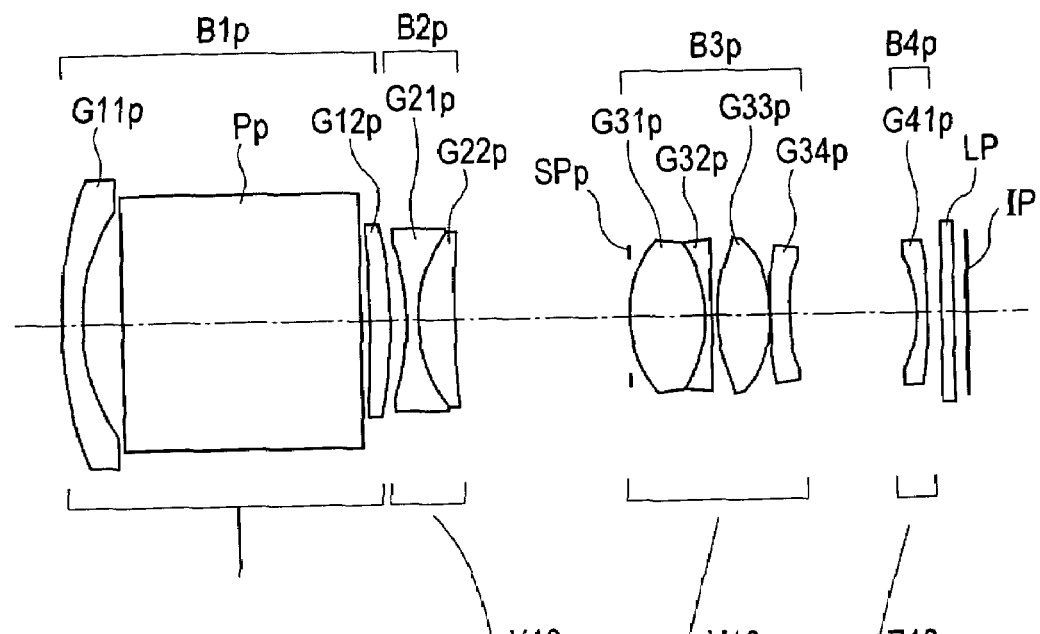
FIGS. 45A to 45C illustrate optical sectional views of a zoom lens according to a seventeenth exemplary embodiment.
Figure 45B:
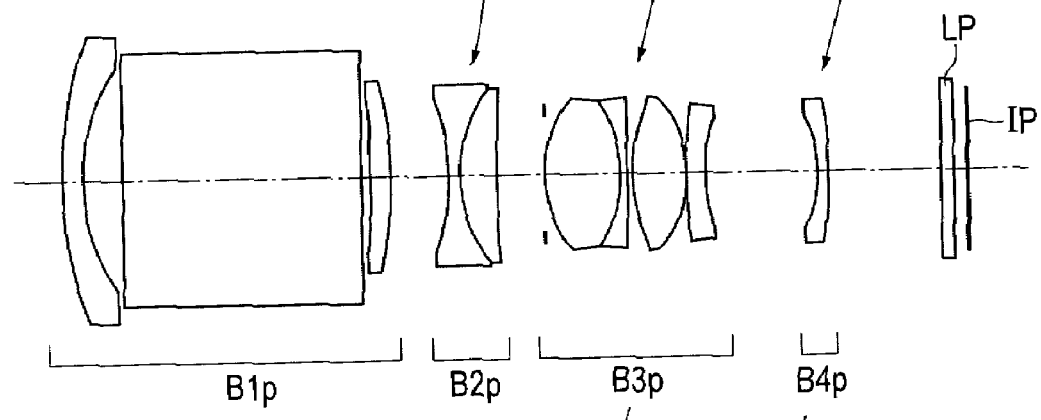
Figure 45C:
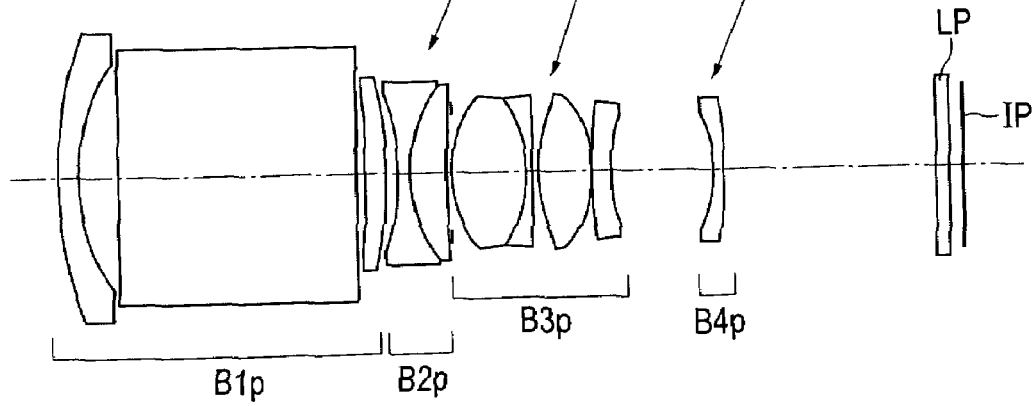
Figure 46A:
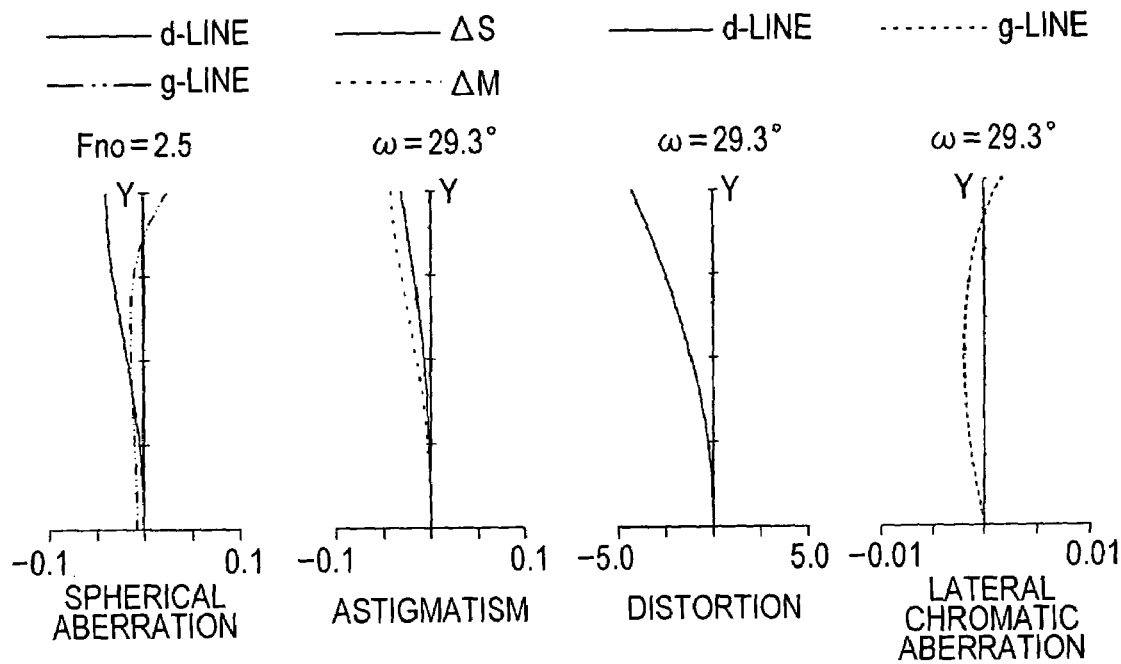
FIGS. 46A to 46C illustrate aberration diagrams of the zoom lens according to the seventeenth exemplary embodiment.
Figure 46B:
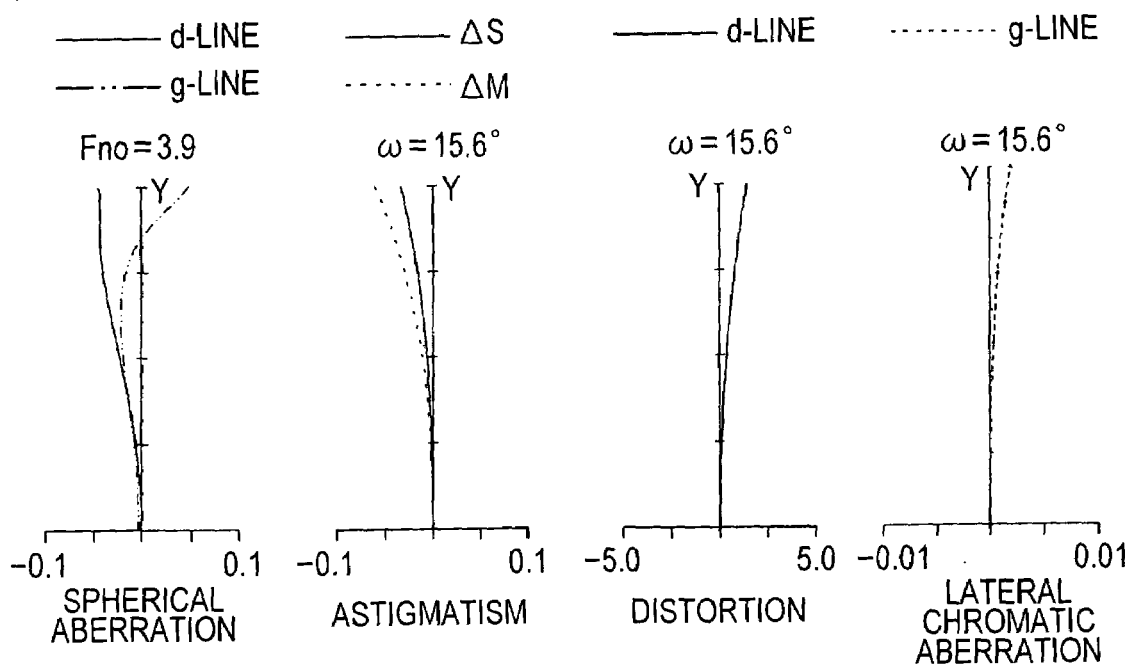
Figure 46C:
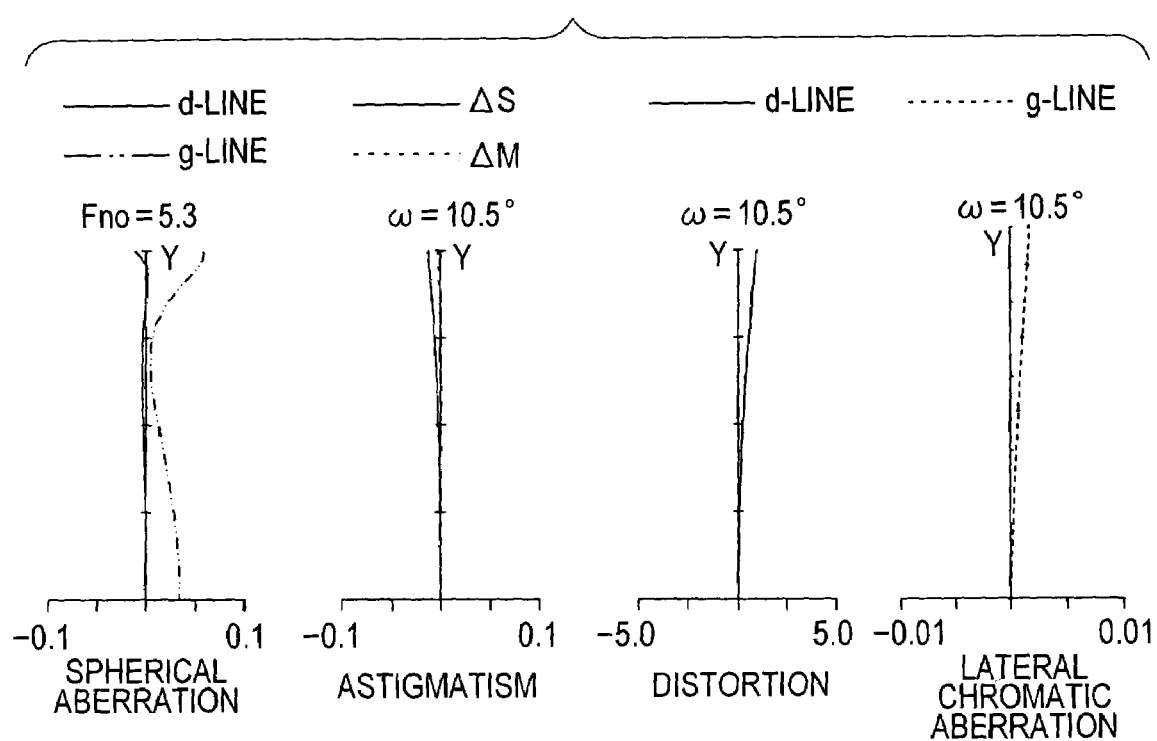

FIGS. 45A to 45C illustrate sectional views of the zoom lens according to the seventeenth exemplary embodiment at the wide-angle end, the middle zoom position, and the telephoto end, respectively. FIGS. 46A to 46C illustrate aberration diagrams of the zoom lens according to the seventeenth exemplary embodiment at the wide-angle end, the middle zoom position, and the telephoto end, respectively.

Figure 47A:
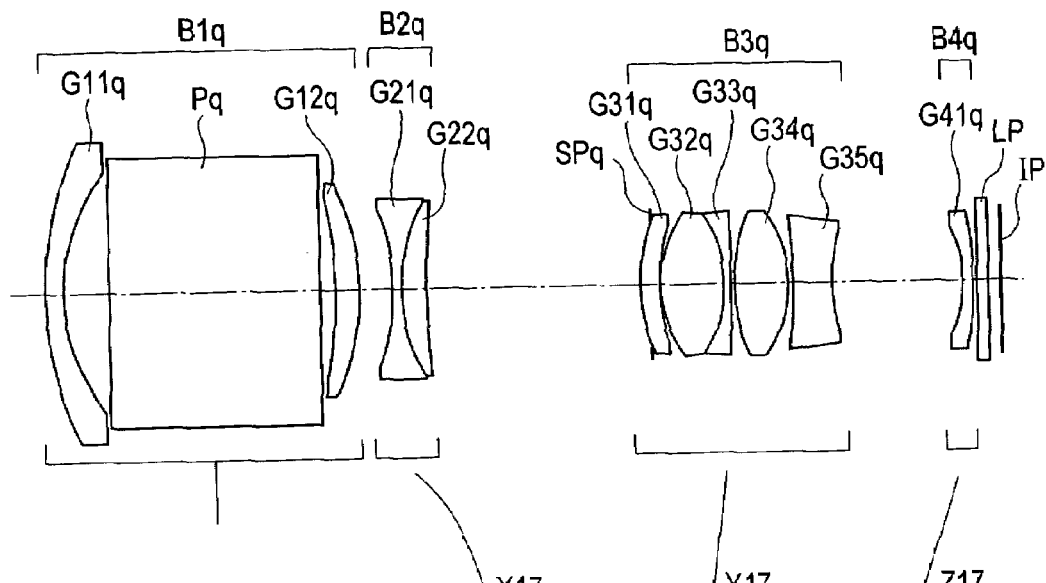
FIGS. 47A to 47C illustrate optical sectional views of a zoom lens according to an eighteenth exemplary embodiment.
Figure 47B:
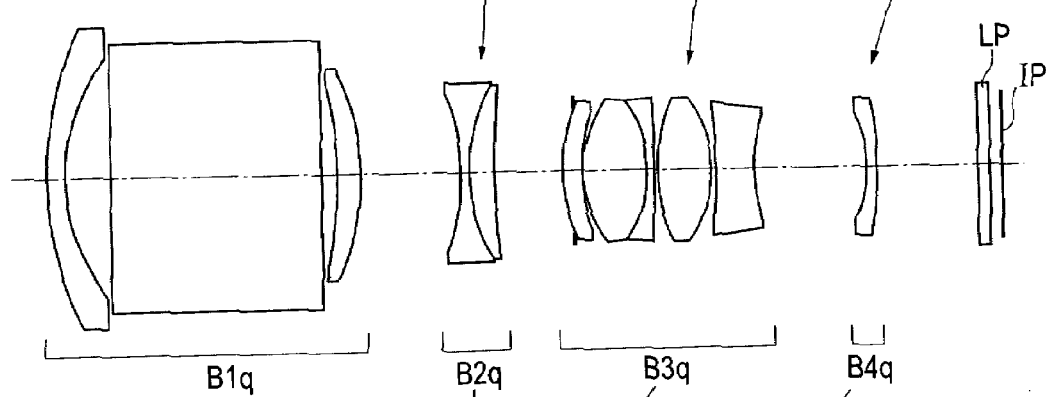
Figure 47C:
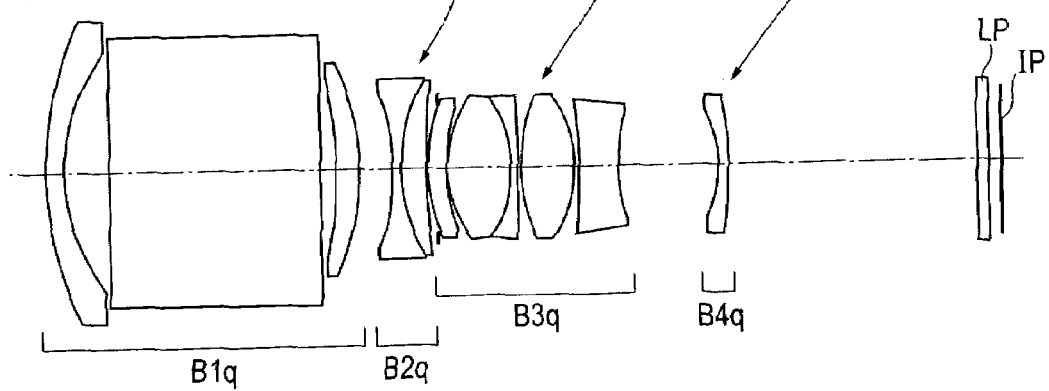
Figure 48A:
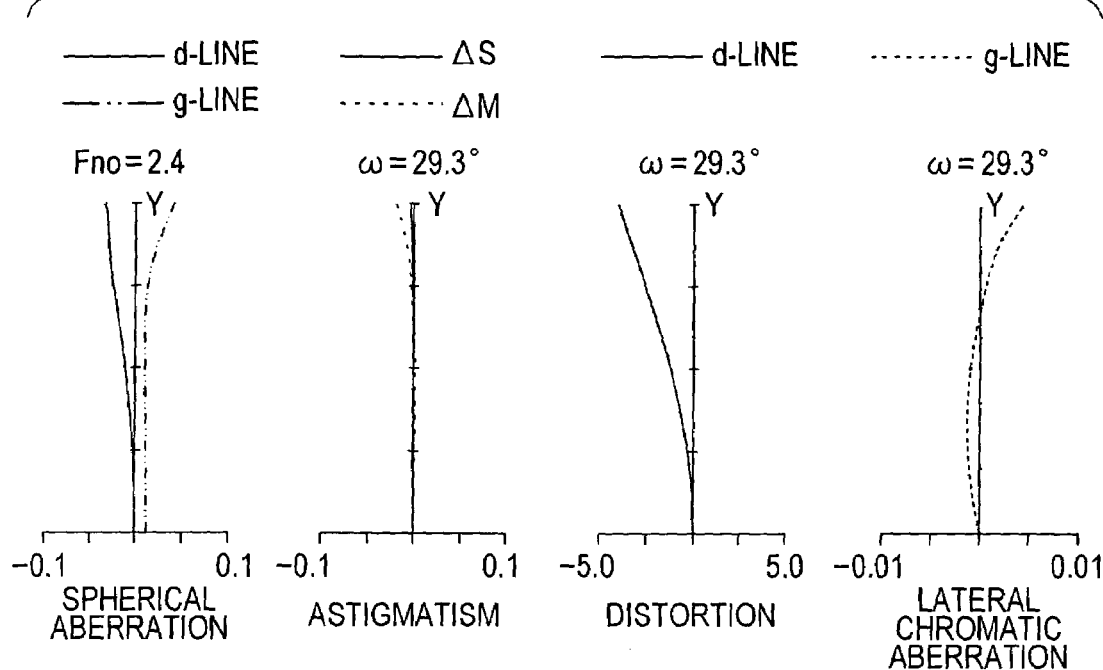
FIGS. 48A to 48C illustrate aberration diagrams of the zoom lens according to the eighteenth exemplary embodiment.
Figure 48B:
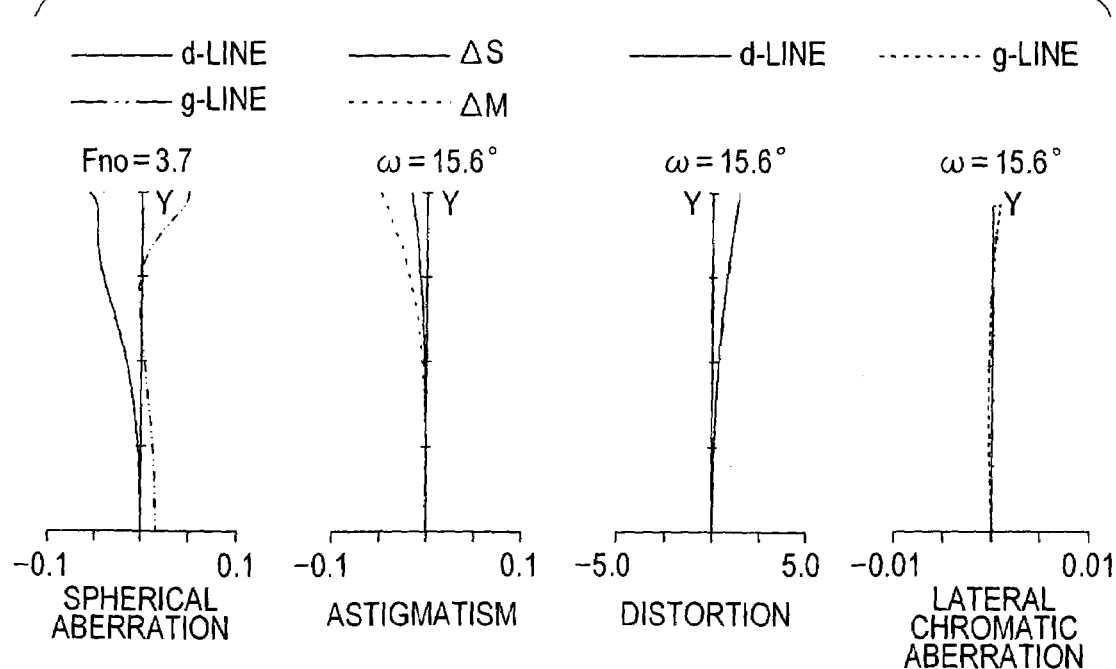
Figure 48C:
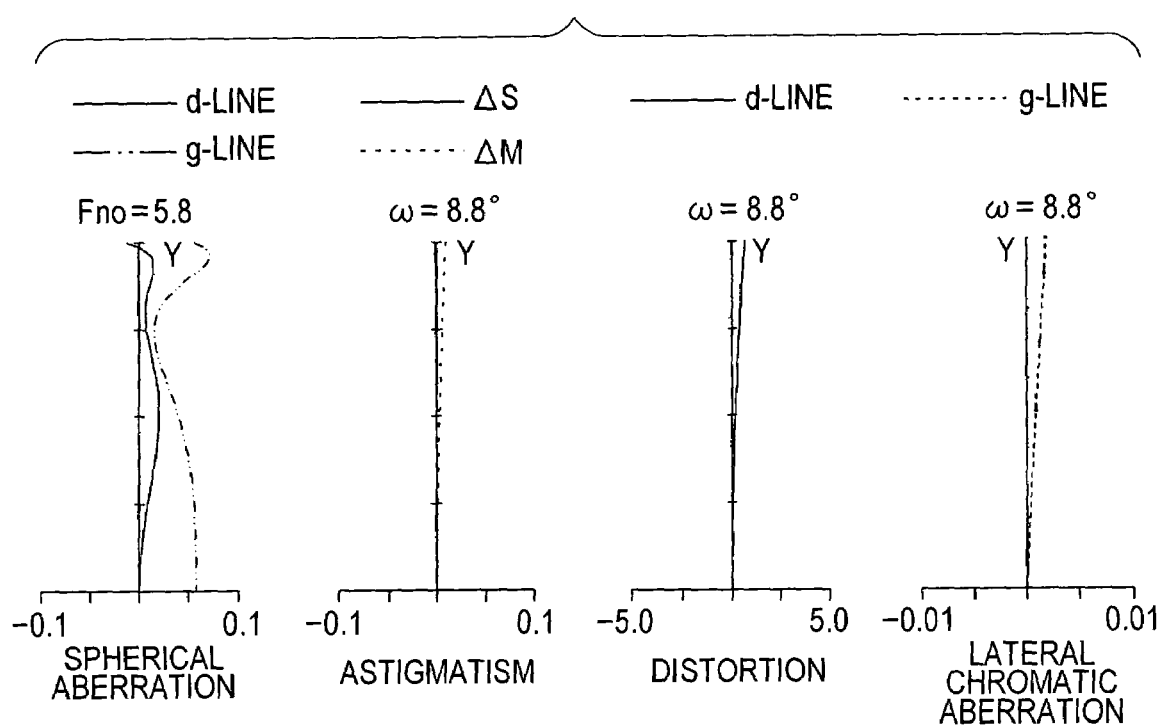

FIGS. 47A to 47C illustrate sectional views of the zoom lens according to the eighteenth exemplary embodiment at the wide-angle end, the middle zoom position, and the telephoto end, respectively. FIGS. 48A to 48C illustrate aberration diagrams of the zoom lens according to the eighteenth exemplary embodiment at the wide-angle end, the middle zoom position, and the telephoto end, respectively.

In the sectional views of the fourteenth to eighteenth exemplary embodiments, B1$m$-B1$q$ denotes a first lens unit having a positive or negative refractive power, B2$m$-B2$q$ denotes a second lens unit having a negative refractive power, B3$m$-B3$q$ denotes a third lens unit having a positive refractive power, and B4$m$-B4$q$ denotes a fourth lens unit having a negative refractive power. SP$m$-SP$q$ denotes an aperture stop disposed on the object side of the third lens unit B3$m$-B3$q$.

In the fourteenth and fifteenth exemplary embodiments, the first lens unit (e.g., B1$m$-B1$q$) can have a positive refractive power. In the sixteenth to eighteenth exemplary embodiments, the first lens unit (e.g., B1$m$-B1$q$) can have a negative refractive power.

P$m$-P$q$ denotes prisms included in the first lens unit (e.g., B1$m$-B1$q$) and provided with a reflective surface for bending the optical path. The reflective surface of the prism P$m$-P$q$ deflects the light beam from the object by a designed angle amount (e.g., approximately 90°). LP denotes an optical block corresponding to, for example, an optical filter, a faceplate, a quartz low-pass filter, and an infrared-cut filter. IP denotes image plane. Similar to the first to fifth exemplary embodiments, the image pickup plane of a solid-state image pickup device or a film surface is placed on the image plane IP.

The characters used in the aberration diagrams are similar to those of the aberration diagrams of the first to fifth exemplary embodiments.

In the zoom lens according to the fourteenth to eighteenth exemplary embodiments, during zooming from the wide-angle end to the telephoto end, the second lens unit (e.g., B2$m$-B2$q$) can move (e.g., X13-X17) along a locus curved toward the image side and the third and fourth lens units (e.g., B3$m$-B3$q$ and B4$m$-B4$q$) can move (e.g., Y13-Y17 and Z13-Z17) toward the object side so as to change the spaces between the lens units. The first lens unit (e.g., B1$m$-B1$q$) does not have to move along the optical axis for zooming.

Focusing can be performed by moving (e.g., Z13-Z17) the fourth lens unit (e.g., B4$m$-B4$q$) along the optical axis.

In each of the zoom lenses of the fourteenth to eighteenth exemplary embodiments, the first lens unit (e.g., B1$m$-B1$q$) includes a reflective member (e.g., prism P1$m$-P1$q$) that deflects the optical path on the optical axis by a designed angular amount (e.g., approximately 90°). Accordingly, the thickness of the lens system in the direction toward the object (along the depth of the image pickup apparatus) can be reduced.

In addition, a lens unit having a positive refractive power (e.g., third lens unit B3$m$-B3$q$) and a lens unit having a negative refractive power (e.g., fourth lens unit B4m-B4q) can be disposed between the first lens unit (B1m-B1q) and the image plane. During zooming from the wide-angle end to the telephoto end, these positive and negative lens units gradually can move to the object side while changing the distance (space) therebetween. Since the function of changing the magnification is provided by two lens units having refractive powers of opposite signs, the moving distances during zooming can be reduced. Accordingly, the length of the overall optical system can be reduced.

In addition, the second lens unit having a negative refractive power can be moved during zooming compensating for the movement of the image position caused when the magnification can be changed. In addition, the second lens unit can reduce aberrations during zooming.

In addition, not only the zoom lenses of the fourteenth to eighteenth exemplary embodiments but all of the zoom lenses of the first to eighteenth exemplary embodiments can be used with a solid-state image pickup device that does not require high telecentricity in the optical system, and the negative lens unit with a relatively high refractive power can be disposed at a position closest to the image side. When a lens unit having a negative refractive power is disposed at a position closest to the image side in the optical system, the telecentricity can be reduced since the exit pupil position approaches the image plane. Additionally, the length of the overall optical system can be reduced.

However, the solid-state image pickup device can have a certain degree of telecentricity. The above-mentioned "relatively high refractive power" can be determined taking into account the telecentricity required by the solid-state image pickup device and reduction of the size of the zoom lens. More specifically, when Fw is the focal length at the wide-angle end and Fe is the focal length of the lens unit having a negative refractive power that is closest to the image side (the fourth lens unit (e.g., B4m-B4q) in the fourteenth to eighteenth exemplary embodiments), the following expression can be satisfied:

$$0.8 < |Fe/Fw| < 2.5 \tag{11}$$

By adequately setting the negative refractive power of the lens unit closest to the image side, the length of the overall lens system can be reduced without increasing the aberrations.

When the value of Conditional Expression (11) is below the lower limit, the refractive power of the lens unit closest to the image side can be too high and it is difficult to keep the aberrations in good balance. In addition, the exit pupil position excessively approaches the image plane, and therefore it becomes difficult to use the zoom lens, even with the solid-state image pickup device which does not require high telecentricity in the optical system. In addition, sensitivity to the assembly error (displacement) of the lens unit closest to the image side can be increased, which is not preferable from the viewpoint of manufacturing. When the value of Conditional Expression (11) is above the upper limit, the refractive power of the lens unit closest to the image side can be reduced and the length of the overall lens system can be increased.

The numerical range of Conditional Expression (11) can also be set as follows:

$$1.1 < |Fe/Fw| < 2.0 \tag{11a}$$

In addition, the lens unit closest to the image side (e.g., fourth lens unit B4m-B4q) also serves to change magnification. Therefore, the expression shown below can also be satisfied. More specifically, when βeW and βeT are respectively the lateral magnifications at the wide-angle end and the telephoto end (focusing on the object at infinity in the overall system), the following expression can be satisfied:

$$1.4 < \beta eT/\beta eW < 3.0 \tag{12}$$

The lens unit closest to the image side not only serves to form an image but also serves to change the magnification. When Conditional Expression (12) is satisfied, the moving distances of the lens units during zooming and the number of glasses in the overall lens system can be reduced without degrading the optical performance.

When the value of Conditional Expression (12) is above the upper limit, although good magnification-changing effect can be obtained, the refractive power of the lens unit closest to the image side can be too high. Accordingly, sensitivity to the assembly error of the lens unit can be increased, which is not preferable from the viewpoint of manufacturing. When the value of Conditional Expression (12) is below the lower limit, the magnification-changing effect obtained by the lens unit closest to the image side is small, and it is difficult to obtain the desired zoom ratio. Although the desired zoom ratio can be obtained by using an additional moving lens unit, the size of the overall optical system can be increased in such a case.

The numerical range of Conditional Expression (12) can also be set as follows:

$$1.6 < \beta eT/\beta eW < 2.2 \tag{12a}$$

The structure in which the negative lens unit having a relatively high refractive power is at a position closest to the image side and in which Conditional Expressions (11) and (12) can be satisfied is not limited to the fourteenth to eighteenth exemplary embodiments, but are applied to all of the first to eighteenth exemplary embodiments.

Next, the structure of each lens unit included in the zoom lenses of the fourteenth to eighteenth exemplary embodiments will be described.

The first lens unit (e.g., B1m-B1q) includes at least one negative lens and at least one positive lens. Since the first lens unit (e.g., B1m-B1q) is closest to the object side, it tends to have a large diameter. However, the diameter can be set as small as possible without increasing the aberrations by using the negative lens and the positive lens.

In addition, a positive meniscus lens having a convex surface on the image side can be positioned closest to the image side in the first lens unit (e.g., B1m-B1q). When the positive meniscus lens is positioned closest to the image side, aberrations can be reduced by allowing the negative lens on the object side to cause aberrations in the opposite direction. In particular, the astigmatism can be reduced in the overall lens system.

In the fourteenth to eighteenth exemplary embodiments, the first lens unit (e.g., B1m-B1q) includes a negative meniscus lens (e.g., G11m-G11q) having a convex surface on the object side, a right angle prism (e.g., Pm-Pq), and a positive meniscus lens (e.g., G12m-G12q) having a convex surface on the image side in order from the object side to the image side.

The second lens unit (e.g., B2m-B2q) includes at least one biconcave lens. The second lens unit (e.g., B2m-B2q) functions as a compensator. When the second lens unit (e.g., B2m-B2q) includes a biconcave lens, the refractive power required for correcting the aberrations over the entire zooming range can be obtained with a small number of lenses. In addition, the lateral chromatic aberration can also be corrected.

In the fourteenth and fifteenth exemplary embodiments, the second lens unit B2 includes a biconcave negative lens (e.g., G21m-G21q) and a positive meniscus lens having a convex surface on the object side in order from the object side to the image side. In the sixteenth to eighteenth exemplary embodiments, the biconcave negative lens (e.g., G21m-G21q) and the positive meniscus lens (e.g., G22m-G21q) can be combined together, and the second lens unit (e.g., B2m-B2q) can be composed of the combination lens having a negative refractive power.

The third lens unit (e.g., B3m-B3q) includes at least one aspherical surface for reducing the aberrations with a small number of lenses. In this view, the third lens unit B3 can have a biconvex lens having aspherical surfaces on both sides. The aspherical lens is not particularly limited and can be a lens obtained by molding glass or plastic, a lens obtained by cutting, or a so-called replica aspherical lens in which resin is applied to glass surface, etc.

In the fourteenth exemplary embodiment, the third lens unit (e.g., B3m) includes a biconvex positive lens (e.g., G31m), a negative meniscus lens (e.g., G32m) having a convex surface on the image side, a biconvex positive lens (e.g., G33m), and a negative meniscus lens (e.g., G34m) having a convex surface on the object side in order from the object side to the image side. The positive lens (e.g., G31m) and the negative meniscus lens (e.g., G32m) are combination together to form a combination lens having a positive refractive power. The biconvex positive lens (e.g., G33m) can have aspherical surfaces on both the object side and the image side. The negative meniscus lens (e.g., G34m) can have an aspherical surface on the object side.

In the fifteenth and sixteenth exemplary embodiment, the third lens unit (e.g., B3n-B3o) includes a biconvex positive lens (e.g., G31n-G31o), a negative meniscus lens (e.g., G32n-G32o) having a convex surface on the image side, a biconvex positive lens (e.g., G33n-G33o), and a biconcave negative lens (e.g., G34n-G34o) in order from the object side to the image side. The positive lens (e.g., G31n-G31o) and the negative meniscus lens (e.g., G32n-G32o) can be combined together to form a combination lens having a positive refractive power. The biconvex positive lens G33 can have aspherical surfaces on both the object side and the image side.

In the seventeenth exemplary embodiment, the third lens unit (e.g., B3p) includes a biconvex positive lens G31, a negative meniscus lens (e.g., G32p) having a convex surface on the image side, a biconvex positive lens (e.g., G33p), and a negative meniscus lens (e.g., G34p) having a convex surface on the object side in order from the object side to the image side. The positive lens (e.g., G31p) and the negative meniscus lens G32 are combination together to form a combination lens having a positive refractive power. The negative meniscus lens (e.g., G32p) can have an aspherical surface on the image side. The biconvex positive lens (e.g., G33p) can have aspherical surfaces on both the object side and the image side.

In the eighteenth exemplary embodiment, the third lens unit (e.g. B3q) includes a positive meniscus lens (e.g., G31q) having a convex surface on the object side, a biconvex positive lens (e.g., G32q), a negative meniscus lens (e.g., G33q) having a convex surface on the image side, a biconvex positive lens (e.g., G34q) having aspherical surfaces on both sides, and a negative meniscus lens (e.g., G35q) having a convex surface on the object side and an aspherical surface of the image plane in order from the object side to the image side. The positive lens (e.g., G32q) and the negative meniscus lens (e.g., G33q) are combination together to form a combination lens having a positive refractive power. The biconvex positive lens (e.g., G34q) can have aspherical surfaces on both the object side and the image side. The negative meniscus lens (e.g., G35q) can have an aspherical surface on the image side.

In the fourteenth to eighteenth exemplary embodiments, the fourth lens unit (e.g., B4m-B4q) includes only a negative meniscus lens (e.g., G41m-G41q) having a convex surface on the image side. Since the lens closest to the image side can have a negative meniscus shape with a convex surface on the image side, the lens becomes more concentric with respect to the aperture stop (e.g., SPm-SPq). Therefore, the overall length can be reduced without increasing the aberrations.

Next, fourteenth to eighteenth numerical examples corresponding to the fourteenth to eighteenth exemplary embodiments, respectively, will be described. Symbols used in each numeral example is similar to those used in the first to fifth numerical examples, and explanations thereof are thus omitted.

Table 3 shows the values of Conditional Expressions (11) and (12) in each of the first to eighteenth numerical examples.

FOURTEENTH NUMERICAL EXAMPLE $f = 6.3$–$23.3$, Fno $= 2.4$–$5.7$, $\omega = 29.3$–$8.5°$

| R1 = 18.611 | D1 = 0.850 | N1 = 1.9229 | ν1 = 18.9 |
| R2 = 10.025 | D2 = 2.221 | | |
| R3 = ∞ | D3 = 10.200 | N2 = 1.8040 | ν2 = 46.6 |
| R4 = ∞ | D4 = 0.490 | | |
| R5 = −38.404 | D5 = 1.180 | N3 = 1.6990 | ν3 = 30.1 |
| R6 = −14.412 | D6 = variable | | |
| R7 = −12.722 | D7 = 0.400 | N4 = 1.7440 | ν4 = 44.8 |
| R8 = 14.684 | D8 = 0.200 | | |
| R9 = 13.385 | D9 = 1.234 | N5 = 1.9229 | ν5 = 18.9 |
| R10 = 85.033 | D10 = variable | | |
| R11 = 6.786 | D11 = 3.405 | N6 = 1.4875 | ν6 = 70.2 |
| R12 = −6.200 | D12 = 0.350 | N7 = 1.8340 | ν7 = 37.2 |
| *R13 = −54.737 | D13 = 0.285 | | |
| *R14 = 7.224 | D14 = 2.307 | N8 = 1.4875 | ν8 = 70.2 |
| *R15 = −6.588 | D15 = 0.050 | | |
| R16 = 7.601 | D16 = 0.800 | N9 = 1.8340 | ν9 = 37.2 |
| R17 = 4.467 | D17 = variable | | |
| R18 = −5.991 | D18 = 0.500 | N10 = 1.8340 | ν10 = 37.2 |
| R19 = −19.654 | D19 = variable | | |
| R20 = ∞ | D20 = 0.600 | N11 = 1.5163 | ν11 = 64.1 |
| R21 = ∞ | | | |

| | Focal Length | | |
| Variable Distance | Wide | Middle | Tele |
| --- | --- | --- | --- |
| D6 | 0.521 | 4.808 | 1.762 |
| D10 | 11.962 | 3.713 | 0.255 |
| D17 | 7.311 | 6.290 | 5.677 |
| D19 | 0.200 | 5.183 | 12.300 |

Aspherical Coefficients

| 13th Surface: | $k = 0$ | | |
| | $A = 0$ | $B = 1.5464e{-}04$ | $C = 2.3539e{-}05$ |
| | $D = 1.4487e{-}06$ | $E = -5.7241e{-}08$ | |
| 14th Surface: | $k = 0$ | | |
| | $A = 0$ | $B = -1.4805e{-}03$ | $C = -5.0395e{-}06$ |
| | $D = 1.7754e{-}06$ | $E = -1.2369e{-}08$ | |
| 15th Surface: | $k = 0$ | | |
| | $A = 0$ | $B = 4.1729e{-}04$ | $C = -4.3939e{-}05$ |
| | $D = 2.5998e{-}06$ | $E = -2.8596e{-}08$ | |

FIFTEENTH NUMERICAL EXAMPLE f = 6.3–18.9, Fno = 2.4–5.0, ω = 29.3–10.5°

| | | | |
|---|---|---|---|
| R1 = 15.924 | D1 = 0.850 | N1 = 1.9229 | ν1 = 18.9 |
| R2 = 8.910 | D2 = 2.500 | | |
| R3 = ∞ | D3 = 11.000 | N2 = 1.8040 | ν2 = 46.6 |
| R4 = ∞ | D4 = 0.678 | | |
| R5 = −23.391 | D5 = 1.177 | N3 = 1.7552 | ν3 = 27.5 |
| R6 = −11.961 | D6 = variable | | |
| R7 = −10.497 | D7 = 0.400 | N4 = 1.6223 | ν4 = 53.2 |
| R8 = 12.206 | D8 = 0.330 | | |
| R9 = 11.620 | D9 = 1.800 | N5 = 1.8467 | ν5 = 23.8 |
| R10 = 59.986 | D10 = variable | | |
| R11 = 6.292 | D11 = 3.500 | N6 = 1.4875 | ν6 = 70.2 |
| R12 = −6.754 | D12 = 0.380 | N7 = 1.8340 | ν7 = 37.2 |
| R13 = −31.948 | D13 = 0.200 | | |
| *R14 = 8.673 | D14 = 2.222 | N8 = 1.4875 | ν8 = 70.2 |
| *R15 = −6.441 | D15 = 0.085 | | |
| R16 = −18.741 | D16 = 0.800 | N9 = 1.8340 | ν9 = 37.2 |
| R17 = 30.053 | D17 = variable | | |
| R18 = −4.500 | D18 = 0.500 | N10 = 1.8340 | ν10 = 37.2 |
| R19 = −10.130 | D19 = variable | | |
| R20 = ∞ | D20 = 0.600 | N11 = 1.5163 | ν11 = 64.1 |
| R21 = ∞ | | | |

| | Focal Length | | |
|---|---|---|---|
| Variable Distance | Wide | Middle | Tele |
| D6 | 0.538 | 4.630 | 2.984 |
| D10 | 11.323 | 3.560 | 0.977 |
| D17 | 7.713 | 6.817 | 6.255 |
| D19 | 0.200 | 4.767 | 9.558 |

Aspherical Coefficients

14th Surface: k = 0
A = 0    B = −7.8721e−04    C = −3.1700e−05
D = 6.1625e−07    E = −1.0793e−07

15th Surface: k = 0
A = 0    B = 1.1193e−03    C = −3.4844e−05
D = 1.3647e−06    E = −9.4562e−08

SIXTEENTH NUMERICAL EXAMPLE f = 6.3–22.1, Fno = 2.4–5.6, ω = 29.3–9.0°

| | | | |
|---|---|---|---|
| R1 = 16.819 | D1 = 0.900 | N1 = 1.9229 | ν1 = 18.9 |
| R2 = 9.713 | D2 = 2.357 | | |
| R3 = ∞ | D3 = 10.500 | N2 = 1.8040 | ν2 = 46.6 |
| R4 = ∞ | D4 = 0.690 | | |
| R5 = −22.261 | D5 = 1.027 | N3 = 1.8467 | ν3 = 23.8 |
| R6 = −13.462 | D6 = variable | | |
| R7 = −10.158 | D7 = 0.550 | N4 = 1.6393 | ν4 = 44.9 |
| R8 = 9.102 | D8 = 1.385 | N5 = 1.8467 | ν5 = 23.8 |
| R9 = 71.000 | D9 = 0.000 | | |
| R10 = ∞ | D10 = variable | | |
| R11 = 5.523 | D11 = 3.231 | N6 = 1.4875 | ν6 = 70.2 |
| R12 = −6.804 | D12 = 0.320 | N7 = 1.8340 | ν7 = 37.2 |
| R13 = −38.825 | D13 = 0.267 | | |
| *R14 = 8.372 | D14 = 1.991 | N8 = 1.4875 | ν8 = 70.2 |
| *R15 = −6.012 | D15 = 0.050 | | |
| R16 = −18.912 | D16 = 1.438 | N9 = 1.8340 | ν9 = 37.2 |
| R17 = 23.920 | D17 = variable | | |
| R18 = −4.599 | D18 = 0.500 | N10 = 1.8348 | ν10 = 42.7 |
| R19 = −11.103 | D19 = variable | | |
| R20 = ∞ | D20 = 0.600 | N11 = 1.5163 | ν11 = 64.1 |
| R21 = ∞ | | | |

| | Focal Length | | |
|---|---|---|---|
| Variable Distance | Wide | Middle | Tele |
| D6 | 1.284 | 4.784 | 2.160 |
| D10 | 10.395 | 3.296 | 0.200 |
| D17 | 6.708 | 6.116 | 5.749 |
| D19 | 0.200 | 4.392 | 10.478 |

Aspherical Coefficients

14th Surface: k = 0
A = 0    B = −1.3486e−03    C = −3.9246e−05
D = −3.9584e−06    E = 1.2667e−07

15th Surface: k = 0
A = 0    B = 1.2971e−03    C = −4.6161e−05
D = −7.7310e−07    E = 8.0469e−08

SEVENTEENTH NUMERICAL EXAMPLE f = 6.3–18.9, Fno = 2.5–5.3, ω = 29.3–10.5°

| | | | |
|---|---|---|---|
| R1 = 20.645 | D1 = 0.900 | N1 = 1.9229 | ν1 = 18.9 |
| R2 = 9.782 | D2 = 1.700 | | |
| R3 = ∞ | D3 = 10.500 | N2 = 1.8040 | ν2 = 46.6 |
| R4 = ∞ | D4 = 0.347 | | |
| R5 = −50.851 | D5 = 0.979 | N3 = 1.8467 | ν3 = 23.8 |
| R6 = −17.125 | D6 = variable | | |
| R7 = −11.058 | D7 = 0.550 | N4 = 1.7015 | ν4 = 41.2 |
| R8 = 7.116 | D8 = 1.577 | N5 = 1.8467 | ν5 = 23.8 |
| R9 = 67.121 | D9 = variable | | |
| R10 = 5.278 | D10 = 3.260 | N6 = 1.4875 | ν6 = 70.2 |
| R11 = −5.803 | D11 = 0.300 | N7 = 1.8340 | ν7 = 37.2 |
| *R12 = −89.923 | D12 = 0.200 | | |
| *R13 = 6.225 | D13 = 2.332 | N8 = 1.4875 | ν8 = 70.2 |
| *R14 = −5.699 | D14 = 0.069 | | |
| R15 = 28.539 | D15 = 0.801 | N9 = 1.8340 | ν9 = 37.2 |
| *R16 = 8.006 | D16 = variable | | |
| R17 = −5.316 | D17 = 0.500 | N10 = 1.8348 | ν10 = 42.7 |
| R18 = −24.116 | D18 = variable | | |
| R19 = ∞ | D19 = 0.600 | N11 = 1.5163 | ν11 = 64.1 |
| R20 = ∞ | | | |

| | Focal Length | | |
|---|---|---|---|
| Variable Distance | Wide | Middle | Tele |
| D6 | 0.672 | 2.516 | 0.408 |
| D9 | 7.683 | 2.108 | 0.200 |
| D16 | 5.545 | 4.820 | 4.479 |
| D18 | 0.596 | 5.051 | 9.409 |

Aspherical Coefficients

12th Surface: k = 0
A = 0    B = 4.7500e−04    C = 1.1886e−05
D = −2.2869e−06    E = 2.3746e−07

13th Surface: k = 0
A = 0    B = −1.0867e−03    C = −5.8280e−05
D = −7.2467e−06    E = 1.2741e−07

14th Surface: k = 0
A = 0    B = 8.9802e−04    C = −6.8994e−05
D = 1.1690e−06    E = −1.7331e−07

16th Surface: k = 0
A = 0    B = 1.0330e−03    C = 5.9134e−05
D = 2.8816e−06    E = −7.2933e−07

EIGHTEENTH NUMERICAL EXAMPLE f = 6.3–22.7, Fno = 2.4–5.8, ω = 29.3–8.8°

| | | | |
|---|---|---|---|
| R1 = 17.853 | D1 = 0.850 | N1 = 1.9229 | ν1 = 18.9 |
| R2 = 9.459 | D2 = 2.345 | | |
| R3 = ∞ | D3 = 10.200 | N2 = 1.8467 | ν2 = 23.8 |
| R4 = ∞ | D4 = 0.706 | | |
| R5 = −23.541 | D5 = 1.113 | N3 = 1.8052 | ν3 = 25.4 |
| R6 = −13.196 | D6 = variable | | |
| R7 = −10.806 | D7 = 0.400 | N4 = 1.6177 | ν4 = 49.8 |
| R8 = 9.219 | D8 = 1.256 | N5 = 1.8467 | ν5 = 23.8 |
| R9 = 52.946 | D9 = variable | | |
| R10 = 9.977 | D10 = 0.900 | N6 = 1.5163 | ν6 = 64.1 |
| R11 = 11.321 | D11 = 0.050 | | |
| R12 = 6.284 | D12 = 3.074 | N7 = 1.4875 | ν7 = 70.2 |
| R13 = −6.819 | D13 = 0.320 | N8 = 1.8340 | ν8 = 37.2 |
| R14 = −11015.044 | D14 = 0.200 | | |
| *R15 = 7.549 | D15 = 2.589 | N9 = 1.4875 | ν9 = 70.2 |
| *R16 = −6.325 | D16 = 0.175 | | |
| R17 = −390.475 | D17 = 2.000 | N10 = 1.8340 | ν10 = 37.2 |
| *R18 = 13.185 | D18 = variable | | |
| R19 = −6.148 | D19 = 0.500 | N11 = 1.8040 | ν11 = 46.6 |
| R20 = −21.695 | D20 = variable | | |
| R21 = ∞ | D21 = 0.600 | N12 = 1.5163 | ν12 = 64.1 |
| R22 = ∞ | | | |

| | Focal Length | | |
|---|---|---|---|
| Variable Distance | Wide | Middle | Tele |
| D6 | 1.672 | 4.928 | 1.559 |
| D9 | 10.421 | 3.328 | 0.100 |
| D18 | 6.329 | 5.369 | 4.781 |
| D20 | 0.200 | 4.997 | 12.182 |

Aspherical Coefficients

15th Surface: k = 0
A = 0  B = −8.8222e−04  C = −2.4577e−05
D = −1.1520e−06  E = −1.1257e−07
16th Surface: k = 0
A = 0  B = 1.4185e−03  C = −8.4337e−05
D = 2.5229e−06  E = −1.2053e−07
18th Surface: k = 0
A = 0  B = 3.0022e−04  C = 6.2597e−05
D = 1.2883e−06  E = −2.7774e−07

TABLE 3

| | 1st Example | 2nd Example | 3rd Example | 4th Example | 5th Example | 6th Example | 7th Example | 8th Example | 9th Example |
|---|---|---|---|---|---|---|---|---|---|
| Conditional Expression (11) | 1.14 | 1.20 | 1.13 | 1.03 | 1.12 | 1.11 | 1.32 | 1.25 | 1.43 |
| Conditional Expression (12) | 2.10 | 2.25 | 2.28 | 2.38 | 1.66 | 1.94 | 1.96 | 1.92 | 1.90 |

| | 10th Example | 11th Example | 12th Example | 13th Example | 14th Example | 15th Example | 16th Example | 17th Example | 18th Example |
|---|---|---|---|---|---|---|---|---|---|
| Conditional Expression (11) | 1.55 | 1.06 | 1.11 | 1.31 | 1.67 | 1.61 | 1.55 | 1.31 | 1.72 |
| Conditional Expression (12) | 1.76 | 1.94 | 2.02 | 1.62 | 2.00 | 1.79 | 1.90 | 1.85 | 1.97 |

According to the fourteenth to eighteenth exemplary embodiments, a small zoom lens having an F number of 2.4 at the wide-angle end so that high brightness is ensured and having a high zoom ratio of about 3 to 3.7.

Next, a digital still camera including the zoom lens system according to an exemplary as an optical shooting system will be described below with reference to FIG. 49.

Figure 49:
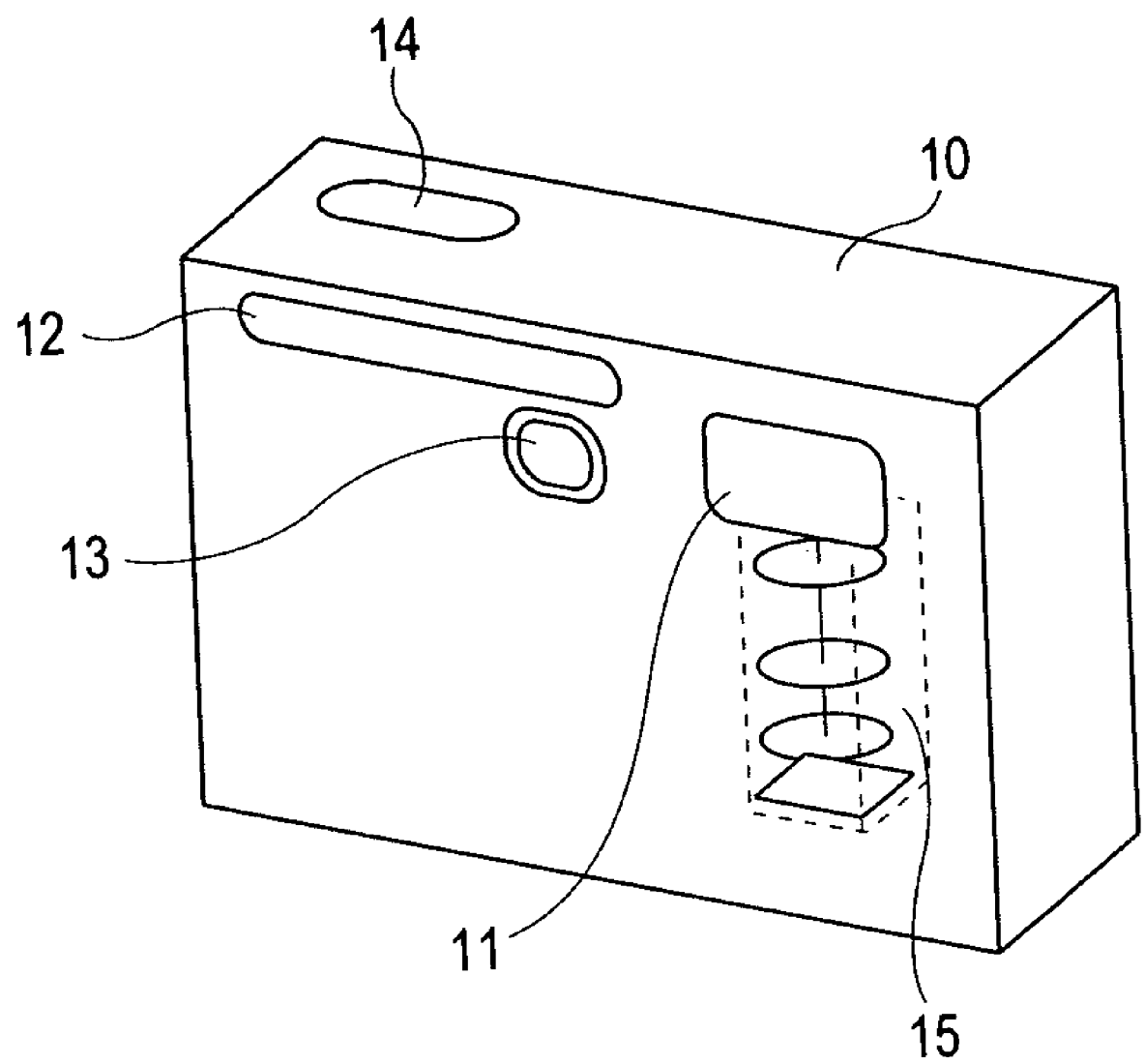
FIG. 49 illustrates a schematic diagram showing the major part of an image pickup apparatus.

With reference to FIG. 49, the digital still camera includes a camera boy 10, an optical shooting system 11 including the zoom lens system according to an exemplary embodiment, a stroboscope 12 housed in the camera body 10, an external finder 13, and a shutter button 14. Reference numeral 15 denotes the schematic optical arrangement of the zoom lens system in the camera body.

As described above, the zoom lens system according to an exemplary embodiment of the present invention is suitable for use in an image pickup apparatus, such as a digital camera. Accordingly, a small, high-optical-performance image pickup apparatus having a thin camera body can be obtained.

In addition, in this example, the reflective member deflects the optical axis such that the deflected optical axis extends in the up-down (vertical) direction. However, the optical system can also be arranged such that the deflected optical axis extends in the left-right (horizontal) direction.

In addition to image pickup apparatuses like digital still camera and digital video cameras, the zoom lens system according to at least one exemplary embodiment can also be used in image pickup units included in mobile phones, personal computers, personal digital assistances, other image pickup units as known by one of ordinary skill in the relevant arts and equivalents.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-287421 filed Sep. 30, 2004, Japanese Application No. 2004-287420 filed Sep. 30, 2004, and Japanese Application No. 2005-260879 filed Sep. 8, 2005, all of which are hereby incorporated by reference herein in their entirety.

What is claimed is:

1. A zoom lens system comprising:
  a first lens unit including a reflective member that deflects an optical path;
  a lens unit having a positive optical power placed on an image side of the first lens unit; and
  a lens unit having a negative optical power placed on the image side of the lens unit having a positive optical power, the lens unit having a negative optical power is positioned closest to the image side in the zoom lens system, wherein a distance between the first lens unit and the lens unit having a positive optical power and a distance between the lens unit having a positive optical power and the lens unit having a negative optical power vary during zooming from the wide-angle end to the telephoto end, and wherein when Fe is the focal length of the lens unit having a negative optical power and Fw is the focal length of the overall system at the wide-angle end, the following expression is satisfied:

$0.8<|Fe/Fw|<2.5$.

2. The zoom lens system according to claim 1, wherein when βew is the lateral magnification of the lens unit having a negative optical power at the wide-angle end and βeT is the lateral magnification of the lens unit having a negative optical power at the telephoto end, the following expression is satisfied:

$1.4<\beta eT/\beta eW<3.0$.

3. The zoom lens system according to claim 1, wherein the lens unit having a positive optical power and the lens unit having a negative optical power both move toward an object side during zooming from the wide-angle end to the telephoto end.

4. The zoom lens system according to claim 1, wherein the first lens unit includes a negative lens and a positive lens.

5. The zoom lens system according to claim 1, wherein the first lens unit includes a positive meniscus lens having a convex surface on the image side, the positive meniscus lens being closest to the image side in the first lens unit.

6. The zoom lens system according to claim 1, wherein the lens unit having a negative optical power includes only a negative meniscus lens having a convex surface on the image side.

7. The zoom lens system according to claim 1, wherein the zoom lens system forms an image on a solid-state image pickup device.

8. An image pickup apparatus, comprising:
the zoom lens system according to claim 1; and
a solid-state image pickup device that receives an image formed by the zoom lens system.

* * * * *